US 6,718,291 B1

(12) United States Patent
Shapiro et al.

(10) Patent No.: US 6,718,291 B1
(45) Date of Patent: Apr. 6, 2004

(54) MESH-FREE METHOD AND SYSTEM FOR MODELING AND ANALYSIS

(76) Inventors: Vadim Shapiro, 2025 Chadbourne Ave., Madison, WI (US) 53705; Igor G. Tsukanov, 404 Eagle Heights, Madison, WI (US) 53705

( * ) Notice: Subject to any disclaimer, the term of this patent is extended or adjusted under 35 U.S.C. 154(b) by 694 days.

(21) Appl. No.: 09/602,070

(22) Filed: Jun. 22, 2000

Related U.S. Application Data

(60) Provisional application No. 60/142,148, filed on Jul. 2, 1999.

(51) Int. Cl.$^7$ ................................................ G06F 17/50
(52) U.S. Cl. ................................ 703/2; 703/5; 703/14; 716/20
(58) Field of Search .......................... 703/2, 14, 18, 703/5; 707/104.1; 716/20

(56) References Cited

U.S. PATENT DOCUMENTS 5,148,379 A * 9/1992 Konno et al. ............... 364/578
5,408,638 A * 4/1995 Sagawa et al. ............. 395/500

OTHER PUBLICATIONS

T. Belytschko, Y. Krongauz, D. Organ, M. Fleming and P. Krysl. Meshless methods: An overview and recent developments. *Comput. Methods Appl. Mech. Engrg.*, 139:3–47, 1996.

J. Bloomenthal, *Introduction to Implicit Surfaces*, Morgan Kaufmann Publishers, 1997, Chapter 1.

Frank C. Gunter and Wing Kam Liu. Implementation of boundary conditions for meshless methods. *Computer Methods in Applied Mechanics and Engineering*, 163:205–230, 1998.

L. V. Kantorovich and V. I. Krylov, *Approximate Methods of Higher Analysis*, Interscience Publishers, 1958, pp. 258–303.

J. Kucwaj and J. Orkisz. Computer approach to R–functions method of solution of boundary value problems in arbitrary domains. *Computers & Structures*, 22(1):1–12, 1986.

J.–C. Latombe. *Robot Motion Planning*. Kluwer Academic Publishers, 1991, chapter 7.

A. Pasko, V. Adzhiev, A. Sourin, and V.: Savchenko. Function representation in geometric modeling concepts, implementation and applications. *The Visual Computer*, 11(8):429–446, 1995.

Walter D. Pilkey. *Formulas for stress, strain, and structural matrices*, John Wiley & Sons, 1994, Table 12.1.

(List continued on next page.)

*Primary Examiner*—Samuel Broda, Esq.
*Assistant Examiner*—Thai Phan
(74) *Attorney, Agent, or Firm*—Craig A. Fieschko, Esq.; DeWitt Ross & Stevens S.C.

(57) ABSTRACT

A method and apparatus for mesh-free engineering analysis of geometric models is described. The method and apparatus, which are preferably software-based and implemented on personal computers or other programmable processing devices, represent geometric models by implicit mathematical functions. The implicit functions allow interpolation of all desired boundary conditions over the geometry without meshing, and the boundary conditions may then may be combined with a piecewise continuous model of the solution structure (i.e., the analysis problem). By solving for elements of the solution structure (its basis or coordinate functions) which satisfy the given boundary conditions either exactly or approximately, the solution structure will define the behavior and boundary conditions (exactly or approximately) throughout the geometric model.

26 Claims, 51 Drawing Sheets

OTHER PUBLICATIONS

L. B. Rall and G. F. Corliss, An introduction to automatic differentiation, in M. Berz, C. Bischof, G. Corliss, and A. Griewank, editors, *Computational Differentiation, Procs Second International Workshop on Computational Differentiation*, SIAM, 1996.

J. R. Rossignac. CSG formulations for identifying and for trimming faces of CSG models. In *CSG'96, Winch–ester, UK*. Information Geometers Ltd, Apr. 1996.

V. Rvachev, T. Sheiko, V. Shapiro, and J. Uicker. Implicit function modeling of solidification in metal casting. *Transaction of ASME, Journal of Mechanical Design*, 119:466–473, Dec. 1997.

V. L. Rvachev, G. P. Manko, and A. N. Shevchenko. The R–function approach and software for the analysis of physical and mechanical fields. In J. P. Crestin and J. F. McWaters, editors, *Software for Discrete Manufacturing*, Paris, 1986. North–Holland.

V. L. Rvachev and T. I. Sheiko, R–functions in boundary value problems in mechanics, *Applied Mechanics Reviews*, 48(4):151–188, 1995.

V. Shapiro. Theory of R –functions and applications: A primer. Tech. Report TR91–1219, Computer Science Department, Cornell University, Ithaca, NY, 1991.

V. Shapiro. Real functions for representation of rigid solids. *Computer–Aided Geometric Design*, 11(2):153–175, 1994.

V. Shapiro, Well–formed set representations of solids, *International Journal on Computational Geometry and Applications*, vol. 9, No. 2, 1999, pp 125–150.

V. Shapiro and I. Tsukanov. Meshfree simulation of deforming domains. *Computer–Aided Design*, 31(7):459–471, 1999.

V. Shapiro and I. Tsukanov, Implicit functions with guaranteed differential properties, *Fifth ACM Symposium on Solid Modeling and Applications*, Ann Arbor, MI, 1999.

V. Shapiro and D. L. Vossler, Construction and optimization of CSG representations, *Computer–Aided Design*, 23(1):4–20, Jan./Feb. 1991.

V. Shapiro and D. L. Vossler, Efficient CSG representations of two–dimensional solids, *Transactions of ASME, Journal of Mechanical Design*, 113:292–305, Sep. 1991.

V. Shapiro and D. L. Vossler, Separation for boundary to CSG conversion, *ACM Transactions on Graphics*, 12(1):35–55, Jan. 1993.

A.N. Shevchenko and V.N. Rokityanskaya, Automatic differentiation of functions of many variables, *Cybernetics and System Analysis*, 32(5):709–723, 1996.

A. Sourin and A. Pasko. Function representation for sweeping by a moving solid. In *Proc. Third Symposium on Solid Modeling Foundations and CAD/CAM applications*, May 17–19, 1995.

A. Waberski. Vibration statistics of thin plates with complex form. *AIAA J*, 16(8):788–794, 1978.

Josef Hoschek and Dieter Lasser, *Fundamentals of Computer Aided Geometric Design*, AK Peters, Ltd, 1993.

Y. Liu and R. D. Reitz, Multidimensional modeling of engine combustion chamber surface temperatures, in *Advances in SI and Diesel Engine Modeling (SP–1276), SAE–971594*, pp. 57–71, May 1997.

Y. Liu and R. D. Reitz, Modeling of heat conduction within chamber walls for multidimensional internal combustion engine simulation, *Int. J. Heat Mass Transfer*, 41(6–7):859–869, 1998.

R.S. Palmer and V. Shapiro, Chain models of physical behavior for engineering analysis and design, *Research in Engineering Design*, 5:161–184, 1993. Invited paper for the special issue Advances.

J.A. Sethian. *Level Set Methods: Evolving Interfaces in Geometry, Fluid Mechanics, Computer Vision and Material Sciences*. Cambridge University Press, 1996, pp. 1–35, 99–108.

V.L. Rvachev, T.I. Sheiko, V. Shapiro, I. Tsukanov, *Transfinite Interpolation Over Implicitly Defined Sets*, Technical report SAL 2000–1, Spatial Automation Laboratory, University of Wisconsin, Jan. 2000. http://sal–cnc.me.wisc.edu/.

* cited by examiner (a)

(b)

(a)

(b)

(a)

(b)

(a)

(b)

(a)

(b)

(c)

(a)

(b)

(c)

(a)

(b)

(c)

(a) (b) (c)

(d) (e) (f)

(a)  (b)

(c)

(a)

(b)

(c)

(a)

(b)

(a)

(b)

(a)

(b)

(a)

(b)

(a)

(b)

(a)

(b)

MESH-FREE METHOD AND SYSTEM FOR MODELING AND ANALYSIS

CROSS-REFERENCE TO RELATED APPLICATIONS

This application claims priority under 35 USC §119(e) to U.S. Provisional Patent Application No. 60/142,148 filed Jul. 2, 1999, the entirety of which is incorporated by reference herein.

STATEMENT REGARDING FEDERALLY SPONSORED RESEARCH

This invention was made with United States government support awarded by the following agencies:

National Science Foundation Grant No(s).: DMI-9522806

The United States has certain rights in this invention.

FIELD OF THE INVENTION

The invention is directed to methods and apparata for solving problems of geometric modeling and engineering analysis, wherein the methods and apparata do not require spatial discretization of the underlying geometric domain or its boundary into elements which conform to the geometry (an activity commonly known as "meshing").

BACKGROUND OF THE INVENTION

In engineering fields, geometric modeling of objects and the engineering analysis of the behavior of the modeled objects are extremely important activities. Modeling is generally performed by constructing a representation of an object's geometry on a computer (i.e., a CAD geometric model), with the representation including the "environment" of the object (that is, the object's boundary conditions, such as loads exerted on the object, temperatures on and around the object, and other physical and non-physical functional values). The analysis of the model's behavior is then usually also performed by computer, with the goal of predicting the modeled object's physical behavior based on the boundary conditions defined for the geometric model. In general, this involves determining physical functional values and/or their derivatives everywhere in the geometric model, both on its boundaries and in its interior—these values and derivatives being referred to herein as "field values"—based on the known boundary conditions defined at isolated locations on the model. The two activities of modeling and analysis are highly interrelated in that modeling is the prerequisite for analysis, while results of analysis are often used for further modeling. Most geometric models and analysis-related functions are represented in a piecewise fashion, which requires discretization of the model (e.g., construction of a mesh or grid) into finite elements that conform to and approximate the overall model.

However, modeling and analysis have largely emerged as two separate activities that are only weakly connected because they operate on distinct computer representations (e.g., the geometric domain of the model vs. the functional domain of the analysis), and the conversion process between these representations, effected by the aforementioned discretization, is time-consuming and difficult. This results in a slow and inefficient modeling and analysis cycle; the inability to reflect the results of analysis in the original model; difficulty in integrating multiple types of analyses on a common design model, and severely restricted types of analyses available for applications with time-varying geometries. Discretization (i.e., "meshing") now dominates modeling and analysis activities both in manual effort and computer time. Thus, it is highly desirable to have "mesh-free" methods and apparata for modeling and analysis.

One of the main challenges for mesh-free modeling and analysis methods lies in constructing solutions to boundary value problems (e.g., differential equations) wherein the solutions satisfy the prescribed boundary conditions. The classical methods such as FEM (Finite Element Method), BEIM (Boundary Element Integral Methods), and FD (Finite Differences) rely on spatial discretization of the domain and/or its boundary in order to enforce or approximate the imposed boundary conditions at discrete locations. In contrast, the mesh-free methods discretize not the geometric domain but the underlying functional space—that is, the mathematical domain of the model rather than its physical domain. A number of mesh-free techniques which do not require discretization of the geometry have been developed (see T. Belytschko, Y. Krongauz, D. Organ, M. Fleming and P. Krysl, Meshless methods: An overview and recent developments. *Comput. Methods Appl. Mech. Engrg.*, 139:3–47, 1996): smooth particle hydrodynamics (SPH); the diffuse element method (DEM); the reproducing kernel particle method (RKPM); the HP cloud method; the partition of unity method (PUM), and others. But geometric non-conformance of all such mesh-free methods (i.e., an inexact match between the geometric model and the functional model) makes treatment of boundary conditions problematic. Proposed remedies include the combination of the Element Free Galerkin Method (EFG) with finite element shape functions near the boundary; the use of modified variational principle; window or correction functions that vanish on the boundary; and Lagrange multipliers. Although these techniques appear promising for use in some cases, they often contradict the mesh-free nature of the approximation near the boundary, introduce additional constraints on solutions, or lead to systems with an increased number of unknowns (see, e.g. Frank C. Gunter and Wing Kam Liu, Implementation of boundary conditions for meshless methods. *Computer Methods in Applied Mechanics and Engineering*, 163:205–230, 1998).

Other mesh-free methods appear promising, but are cumbersome to use. In V. L. Rvachev, *Theory of R-functions and Some Applications*, Naukova Dumka, 1982 (in Russian), Rvachev developed the theory of R-functions—real-valued functions that behave as continuous analogs of logical Boolean functions. With R-functions, it became possible to construct functions with prescribed values and derivatives at specified locations, assisting in the solution of boundary value problems. Over the last several decades, the theory of R-functions has matured and has been applied to numerous scientific and engineering problems by Rvachev and his students, including problems of heat transfer, elasticity, magneto-hydrodynamics, various problems in inhomogeneous media, and many other areas. The theory of R-functions was implemented in a software system for scientific programming called POLYE (V. L. Rvachev and G. P. Manko, *Automation of Programming for Boundary Value Problems*, Naukova Dumka, 1983, in Russian; V. L. Rvachev, G. P. Manko, and A. N. Shevchenko, The R-function approach and software for the analysis of physical and mechanical fields, in J. P. Crestin and J. F. McWaters, editors, *Software for Discrete Manufacturing*, Paris, 1986, North-Holland). POLYE assists users in solving boundary value problems using a symbolic programming language called RL, in which a user may define a geometric domain, boundary conditions, and a solution structure for a selected problem. However, while POLYE and the RL language simplify the solution of boundary value problems, the problems are still largely manually solved insofar as the user must define the problem, including matters such as identifying and defining implicit functions for the geometry, selection and definition of solution structures, and the selection and definition of a solution procedure. Essentially, the POLYE software serves as an equation solver much like Mathematica (Wolfram Research, Champaign, Ill., USA), MATLAB (MathWorks, Inc., Natick, Mass., USA), or EES (Engineering Equation Solver, F-Chart Software, Middleton, Wis., USA), wherein the user is left to properly define the parameters of the problem and the software is specially configured to process the problem after it is properly defined. Therefore, unless the user has a high degree of knowledge and expertise in defining the problem parameters in the POLYE solver's language and environment, it is difficult to use. Other manual symbolic methods for construction of solution structures have been further explored in J. Kucwaj and J. Orkisz, Computer approach to the R-function method of solution of boundary value problems in arbitrary domains, *Computers & Structures*, 22(1):1–12, 1986.

Apart from the manual methods' need for significant experience and knowledge for their use, these methods also suffer from the significant drawback that they do not easily accommodate preexisting problem data, i.e., they do not allow the direct use of common engineering data such as CAD geometric models. Engineers often perform geometric modeling and problem definition in CAD systems because CAD systems are readily available and easy to use. They also allow the engineer to work in the geometric domain, which is intuitive and easy to comprehend because it approximates one's physical environment: one can simply draw a geometric representation of a physical object. However, POLYE and similar systems require boundary value problems to be defined in the mathematical domain, and the translation between the geometric and mathematical domains is not trivial. It is extremely time-consuming to construct the equations which define a geometric model, and such construction often requires the application of the user's expertise and judgement because there may be one or more mathematical analogues available for a geometric model. Further, for some geometries, an exact translation may not be practical or possible.

Owing to the drawbacks of the prior meshing and mesh-free methods, it would be helpful to have available other methods of modeling and solving boundary value problems, particularly if they could be implemented on computers in a highly automated fashion. More specifically, it would be helpful to have available highly automated methods for mesh-free modeling and solution of boundary value problems, so that the problems inherent in meshing methods may be avoided.

SUMMARY OF THE INVENTION

The present invention, which is defined by the claims set out at the end of this disclosure, involves methods and apparata capable of integrating geometric modeling and engineering analysis without requiring meshing. A CAD geometric model may be created within the invention (e.g., if the invention is provided as part of a CAD package) or outside the invention (e.g., if the invention is a stand-alone application which may receive output from CAD programs), and is provided with known field values defined on at least one portion of the model. The known field values may be of one or more types, e.g., Dirichlet boundary conditions, Neumann boundary conditions, etc. To determine unknown field values in the model, each portion of the model's geometry which has known field values is converted to an implicit function which mathematically represents the portion's geometry. This may be done by resolving each portion of the model into its component geometric primitives whose logical combination defines the portion. Implicit functions may be defined for each primitive, and the implicit functions are then logically combined, preferably by use of R-functions, to obtain the implicit function which mathematically represents the portion's geometry.

Then, for each type of field value, an interpolating function is constructed from the field values belonging to that type of field value and from the implicit functions representing the portions of the geometry corresponding to that field value. As suggested by its name, the interpolating function interpolates the field values over the model's geometry, and it does so without the need for meshing. A composite implicit function is also constructed for each type of field value by combining the implicit functions representing the portions of the geometry corresponding to that field value. A solution structure for each type of field value may then be constructed from its interpolating function, its composite implicit function, and from predefined basis functions having unknown coefficients. If more than one type of field value exists, a combined solution structure, which combines the solution structures for the various types of field values, may be constructed by interpolating the solution structures for the different types using the composite implicit functions constructed for the different types. The resulting solution structure may then be processed by a solution procedure to determine the unknown coefficients of the basis functions, as by using one or more of the steps of differentiating, integrating, and/or algebraically solving for unknown coefficients within the solution structure (or portions thereof). Once the unknown coefficients are determined, they may be used to determine not only the field values (physical conditions) at the boundary of the model's geometry, but also its field values within the boundaries of the model's geometry. Thus, the invention supports mesh-free analyses of spatially distributed problems without requiring spatial discretization of the geometric domain and boundary conditions.

To summarize the invention in greater detail, a preferred method encompassed by the invention includes the following steps:

Supplying a geometric model to be analyzed;

Constructing implicit functions which mathematically represent the geometry, with these implicit functions taking zero values (or other discrete values) at specified locations on the geometry (as described later in this document in conjunction with Step 110 in FIG. 1);

Supplying the known boundary conditions (e.g., loads, temperatures, displacements, etc.) applicable on the geometric model (as described later in this document in conjunction with Step 120 in FIG. 1);

Utilizing the implicit functions and boundary conditions to construct a data structure for an interpolating function that interpolates the boundary conditions across portions of the geometry (as described later in this document in conjunction with Step 130 in FIG. 1);

Constructing a solution structure—a data structure representing classes of functions satisfying all boundary conditions, either exactly or approximately, on specified locations of the geometry—from the interpolating function, and from basis functions with undetermined coefficients (as also described elsewhere in conjunction with Step 130). The basis functions may or may not be associated with a grid (mesh), but importantly any such mesh does not need to conform to the given geometry;

Solving for the unknown coefficients which allow satisfaction of the differential equation of the problem, either exactly or approximately (as described later in this document in conjunction with Step 140 in FIG. 1);

Utilizing the now-known coefficients in the solution structure, and thereby solving for the field values within and upon the geometric model (as is also discussed in conjunction with Step 140).

In essence, the invention does not require conforming meshing by using special functions—solution structures—that can be automatically constructed directly from CAD system inputs (and/or inputs from other applications). The solution process can take advantage of the fact that the constructed solution structures can be automatically differentiated and/or integrated over geometric domains using known procedures. The engineering analysis problem is solved when all unknown coefficients in the solution structure are determined. A typical solution procedure requires differentiation and integration of the constructed functions over the geometric domain, as well as solving a system of algebraic equations. All of these steps may be carried out without meshing, or on a non-conforming mesh/grid (one which need not conform to the geometry).

As described elsewhere in this document, the invention may accommodate highly automated processing of boundary value problems defined on CAD geometric models in a wide variety of formats, including Constructive Solid Geometry (CSG) models, boundary representation (b-rep) models, and feature-based models. To enhance processing speed, the invention need not directly process the CAD geometric model, but may instead process an approximated representation of the CAD geometric model, e.g., a piecewise-smooth or triangulated model, or a similar approximation.

Several significant advantages are attained by the invention's ability to determine unknown field values without the need to define a geometry-dependent mesh. The arduous task of mesh definition over the geometry is avoided, leading to significant time and labor savings. Additionally, once the unknown field values are determined by the invention, a user may step back and modify/redefine the initially-known field values, and then re-solve for the unknown field values without the need to redefine a mesh on the geometry. The user may alternatively or additionally revise the geometric model and re-solve for the unknown field values, also without the need to redefine a mesh. The invention also allows newly-determined field values to be readily "recycled" as known field values, and then used to solve other unknown field values. As an example, in a problem wherein the objective is to determine unknown temperature field values—i.e., to determine the temperature field defined about the geometric model, based on some set of initially-defined field values—some or all of the values of the newly-determined temperature field might then be used (either alone or in combination with other known field values) to determine the mechanical stress or force field defined on the geometric model. When this is done, there is no need to define or reconfigure a mesh on the geometry to permit accurate solution of the stress/force field values. Alternatively, the newly-determined field values may themselves be utilized as a new geometric model, e.g., the isolines defined on the geometric model for some particular temperature may themselves be used to define the boundaries of a new geometric model. The new geometric model may then be processed by the invention to find further unknown field values, again without the need to redefine a mesh on the new geometry. Further, the invention may even start with undefined model geometry, and utilize desired model geometry characteristics as known field values. The invention can then solve for unknown model geometry field values to thereby define the overall geometry of the model, making the application highly useful in smoothing/fairing applications and other problems of geometric design.

The ability to solve for unknown field values without the use of meshing also makes the invention very useful in conjunction with other methods and apparata for solving for unknown field values, e.g., in finite element or finite difference techniques using meshing. In this instance, the prior mesh-dependent techniques can be used over regions of the geometry which are amenable to solution by use of the prior techniques, and those regions where prior methods are unworkable, inaccurate, or otherwise inappropriate can be utilized as the geometric model in the present invention.

The invention's ability to avoid meshing also leads to another significant (but subtle) advantage. Meshing requires breaking the geometry into separate elements, and the boundary value problem is then solved on these elements. In effect, the boundary value problem is not solved on the user's originally-defined geometry—it is solved on an approximation of the geometry. The discretization of the geometry can lead to artifacts which carry over into later stages of the design process. In contrast, the invention maintains and operates on the original user-specified geometry, making its results more readily useful since one does not need to take into account extra information and considerations introduced by the meshing process. The invention may be utilized as a feature within a CAD program, or as an add-on module which may receive output from, and/or provide output to, a CAD program. The invention, as well as its components and the steps/functions they perform, need not be situated in the same computer or other processing unit, and may be distributed over space. As an example, by use of the internet or other networked systems, a geometric model may be created or otherwise provided in one location; may be transmitted to another location for definition of corresponding implicit functions; and may then be transmitted to another location for determination of the unknown field values. This allows separate specialized databases and processing engines located in different areas to cooperatively provide the invention. For example, a CAD designer who does not have the resources and processing capability to accommodate the invention may forward a geometric model and known field values to a website which then implements the invention and forwards the results back to the designer.

Other important advantages of this invention over other known systems for modeling and analysis are that:

The invention can allow automatic construction of implicit functions which mathematically represent the geometry, and thus a user need not have a high degree of proficiency in mathematics and modeling to define a model that the invention can use. Instead, the invention may accommodate geometric models defined by standard applications (such as CAD software), and can automatically translate these models into forms usable by the invention;

The invention allows the construction of interpolating functions for boundary conditions where such boundary conditions are irregularly specified over the geometry;

The invention allows use of these interpolating functions to construct solution structures that no longer depend on any particular geometry-dependent mesh (or other spatial discretization of the geometry);

The invention allows all prescribed boundary conditions to be satisfied exactly (or approximately) on all boundary points;

The invention can allow automatic construction of solution structures satisfying all boundary conditions (exactly or approximately). The preferred embodiment does this by transfinite interpolation of boundary conditions over corresponding portions of the geometry (as represented by implicit functions, most preferably combined using R-functions), but other methods for constructing solution structures may be used;

The invention can eliminate the problematic and time-consuming need to spatially discretize a given geometry (e.g., generate a mesh);

Geometric models, prescribed boundary conditions, problem formulations (solution structures), and solution procedures can be changed easily and repeatedly, because they are no longer made dependent on any particular discretization scheme;

Because there is no mesh, the method significantly simplifies the modeling and solution of engineering analysis problems involving changing/moving geometries, interfaces, and boundary conditions, which are exceedingly difficult to solve with traditional mesh-based methods;

The invention is very useful for problems in optimization of geometric models, because (1) geometry can be changed easily and repeatedly (there is no need to redefine a mesh when the geometry changes), and (2) the computing sensitivity of the solution is greatly decreased because it does not depend on any particular mesh (i.e., the problem of solution inaccuracy owing to an inappropriately-defined mesh is obviated);

The invention significantly simplifies the problem of engineering data exchange and transfer (for example, over the internet), because no new approximations or representations (such as those generated by meshing) need to be created and transmitted during the modeling or solution procedure, a process which would greatly slow data exchange and transfer;

The invention is easy to implement with existing commercial geometric modeling and analysis systems (e.g., standard CAD software packages);

The invention may be used in conjunction with other known solution methods, including those utilizing meshing. For example, the invention may be used to supplement or complement finite element or finite difference methods, the partition of unity method, or other known methods, whether for comparison, refinement, or other purposes.

Further advantages, features, and objects of the invention will be apparent from the following detailed description of the invention in conjunction with the associated drawings.

BRIEF DESCRIPTION OF THE DRAWINGS

FIG. 23(a)–(c) illustrates the effect of changing the angle between the boundary of the trimming region and the line for each of the four line segments in the boundary representation of a rectangle, using simple trimming. FIGS. 23(d)–(f) show the same functions using normalized trimming.

FIG. 26(a) illustrates the conceptual design of a bracket with mechanical properties represented by parameters $\alpha_1$ through $\alpha_6$. FIGS. 26(b) and (c) illustrate potential designs (illustrated by isopotential surfaces) for the bracket.

DETAILED DESCRIPTION OF PREFERRED VERSION OF THE INVENTION

Figure 1:
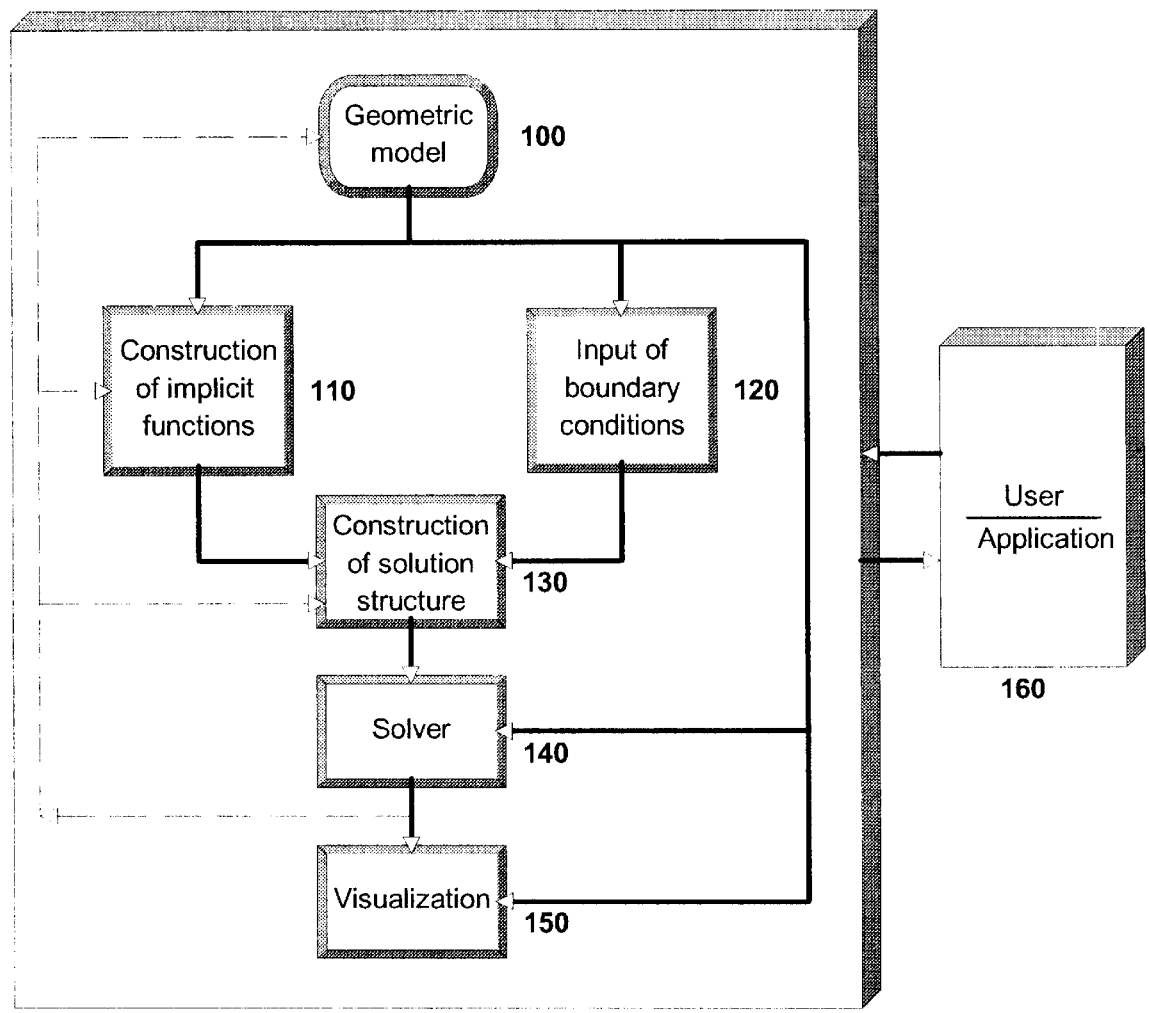
FIG. 1 is a flow diagram illustrating the overall architecture of an exemplary system for mesh-free modeling and analysis.

An exemplary meshfree method for engineering modeling and analysis includes the steps shown in FIG. 1. Throughout this document, it should be understood that the word function is used not only in its classical sense (i.e., to denote a relation between variables), but also to denote a data structure (e.g., a table, rule, character string, etc.), which is the manner in which a classical function may be represented on a computer. In other words, it should be kept in mind that the invention will generally be implemented on an electronic processing device such as a computer, an application-specific circuit, or the like, in which case data structures will be used to implement the functions described herein. A function is called implicit for a given set of points if it implicitly defines a set of points by virtue of being equal to some particular value (usually zero) on these points and nowhere else.

An engineering analysis problem begins with a geometric model (100)—i.e., a set of geometric data relating to an object, which may be a real-world object (e.g., an existing component) or a hypothetical object (e.g., a design concept). The geometric model may be directly input into the invention by a user, transferred from another modeling system, or computed as the result of a prior engineering analysis. Other input data for the engineering analysis problem are boundary conditions (120) that are attached or associated with parts of the geometric model. The term "boundary conditions" is a standard mathematical term that refers to various known and specified quantities relating to parts of the geometric model, including (but not limited to) fixed positions or sizes, displacements, loads, stresses, temperatures, magnetic fluxes, heat fluxes, velocities, charge distributions, and so on. The purpose of most engineering analyses is to compute these and related quantities everywhere, i.e., to compute field values on all points of the geometric model, including all points of the input geometry where these desired quantities are not known, whether this is at the boundary or inside the geometric model. Traditionally, computations for field values are performed by breaking up the input geometry into conforming pieces having regularized shapes (a process known as "meshing").

In the invention of this document, a different approach is taken and a global solution structure (130) is constructed for the whole boundary value problem. The solution structure is a data structure representing the general form of the solution for the engineering analysis problem at hand such that the solution (1) satisfies all the specified boundary conditions exactly or approximately, and (2) contains a representation of some known functions (sometimes called basis or coordinate functions) with undetermined coefficients. The solver (140) follows a standard sequence of steps to choose the values of these coefficients so that the solution of the specified engineering analysis problem is approximated. Once the values for the coefficients are determined and substituted in the solution structure, the solution structure becomes the solution to the specified problem—that is, it defines the field values over the remainder of the geometry. The functions representing the field can then be visualized (150) (e.g., tabulated, displayed numerically or graphically, etc.), or used as an input for further analysis.

One important feature which is preferably implemented in the invention is a fully automatic method for constructing solution structures. This method is implemented by representing geometric elements having boundary conditions by implicit functions (110).

The implicit functions (110) can be constructed automatically from the given geometric model (100) and stored as part of the solution structure (130) in a manner described later in this document. The solution process of the solver (140) repeatedly differentiates, integrates, and/or algebraically solves for unknown coefficients within the solution structure using standard numerical techniques, according to instructions from the user or software application (160) (or from another portion of the invention providing the parameters for the solution procedure). These coefficients may then be used to generate the unknown field values of interest.

Each of the individual steps of FIG. 1 will now be described in detail.

Step 100: Input of a Geometric Model

The geometric model (100) can be represented in a variety of forms, including those commonly used in standard commercially available modeling systems, e.g., Pro/Engineer (Parametric Technology, Waltham, Mass.), SDRC Ideas (Structural Dynamics, Milford, Ohio), Unigraphics/Parasolid (Unigraphics Solution, Maryland Heights, Mo.), AutoCad (Autodesk, San Rafael, Calif.), ACIS (Spatial Technology, Boulder, Colo.), and so on. Representations may include boundary representations (B-Reps); Constructive Solid Geometry (CSG) representations; drawings (e.g., CAD vector drawings); cell complexes; sweeps; or other piecewise continuous geometric representations. Further, the geometric model (100) can be two-dimensional or three-dimensional.

Step 110: Construction of Implicit Functions for the Geometric Model

The geometric model is then represented implicitly by functions, called for brevity "implicit functions". Defined generally, an implicit equation relates two or more variables such that for any value of one variable, there are values of the others which make the equation true; thus, the one variable is defined as a function of the others. In the context of the invention, an implicit function is a function $f(x_1, x_2, \ldots, x_n)=y$ that takes on zero values at desired locations in space; in other words, the zero set of the function implies the geometry of the defined set of points making up the geometric model. (Alternatively, y values other than zero can be used for such implicit functions, though a zero value is preferable as a matter of simplicity and will be used throughout this document.) The implicit functions therefore define the geometric model (or portions thereof) by having points within the model and/or its boundary take a zero value and points outside the model take other discrete values. The preferred embodiment of the invention uses the theory of R-functions to construct implicit functions, but other functions can also be used to create implicit functions (as shown, e.g., in J. Bloomenthal, *Introduction to Implicit Surfaces*, Morgan Kaufmann Publishers, 1997). So that the construction of implicit functions is better understood, the theory of R-functions will now be briefly summarized.

Theory of R-functions

A real-valued function $f(x_1, x_2, \ldots, x_n)$ is called an R-function if its sign is completely determined by the signs of its arguments $x_i$. If the sign of a function is considered to be a logical property, negative values of a function can be considered to correspond with logical FALSE, and positive values can be considered to correspond with logical TRUE. In other words, an R-function $f$ works as a Boolean switching function, changing its sign only when its arguments change their signs; it can be regarded as "on" or "off" (or "true" or "false") depending on the values of the input variables. For example, the function xyz can be negative only when the number of its negative arguments is odd. As another example, $\min(x_1, x_2)$ is an R-function whose companion Boolean function is logical "and" (Λ) (logical conjunction), and $\max(x_1, x_2)$ is an R-function whose companion Boolean function is logical "or" (V) (logical disjunction). This is seen in that function $\min(x_1, x_2)$ takes on positive values only when $x_1$ AND $x_2$ are positive; similarly function $\max(x_1, x_2)$ takes on positive values when $x_1$ OR $x_2$ are positive.

A large number of R-functions are known and catalogued (see, e.g., V. L. Rvachev, *Theory of R-functions and Some Applications*, Naukova Dumka, 1982; V. Shapiro and I. Tsukanov, Implicit functions with guaranteed differential properties, *Fifth ACM Symposium on Solid Modeling and Applications*, Ann Arbor, Mich., 1999), and have been assigned unique names such as $R_\alpha$, $R_0^m$, $R_p$, and the like depending on their nature and properties. To illustrate, the R-function $R_\alpha$ is defined by:

$$R_\alpha : f = \frac{1}{1+\alpha}\left(x_1 + x_2 \pm \sqrt{x_1^2 + x_2^2 - 2\alpha x_1^2 x_2^2}\right) \qquad (1)$$

where $\alpha(x_1, x_2)$ is an arbitrary function such that $-1 < \alpha(x_1, x_2) \leq 1$. The precise value of $\alpha$ may or may not matter, and often it can be set to a constant. For example, setting $\alpha=1$ yields the functions min and max respectively, but setting $\alpha=0$ results in functions $V_0$ and $\Lambda_0$ that are analytic everywhere (i.e., can be represented by a convergent Taylor series), except when $x_1=x_2=0$.

As another example, consider the R-function $R_0^m$:

$$R_0^m : f = (x_1 + x_2 \pm \sqrt{x_1^2 + x_2^2})(x_1^2 + x_2^2)^{m/2}, \qquad (2)$$

where m is any even positive integer. This function is also analytic everywhere except at the origin $x_1=x_2=0$, where it is m times differentiable.

Similarly, for the R-function $R_p$:

$$R_p: f = x_1 + x_2 \pm (x_1^p + x_2^p)^{1/p} \quad (3)$$

the function is analytic everywhere for any even positive integer p.

In the foregoing expressions, choosing the (+/−) sign of arguments determines the type of R-function: (+) corresponds to R-disjunction (Boolean "or"), and (−) gives the corresponding R-conjunction (Boolean "and") of the real-valued arguments x and y.

Similarly to Boolean functions, R-functions are closed under composition, which means that a combination of several R-functions is another R-function which corresponds to a more complex logical expression. Thus, just as any logical function can be written using only three operations ¬(logical negation or NOT), V (logical disjunction or OR), and Λ (logical conjunction or AND), three corresponding R-functions can be combined into a corresponding R-function. Expressed another way, for every formal logical sentence (i.e., for every Boolean function), one may construct a corresponding R-function using R-conjunction, R-disjunction, and R-negation, whose sign is determined by the truth table of the logical sentence. For nonzero arguments, the negation (¬) operation is usually accomplished by changing the sign of the R-function. The logical disjunction Λ and conjunction V operations can respectively be accomplished in the usual case by performing intersection and union operations. Depending on the particular form of the R-conjunction, R-disjunction, and R-negation chosen to construct the corresponding R-function (i.e., depending on the "family" $R_0^m$, $R_p$, etc. from which the R-functions are chosen), a rich variety of differential properties may be obtained.

Using R-functions to Define the Model: Introduction

Geometric models are generally defined in terms of a combination of "primitive" geometric regions (e.g. regions defined by a system of inequalities). For example, in a geometric model defined in terms of a CSG representation, the model is defined by a Boolean combination of primitive shape elements (which are themselves each defined by a combination of halfspaces, i.e., spaces bounded by infinite planes having positive value on one side and negative value on the other). In the context of geometric modeling, the logical operations of Λ and V correspond to standard set operations on halfspaces and can be used to combine the halfspaces to define models. For example, if $f_1 \geq 0$ and $f_2 \geq 0$ are two primitive halfspaces within a model, they can be combined using any appropriate R-functions; the set of points corresponding to the intersection of the two primitive inequalities can be expressed as $f_1 \Lambda f_2 \geq 0$, and the set of points corresponding to the union of the inequalities can be expressed as $f_1 V f_2 \geq 0$. Therefore, given any Boolean set expression combining primitives which are defined by inequalities, a simple syntactic substitution of R-functions for the Boolean operands results in a single composite implicit function and an inequality defining the combined primitives. This allows any object defined by a combination of primitive geometric regions to also be represented by a single composite implicit mathematical function ω which can be evaluated, differentiated, and integrated, and which possesses many other analytically useful properties. In particular, given a geometric domain Ω for the object, with boundary ∂Ω:

An implicit function S can be constructed in a "logical" fashion—e.g., by simply combining the functions defining the primitive regions of the geometric domain Ω with R-functions—such that ω=0 defines the boundary ∂Ω, and such that the boundary can be modified by varying the parameters/coefficients within ω.

The implicit function S can be normalized, in which case it behaves as the distance function near the boundary ∂Ω of the object (its value varies with respect to the distance from the boundary), and as a smooth approximation to the distance function away from the boundary ∂Ω of the object. More precisely, the implicit function ω is called normalized up to the m-th order when the following conditions are satisfied:

$$\omega|_{\partial \Omega} = 0; \quad \left.\frac{\partial \omega}{\partial v}\right|_{\partial \Omega} = 1; \quad \left.\frac{\partial^k \omega}{\partial v^k}\right|_{\partial \Omega} = 0; \quad k = 2, 3, \ldots, m \quad (4)$$

where v is the inner normal (perpendicular) to the boundary ∂Ω of domain Ω, and k is the order of the derivatives.

The implicit function ω can be used for modeling various complex physical phenomena related to the domain, e.g., to define time-varying geometry for the domain, by varying the parameters/coefficients within ω (as previously noted).

Differential Properties of Composite Implicit Functions

Figure 2:
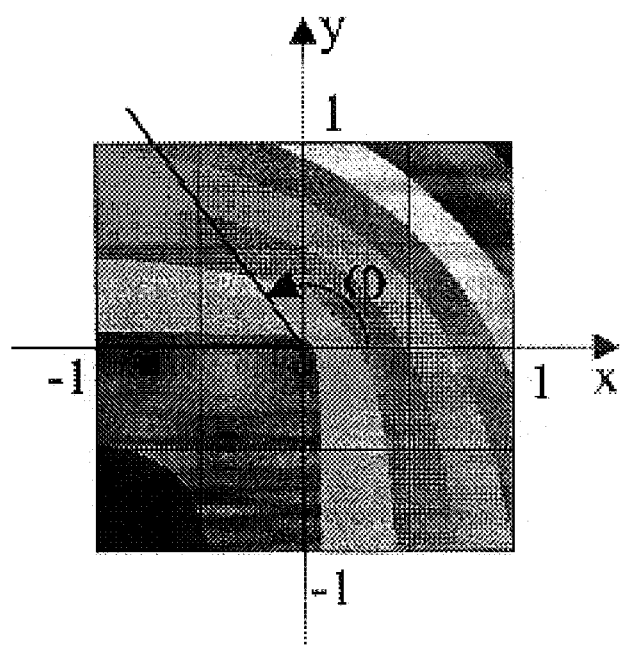
FIG. 2 illustrates (a) isolines of $R_0$-disjunction; and (b) the union of two orthogonal linear halfspaces.
Figure 2:
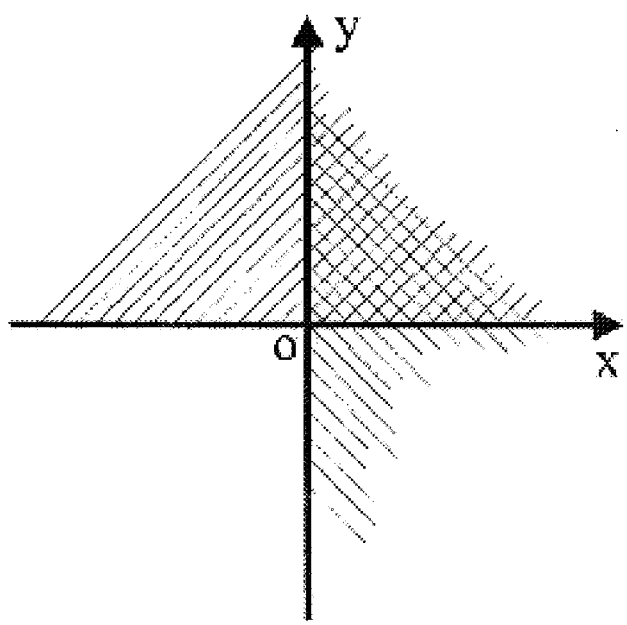
Figure 3:
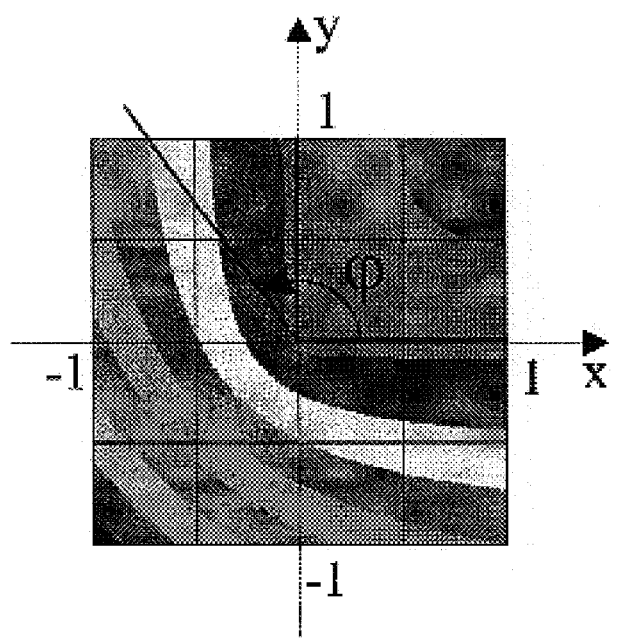
FIG. 3 illustrates (a) isolines of $R_0$-conjunction; and (b) the intersection of two orthogonal linear halfspaces.
Figure 3:
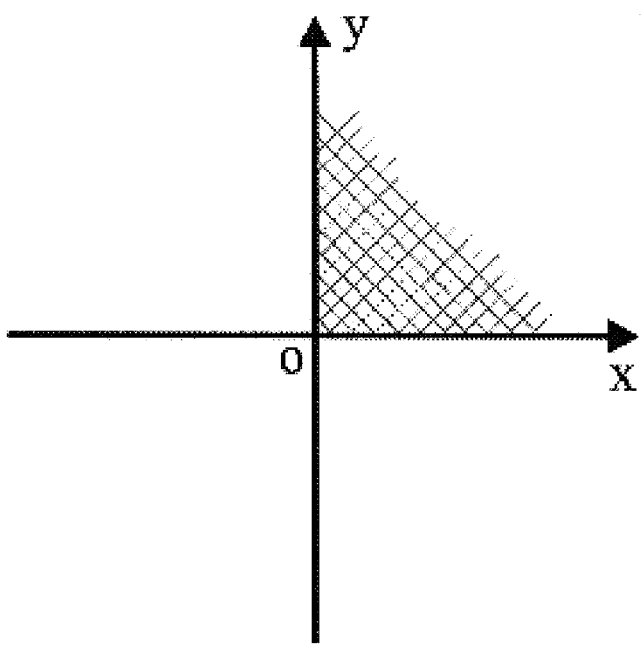

Once the composite implicit function is constructed (i.e., once the implicit function ω is constructed for the boundary of the geometric domain in question), its differential properties are determined by the differential properties of the primitives and the choice of R-functions used to combine those primitives. Consider the simple situation when $f_1=x$ and $f_2=y$. In this case, the inequalities $xVy \geq 0$ and $x\Lambda y \geq 0$ respectively define the regions of the union of the two orthogonal linear halfspaces (illustrated in FIG. 2(b)) and the intersection of the two halfspaces (illustrated in FIG. 3(b)). The differential properties of R-functions imply that in both cases the constructed composite implicit functions are differentiable everywhere in and on the boundary of the two domains, except at the corner point. Furthermore, since both x=0 and y=0 are normal equations of the coordinate axes, normalization of the composite implicit function is completely determined by the properties of the R-functions Λ and V.

Differential properties of functions of the form $f(h_1, h_2)$, where $f$ is any R-function and $h_1(x,y)$ and $h_2(x,y)$ are arbitrary smooth normalized functions, can be observed through a simple coordinate transformation:

$$x \rightarrow h_1(x,y); \quad y \rightarrow h_2(x,y) \quad (5)$$

Then the partial derivatives of the composite implicit function are given by the Jacobian transformation:

$$\begin{pmatrix} \frac{\partial f}{\partial x} \\ \frac{\partial f}{\partial y} \end{pmatrix} = \begin{pmatrix} \frac{\partial h_1}{\partial x} & \frac{\partial h_2}{\partial x} \\ \frac{\partial h_1}{\partial y} & \frac{\partial h_2}{\partial y} \end{pmatrix} \begin{pmatrix} \frac{\partial f}{\partial h_1} \\ \frac{\partial f}{\partial h_2} \end{pmatrix} \quad (6)$$

where the partial derivatives $$\frac{\partial f}{\partial h_i}$$

of R-function $f$ depend on the chosen system of R-functions. Thus, the magnitude of the gradient of $f(x,y)$ at any point (x, y) is a scalar multiple of the gradient of the corresponding R-function $f(h_1,h_2)$. The Jacobian transformation of expression (6) preserves normalization of the function $f$ on boundaries of halfspaces $h_1=0$ and $h_2=0$. For example, $$\text{if } h_1 = 0, \text{ then } \frac{\partial f}{\partial h_1} = 1, \quad \frac{\partial f}{\partial h_2} = 0,$$

and consequently $$(\nabla f)^2_{|h_1=0} = \left(\frac{\partial f}{\partial h_1}\frac{\partial h_1}{\partial x} + \frac{\partial f}{\partial h_2}\frac{\partial h_2}{\partial x}\right)^2 + \left(\frac{\partial f}{\partial h_1}\frac{\partial h_1}{\partial y} + \frac{\partial f}{\partial h_2}\frac{\partial h_2}{\partial y}\right)^2 = \qquad (7)$$

$$\left(\frac{\partial h_1}{\partial x}\right)^2 + \left(\frac{\partial h_1}{\partial y}\right)^2$$

Because $h_1$ is normalized on the line $h_1=0$, one obtains $(\nabla f)_{|h_1}^2=1$. Results are similar for $h_2=0$.

Other differential properties of individual R-functions are also inherited by the composite implicit functions. In particular, if $f$ is an $R_0$-function or $R_p$-function, then the composite implicit function is analytic everywhere except the corner points, and the normalization of $h_1$ and $h_2$ is preserved to the corresponding order on all points where only one of $h_1=0$.

Using R-functions to Define the Model: More Complex Models (Extension to Numerous Halfspaces and to Three Dimensions)

Figure 4:
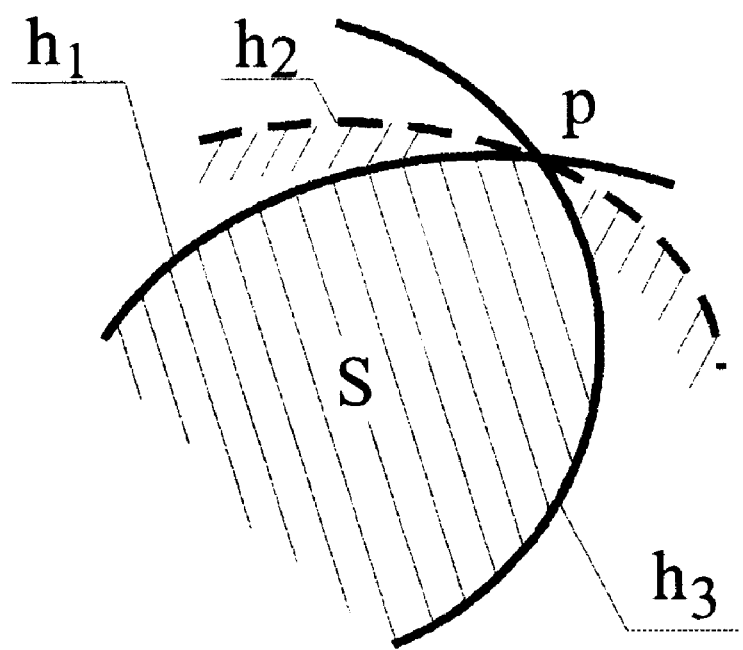
FIG. 4 illustrates a situation where halfspace $h_2$ does not contribute to the boundary of the domain, and also does not affect the differential properties of the composite implicit function.

In a more general situation where complex geometric models are being considered, they will need more than two primitives (i.e., more than two halfspaces) for a full definition of the model. Extension of the foregoing discussion to multiple primitives is straightforward. Suppose the boundaries of n halfspaces $h_i$ intersect at a single point p and are combined by some R-function $f(h_1, h_2, \ldots, h_n)$ to define a planar region S. If S is homogeneous in dimension in the neighborhood of p, then some even number of boundaries $\partial h_i$ forms the boundary of S while the rest of them do not contribute to the boundary (see FIG. 4). The properties of R-functions imply that those halfspaces that do not contribute to the boundaries of the region S have no effect on the differential properties and magnitudes of derivatives at regular points of the boundary of S.

Similarly, generalization to higher dimensions (i.e., geometric models in greater than two dimensions) is straightforward. When a number of three-dimensional halfspaces $h_i$ are combined by an R-function $f(h_1, h_2, \ldots, h_n)$, then the smoothness and normalization properties on all regular points of the halfspace boundaries are assured by the choice of the R-functions used in the composite implicit function. If two or more surfaces (boundaries of halfspaces) intersect along some curve C, then taking a normal planar section at every point of C yields the two-dimensional situation described above. The behavior of the composite implicit function is naturally extended to the vertex $\mu$ defined by the intersection of three or more surfaces, where it is either m times differentiable in the case of an $R_0^m$-function, or in the case of $R_0$- and $R_p$-functions, has discontinuities in derivatives with bounded magnitude depending on the direction in the neighborhood of v.

Figure 5:
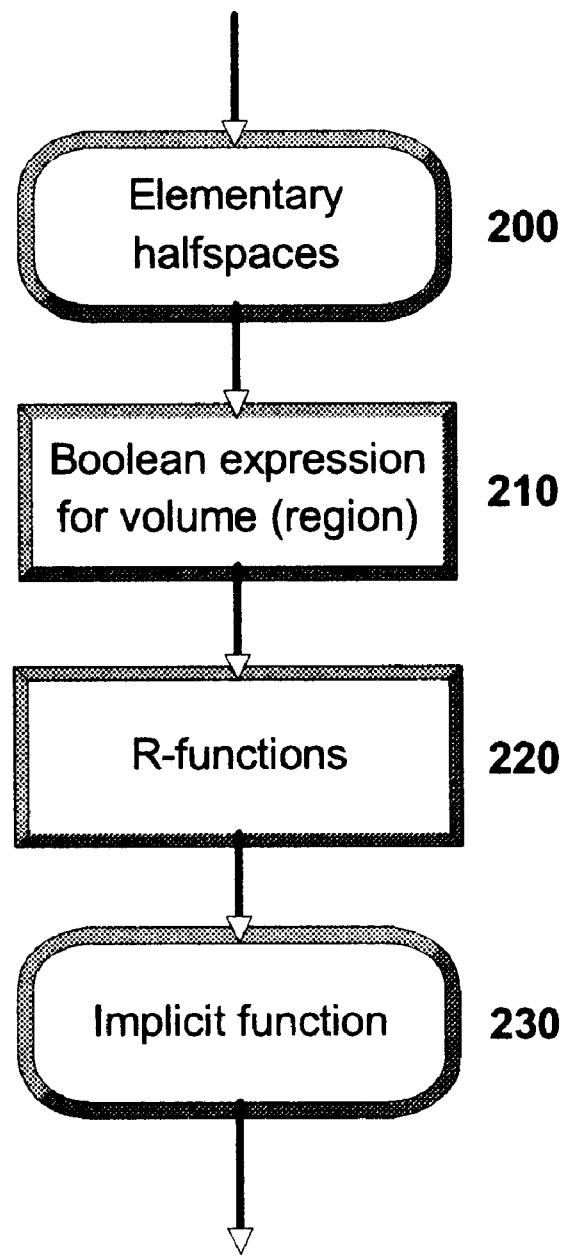
FIG. 5 is a flow diagram illustrating the steps involved in the construction of the composite implicit function for a volume/region.

Taking into account the foregoing discussion, the step 110 of FIG. 1 is illustrated in further detail by the steps of FIG. 5. An composite implicit function $\omega$ may be constructed for a geometric model, e.g., a CSG representation of an object, by use of the following steps:

Step 200: Input elementary halfspaces (inequalities) which define the geometric domain $\Omega$ (the region or volume) in question. Most preferably, the halfspaces have a zero value on their boundaries $\partial\Omega_i$, a positive value on the side of interest (i.e., within their domain $\Omega_i$), and negative value on the other side of the plane (i.e., outside their domain $\Omega_i$).

Step 210: Construct the Boolean expression for the domain $\Omega$, assembling the halfspaces $\Omega_i$ so that points inside the domain $\Omega$ are TRUE and points outside the domain $\Omega$ are FALSE.

Step 220: Syntactically substitute the Boolean operators with corresponding R-functions.

Step 230: The output is the composite implicit function $\omega$ for the geometric domain $\Omega$ in question (the volume or region in question). If constructed using the preferred halfspaces noted above (having zero value at the boundary, positive interior, negative exterior), the composite implicit function $\omega$ is positive inside the domain, negative outside, and has zero value on the boundary.

Implicit Functions for Trimmed Curves and Surfaces: Simple and Normalized Trimming Geometric models containing trimmed curves and surfaces—that is, portions of bounded or unbounded curves/surfaces contained within some defined region (called the trimming region)—present special challenges when constructing implicit functions for the models. Every trimmed curve or surface can be constructed by some sequence of set operations on unbounded primitives, and thus it would seem that they too can be described by implicit functions. Consider the construction for a semi-infinite curve, represented as an unbounded curve $h(x,y)=0$ trimmed by a halfspace $x \geq 0$:

$$(-h^2 \geq 0) \cap (x \geq 0), \text{ or } f = (-h^2) \wedge x \geq 0 \qquad (8)$$

The trimmed function $f$ (special case of a composite function) is negative everywhere, except at the points on the trimmed curve where it is zero. For R-function families $R_1$, $R_0$, and $R_p$, it is analytic everywhere except at the origin, where the magnitudes and directional properties of discontinuities of derivatives can be estimated using known methods (e.g., those described in V. Shapiro and I. Tsukanov, Implicit functions with guaranteed differential properties, Fifth ACM Symposium on Solid Modeling and Applications, Ann Arbor, Mich., 1999). The function is not normalized, and its normal derivatives are zero on all points along the curve. However, when h is normalized, the normalized composite function f can be obtained (as shown, e.g., in V. L. Rvachev, *Theory of R-functions and Some Applications*, Naukova Dumka, 1982 at p. 195) as:

$$f_1 = \sqrt{-f} = \sqrt{-((-h^2) \wedge x)}. \qquad (9)$$

Figure 6:
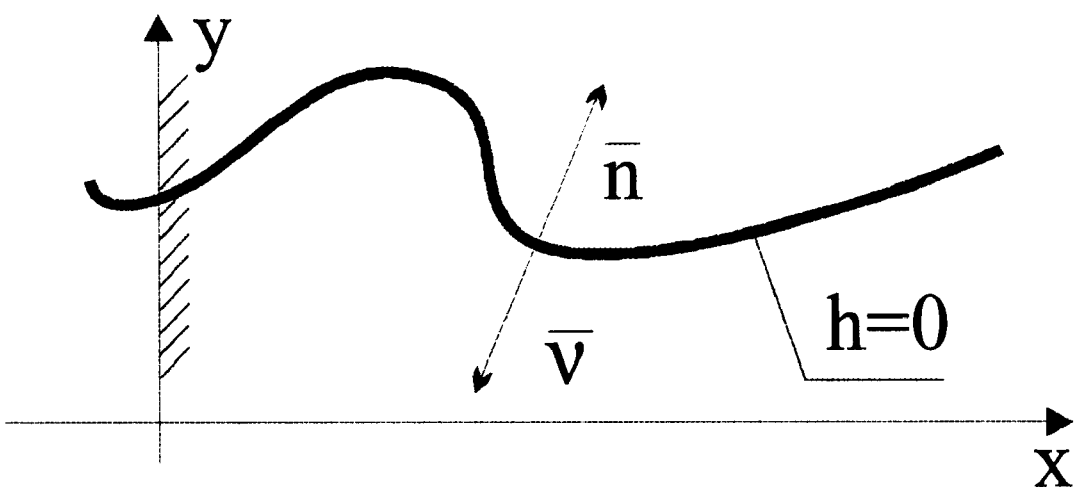
FIG. 6 illustrates the opposite normal vectors of a trimmed curve.

It should be clear that $-f_1 \geq 0$ defines the same set of points because it preserves the zero and the negative points of $f$. The function defined by expression (9) is not differentiable on the points of the trimmed curve, but is analytic everywhere else. Furthermore, $f_1$ is normalized on both sides of the curve along the opposite normal vectors $\bar{n}$ and $\bar{v}$, which are shown in FIG. 6.

Because trimming relies on R-conjunction, any resulting function will exhibit rapid changes in gradient magnitude near the end point where trimming occurs. Moreover, the square root in expression (9) implies that $$\frac{\partial f_1}{\partial x} \to \infty \text{ as } x \to 0$$

when approaching the end point from outside of the trimming halfspace. This type of anomaly can be observed in isolines—see FIG. 7(a)—of a function $f_1$ defining the positive portion of the x-axis (i.e., h=y). (Isolines of implicit functions, or their three-dimensional analogues isosurfaces, A are the sets of points where the corresponding implicit function has the same values. They therefore allow visualization of the character of the function. Isolines and isosurfaces are also known as implicit curves or implicit surfaces.) This can be remedied utilizing a technique known as "normalized trimming," which allows normalization of the resulting function in all directions near the end point. Consider two primitive implicit functions $\omega_1$ and $\omega_2$ in the neighborhood of the point shown in FIG. 8, such that $\omega_1$ gives distance from any point p to the line $L_1$; $\omega_2$ is identically zero in region $\Omega_1$ and behaves as a distance function to the line $L_2$ in $\Omega_2$. Here, $L_2$ is the local boundary of the trimming halfspace and $L_1$ is the curve being trimmed. If functions $\omega_1$ and $\omega_2$ are normalized to the first order, then the trimmed implicit function $$\omega = \sqrt{\omega_1^2 - \omega_2^2} \tag{10}$$

defines the Euclidean distance from any point to the trimmed halfline (V. L. Rvachev, *Theory of R-functions and Some Applications*, Naukova Dumka, 1982). If a function $\omega_2^*$ that describes the trimming region by the inequality $\omega_2^* \geq 0$ is constructed using R-functions, then it is easy to construct the desired function $\omega_2$:

$$\omega_2 = \frac{|\omega_2^*| - \omega_2^*}{2} \tag{11}$$

Substituting this expression into expression (10) results in the trimmed implicit function:

$$\omega = \sqrt{\omega_1^2 + \frac{(|\omega_2^*| - \omega_2^*)^2}{4}} \tag{12}$$

Figure 7:
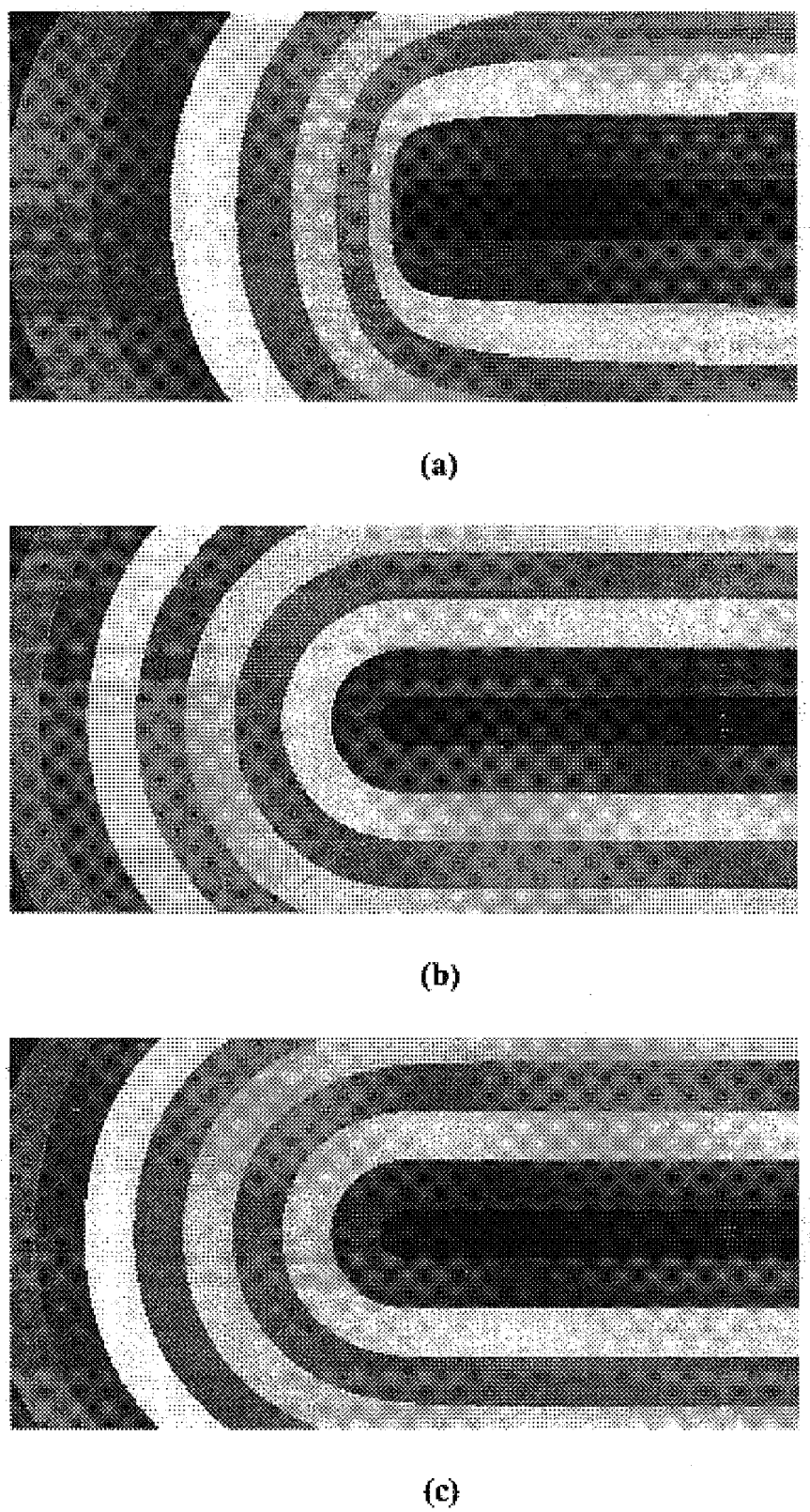
FIG. 7 illustrates the isolines of functions for the trimmed halfline shown in FIG. 8 utilizing (a) simple trimming; (b) normalized trimming with 2nd order discontinuity; and (c) normalized smooth trimming.

The isolines of o defining the positive x-axis, with $\omega_1=y$ and $\omega_2^*=x$, are shown in FIG. 7(b). Though not visible in the plot of FIG. 7(b), this construction leads to discontinuous second derivatives on the line where $\omega_2^*=0$. This can be remedied by modifying the construction for $\omega_2$ as follows:

$$\omega_2 = \frac{\sqrt{(\omega_2^*)^2 + \omega_1^4} - \omega_2^*}{2} \tag{13}$$

(This approach is discussed, e.g., in V. L. Rvachev, *Theory of R-functions and Some Applications*, Naukova Dumka, 1982.) Then expression (10) can be rewritten as follows:

$$\omega = \sqrt{\omega_1^2 \frac{\left(\sqrt{(\omega_2^*)^2 + \omega_1^4} - \omega_2^*\right)^2}{4}} \tag{14}$$

which gives the trimmed implicit function for the trimmed curve that is normalized in any normal direction in the neighborhood of the end point of the curve. The isolines of this function are shown in FIG. 7(c).

Figure 8:
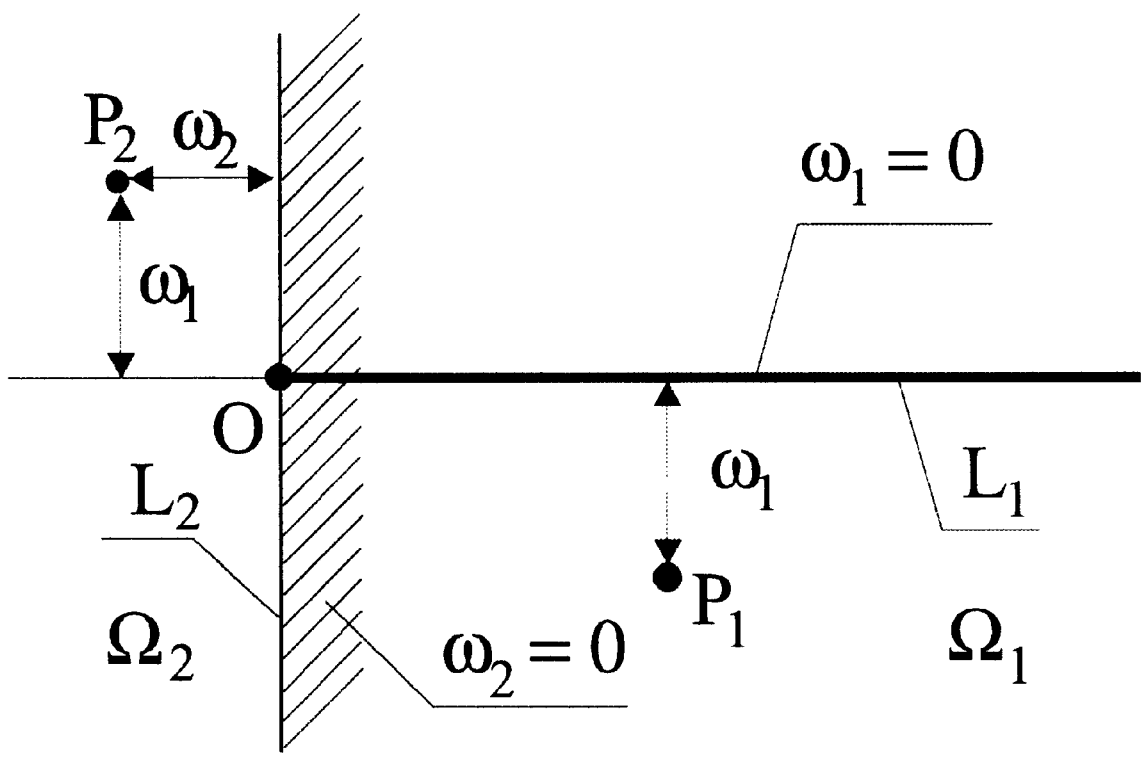
FIG. 8 illustrates the normalized trimming of a curve.
Figure 9:
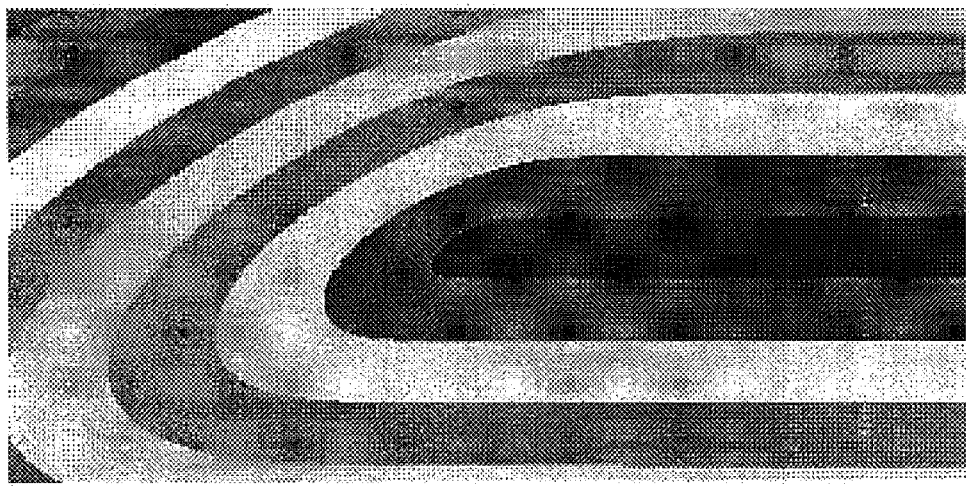
FIG. 9 illustrates (a) the influence of non-orthogonality of lines $L_1$ and $L_2$ at point 0 (FIG. 8); (b) the result of orthogonalization as per expression (15) in the Detailed Description portion of this document.
Figure 9:
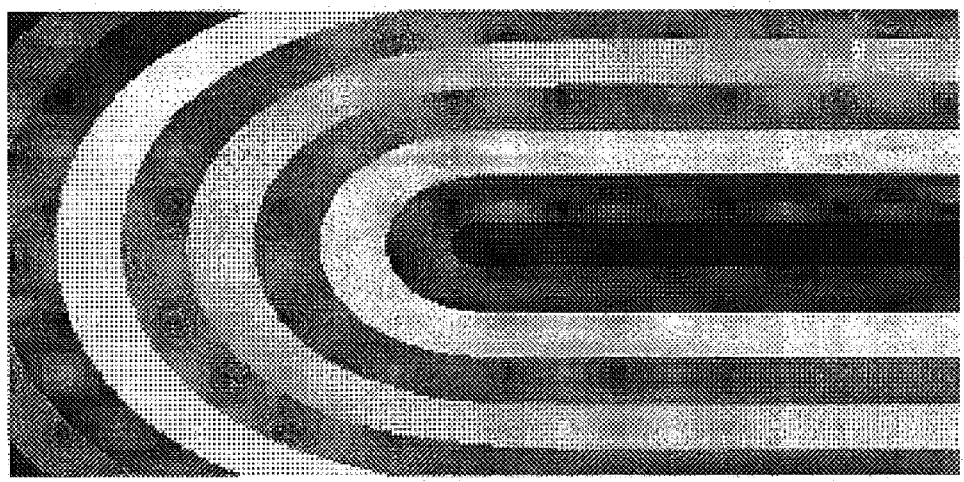

Normalized trimming provides normalization only if the lines $L_1$ and $L_2$ are orthogonal at their intersection point; otherwise, expression (10) no longer gives the Euclidean distance to the point 0 (see FIG. 8). For example, FIG. 9(a) shows the loss of normalization at the end point when the x-axis is trimmed by a linear halfspace inclined at 45°. When normalization is important, it can be restored at non-orthogonal intersections by orthogonalizing lines $L_1$ and $L_2$ at their intersection point. For example, replacing function $\omega_2^*$ with $$\omega_2^{**} = \omega_1 \nabla \omega_2^* \cdot \nabla \omega_1 \tag{15}$$

provides normalization even for non-orthogonal intersections (as discussed in V. L. Rvachev, *Theory of R-functions and Some Applications*, Naukova Dumka, 1982), as illustrated in FIG. 9(b).

All of the above constructions generalize to other cases in a straightforward fashion. For example, let h(p)=0 be an equality describing an unbounded entity (curve or surface), and let $\phi(p) \geq 0$ define the trimming region containing some portion of the unbounded entity. Then the trimmed entity is given by the intersection of the unbounded entity and the trimming region, and is defined by the inequality $$f = -\sqrt{-((-h^2)\wedge -\phi)} \geq 0. \tag{16}$$

The trimmed function $f$ is zero on points of the trimmed entity, and is strictly negative everywhere else. Normalized trimming (possibly with orthogonalization) may also be applied if desired.

The differential properties of the trimmed implicit function are determined by the differential properties of h and $\phi$ and the trimming method. In particular, if h and $\phi$ are both smooth and normalized, then $f$ is also smooth everywhere and normalized on all points of the trimmed entity, except at the "border" points lying on the boundary of the trimming region. Notice that a Boolean representation of the trimming region can be trivially translated into a single inequality $\phi \geq 0$ by syntactic substitution of R-functions for the Boolean set operations. The differential properties of $\phi$ may then be determined (as described, e.g., in V. Shapiro and I. Tsukanov, Implicit functions with guaranteed differential properties, *Fifth ACM Symposium on Solid Modeling and Applications*, Ann Arbor, Mich., 1999).

Figure 10:
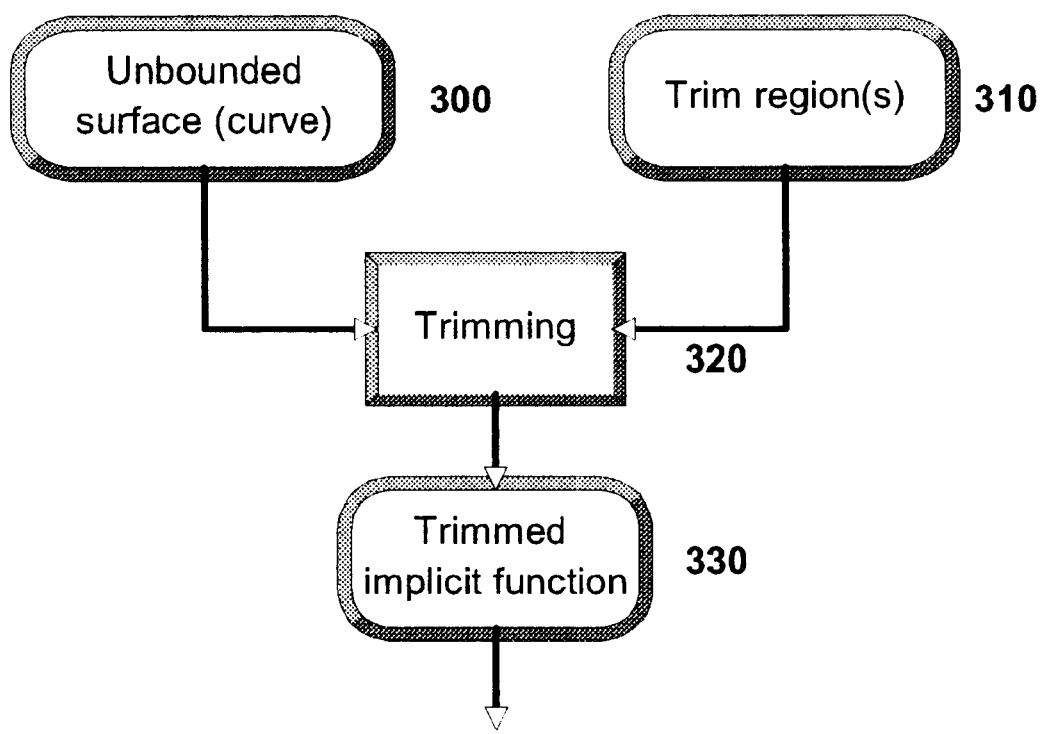
FIG. 10 is a flow diagram illustrating the steps involved in the construction of the implicit function for a trimmed surface (curve).

In summary, the construction of trimmed implicit functions for trimmed surfaces or curves can be achieved as shown in FIG. 10, by combining the equation of the unbounded (or bounded) surface or curve and the inequality defining the trimming volume/region:

Step 300: Input the equation of the curve or surface.

Step 310: Input the equation of the trimming region or volume.

Step 320: Trim by combining the function for the curve/surface with the function defining the trimming region/volume. Simple trimming given by expression (9), normalized trimming specified by expression (14), or other forms of trimming may be used.

Step 330: The output is the trimmed implicit function for the trimmed curve/surface. The trimmed implicit function is positive (or negative) everywhere, except at the boundary, where it takes zero value.

Figure 11:
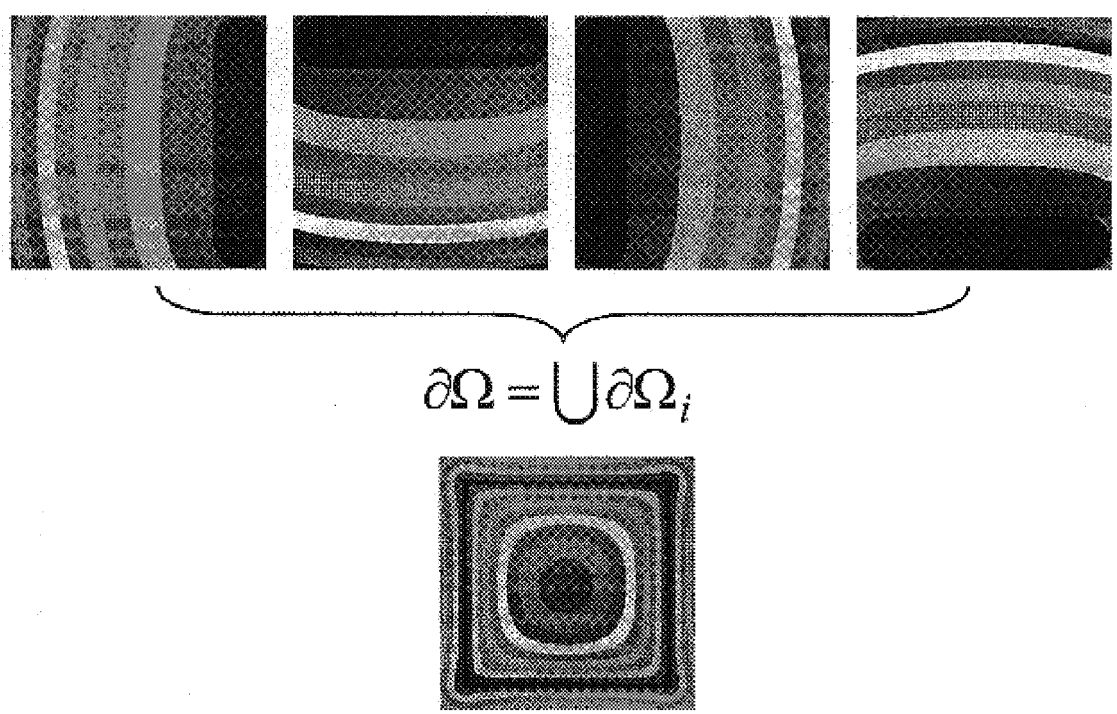
FIG. 11 illustrates the "gluing" (composition) of the primitive implicit functions for pieces of boundary into one composite implicit function.

The foregoing discussion is not limited to planar/linear boundaries. As with planar/linear boundaries, different sections of curvilinear/curved boundary can be joined in one composite implicit function by applying an R-conjunction or R-disjunction to the primitive implicit functions for each piece of the boundary (as illustrated in FIG. 11, wherein the R-conjunction of the pieces $\partial \Omega_i$ is shown).

Constructing Implicit Functions from CSG (Constructive Solid Geometry) and Boundary Representation (B-Rep) Models In engineering analyses, geometric models are usually provided in the form of CSG or boundary representations. The foregoing discussion applies to CSG geometric models in straightforward fashion. The corresponding composite implicit function is obtained by a syntactic substitution of the desired R-functions for the set operations in the CSG combination of primitives (and their halfspaces). The resulting function will inherit the properties of the CSG primitives and the R-functions being used in the substitution. In particular, using $R_0^m$-functions will ensure that the constructed functions are differentiable id everywhere, including edges and vertices. If all primitives are represented by normalized functions and combined using $R_p$- or $R_0$-functions, the resulting composite implicit function will also be normalized and analytic everywhere except the edges and vertices of the three-dimensional solid.

The same principles generally hold true for geometric models provided as boundary representations (i.e., for B-Rep models). A boundary representation can be converted to a CSG representation using known techniques (e.g., those described in V. Shapiro and D. L. Vossler, Construction and optimization of CSG representations, *Computer-Aided Design*, 23(1):4–20, January/February 1991; V. Shapiro and D. L. Vossler, Efficient CSG representations of two-dimensional solids, *Transactions of ASME, Journal of Mechanical Design*, 113:292–305, September 1991; V. Shapiro and D. L. Vossler, Separation for boundary to CSG conversion, *ACM Transactions on Graphics*, 12(1):35–55, January 1993). Once this is done, composite implicit functions can then be constructed in accordance with the foregoing discussion.

Figure 19:
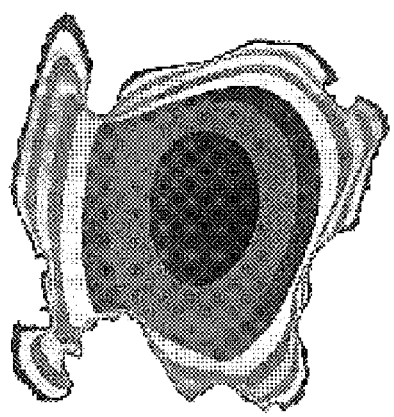
FIG. 19 illustrates (a) the isolines of a composite implicit function derived from a CSG representation; (b) the isolines of a composite implicit function constructed from a boundary representation (B-rep) using simple trimming for each edge; (c) the isolines of a composite implicit function derived from a boundary representation using normalized trimming for each edge.
Figure 19:
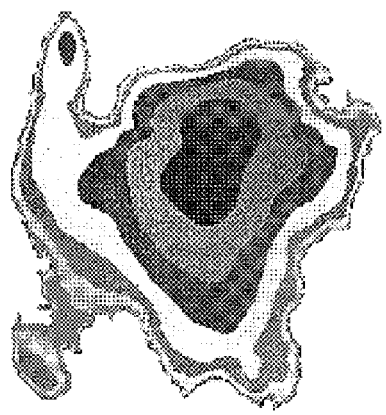
Figure 19:
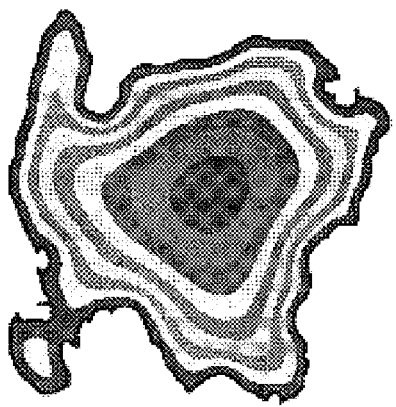

Alternatively, the desired implicit functions may be also constructed directly from a boundary representation model. The procedure for constructing a trimmed implicit function for an individual face as an intersection of an unbounded surface and a trimming region was previously described, and since a boundary representation model is a finite union of faces, the composite implicit function for the boundary of the solid may be constructed by combining the individual implicit functions describing each face together using R-functions. Differential, normalization, and other properties of the composite implicit function may be affected by this construction, but this can be controlled using methods previously summarized. For example, if the i-th face of the boundary representation of a solid is defined by an implicit function $\omega_i=0$, i=1, 2, . . . , n, then the composite implicit function $\omega_1 \wedge \omega_2 \wedge \ldots \wedge \omega_n$ defines the boundary of the solid. The resulting function will be zero everywhere on the boundary of the solid and strictly positive everywhere else; it is not negative in the interior of the solid because the function does not distinguish between the interior and exterior of the solid. However, this information is available from the boundary representation. In other words, if a PMC (point membership classification) function $\xi(p)$ returns 1, 0, −1 depending on whether point p is respectively in, on, or out of the B-Rep solid, then the function $f=\xi\omega$ is the solid-defining composite implicit function. FIGS. 19(a)–19(c) illustrate the differences between composite implicit functions constructed for CSG and B-Rep models. FIG. 19(a) shows the isolines of the composite implicit function for Washington Island (Door County, Wisconsin, USA), the boundary of which was modeled as a polygon having 613 linear edges. A well-formed CSG representation for this polygon was constructed automatically using the convex deficiency tree algorithm (see, e.g., V. Shapiro, Well-formed set representations of solids, *International Journal on Computational Geometry and Applications*, Vol. 9, No. 2, 1999, pp. 125–150) with one linear halfspace for every edge in the boundary, and $R_0$ functions were applied in place of the CSG Boolean operations. It took 77 seconds to construct this plot by sampling the function on a 90×90 regular grid and bilinearly interpolating the sampled values (time being measured on a computer with dual 400 MHz Pentium II processors). FIGS. 19(b) and (c) then show two composite implicit functions for the same polygon constructed directly from the boundary representation of Washington Island, with simple trimming being used in FIG. 19(b) and normalized trimming being used in FIG. 19(c). In comparison with the CSG model, the functions constructed from the B-Rep are composed of twice as many primitives (because every linear edge was trimmed by a circular halfspace) and the total evaluation time took 132 seconds (FIG. 19(b)) and 122 seconds (FIG. 19(c)) (this time including the performance of Point Membership Classification for all points on the grid), significantly longer than for the CSG model.

Figure 20:
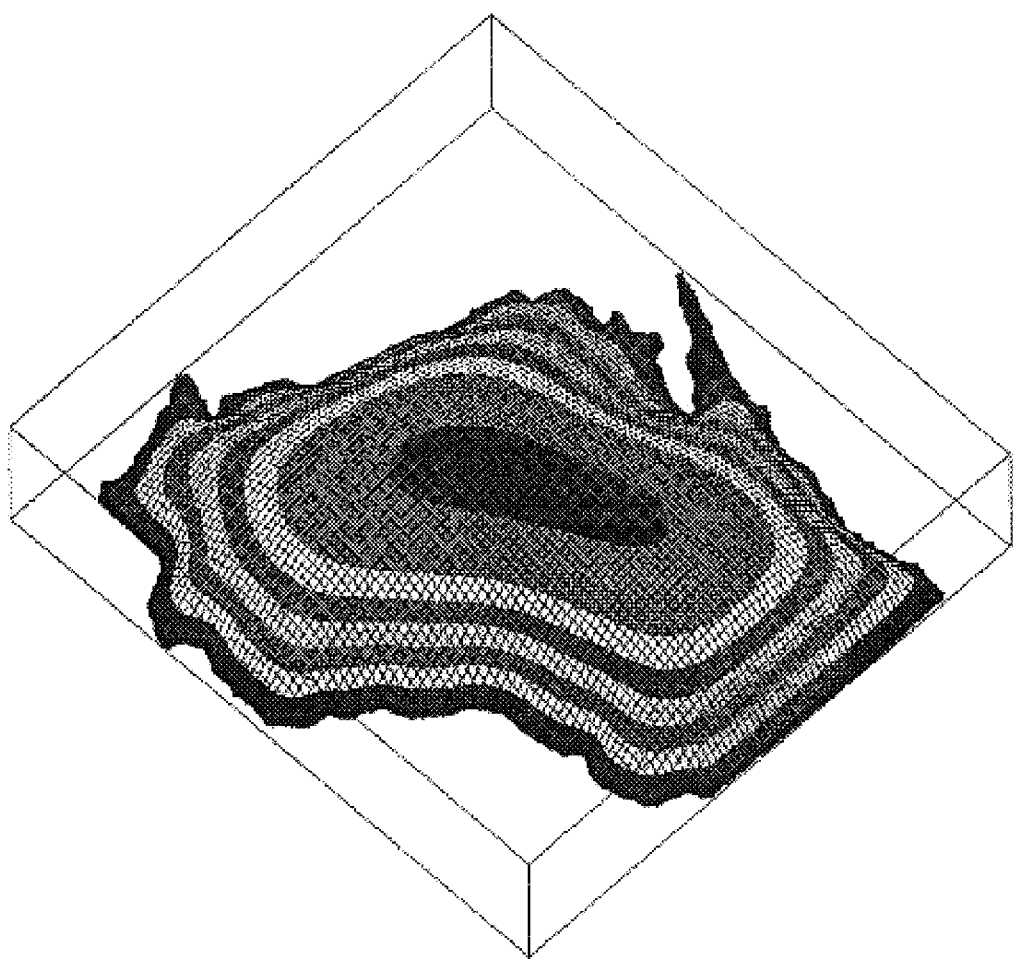
FIG. 20 illustrates a composite implicit function constructed from the boundary representation of the state of Wisconsin with 20,748 edges.

It should be clear that computing time grows linearly with the size of the composite implicit function. For example, with reference to FIG. 20, it takes 4,455 seconds (1 hour and 14 minutes) to compute the composite function from the boundary representation of the entire state of Wisconsin (20,748 edges) on the same uniform 90×90 rectangular grid.

Notice that the composite implicit functions constructed from a boundary representation model appear to be qualitatively better than the corresponding functions constructed from CSG models. This is explained by the fact that a construction from boundary representation models relies on R-conjunction applied to nonnegative arguments, and the gradient of R-conjunction fluctuates significantly in the neighborhood of the corner points in the zone where both arguments are negative (as may be present in CSG models). These local fluctuations tend to compound and propagate, particularly in the presence of small edges or faces.

Construction of implicit functions is of course not limited to use of CSG and boundary representation models; the foregoing methods extend to other representations in a fairly straightforward fashion. As an example, the methods extend straightforwardly to feature-based models. These are models which are constructed from a stock set of basic features which are chosen by the user, combined as desired, and then modified to create a final model. The features are somewhat similar to CSG primitives, but the primitives may be positive/solid (as with blocks, wedges, etc.), negative/empty (as with through-holes, notches, etc.), or both (as with fillets). The invention can either accommodate feature-based geometric models directly, or after they have undergone conversion to CSG or B-rep models (since conversion schemes from feature-based models to CSG and B-rep models are well-known).

Effect of Normalization on Global Properties

Figure 21:
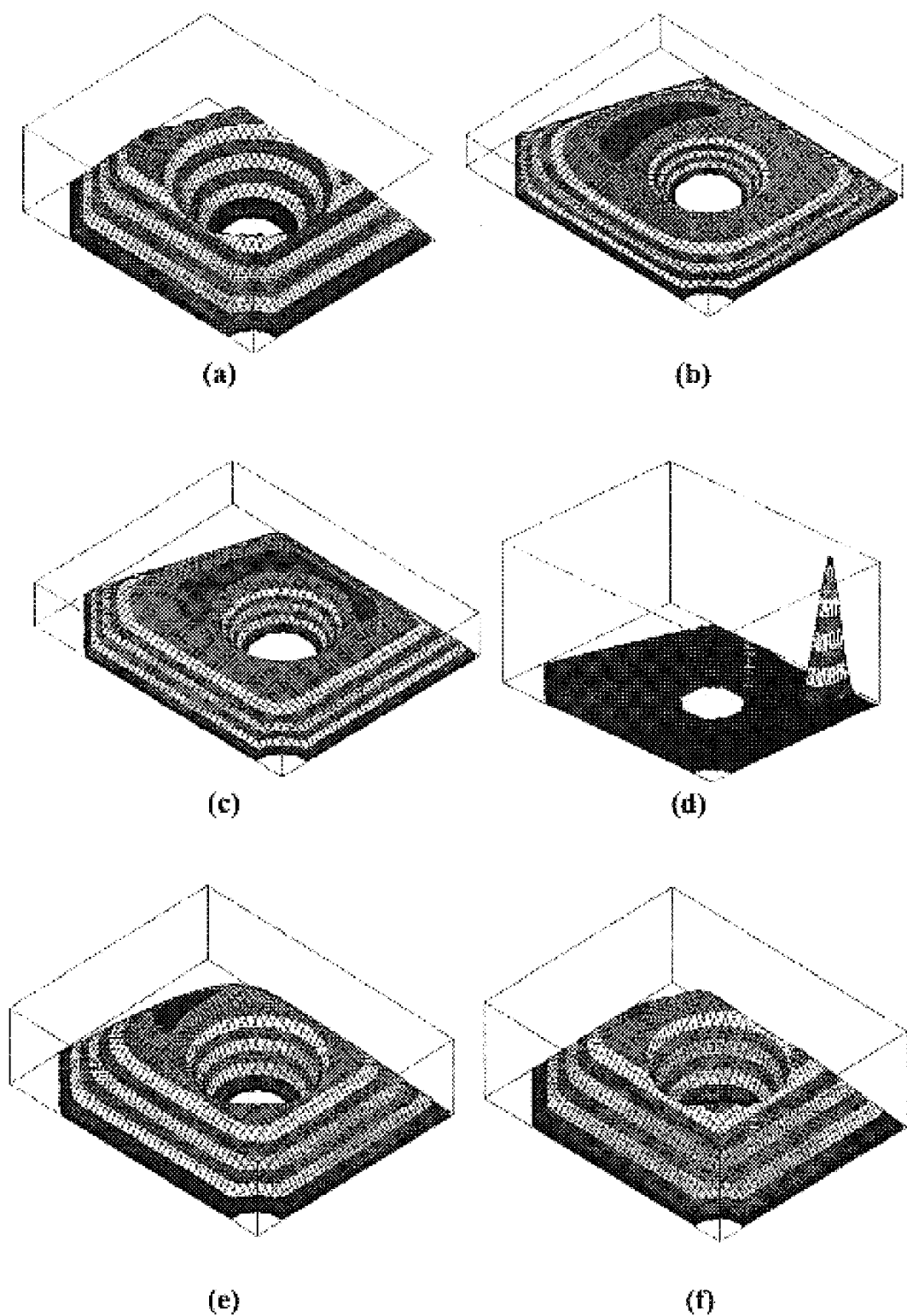
FIG. 21 illustrates the result of the application of different systems of R-functions on a composite implicit function: (a) $R_\alpha$-functions with $\alpha=1$; (b) $R_\alpha$-functions with $\alpha=0$; (c) $R_\alpha$-functions with $\alpha=a$ (x, y); (d) $R_m$-functions with m=2; (e) $R_p$-functions with p=4; (f) $R_p$-functions with p=12.

In general, the higher the degree of normalization near the model's boundary, the better the resulting composite implicit function will approximate the distance function. Recall that $R_p$-functions can assure normalization to order p−1. As p increases, the composite functions approach the true distance function near the regular points on the solid's boundary, and begin to resemble the distance function globally. For example, compare the function constructed using $R_p$-functions with p=12 on normalized primitives in FIG. 21(f) to the distance function in FIG. 21(a); this smooth function is not quite the distance function, but there is an apparent correspondence between the set of points where functions have the maximum curvature and the medial axis for the shown domain. The qualitative difference between simple and normalized trimming is also apparent from a comparison of the composite functions constructed from the boundary representations of FIGS. 19(b) and 19(c): normalized trimming in FIG. 19(c) results in a function that is smoother and is closer to the true distance function than the function in FIG. 19(b) constructed using simple trimming.

Figure 22:
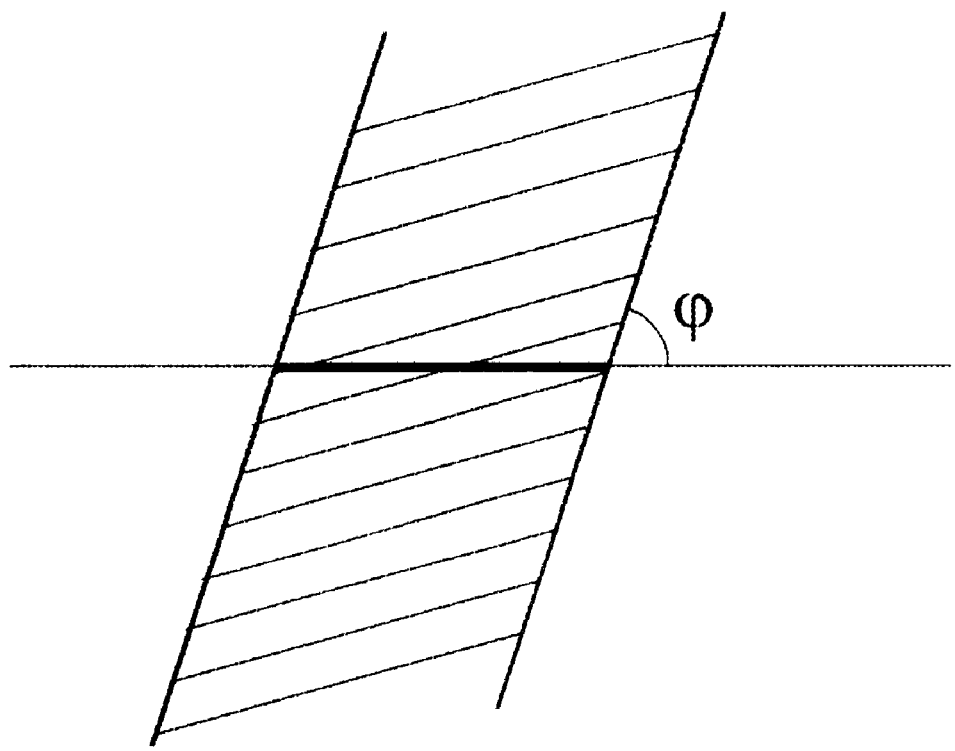
FIG. 22 illustrates an angle between the boundary of a trimming region and the trimmed line.
Figure 23:
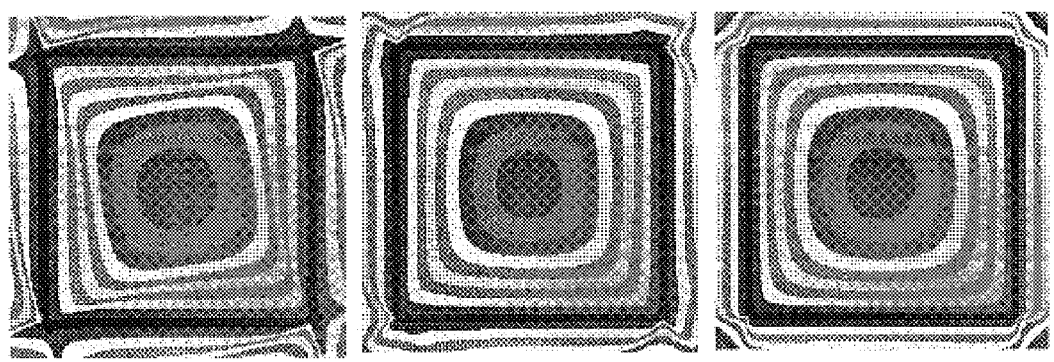
FIG. 23 shows isolines illustrating the influence of non-orthogonality of a trimming region's boundary and trimmed line on the composite function for the union of trimmed lines.
Figure 23:
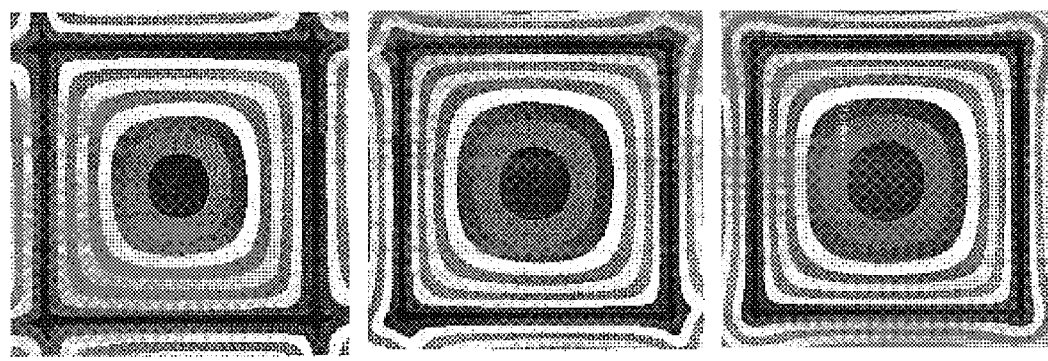

Further comparisons of the effect of simple and normalized trimming illustrate how normalization on the boundary may affect the global behavior of composite implicit functions. FIGS. 23(a), (b), and (c) show the effect of changing the angle ϕ between the boundary of the trimming region and the line for every one of the four line segments in the boundary representation of a rectangle, in the case of the simple trimming using expression (16). The test case geometry is illustrated in FIG. 22. Recall that the purpose of normalized trimming is to assure that the function is normalized in all directions near the corner points. FIGS. 23(d), (e), and (f) show the corresponding functions for the same geometry using normalized (but not orthogonalized) trimming. Computations were performed for three values of ϕ: ϕ=π/10 (FIGS. 23(a) and (d)); ϕ=π/4 (FIGS. 23(b) and (e)); ϕ=π/2 (FIGS. 23(c) and (f)). As the angle ϕ increases, it should be obvious that normalized trimming controls local defects in normalization much better than the simple trimming method.

EXAMPLE 1

Construction of Composite Implicit Functions—2D Region

Figure 14:
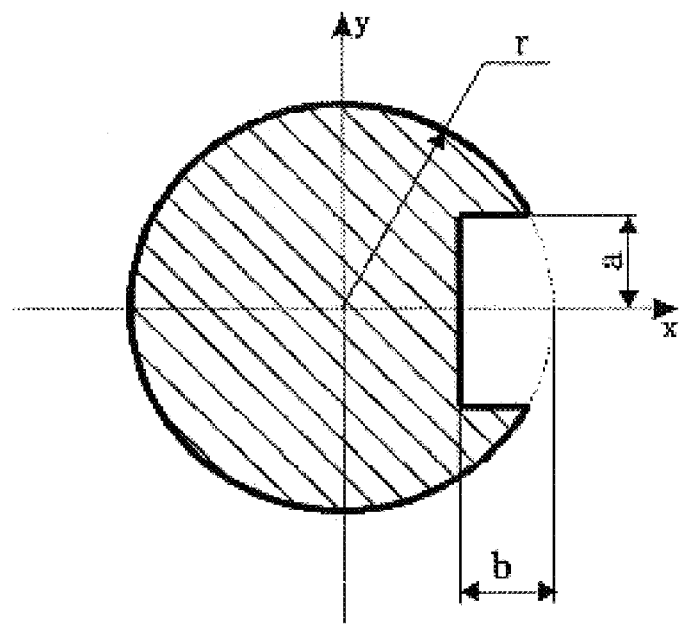
FIG. 14 illustrates (a) an exemplary 2-dimensional domain; and (b) its composite implicit function, which vanishes on the boundary of the domain.
Figure 14:
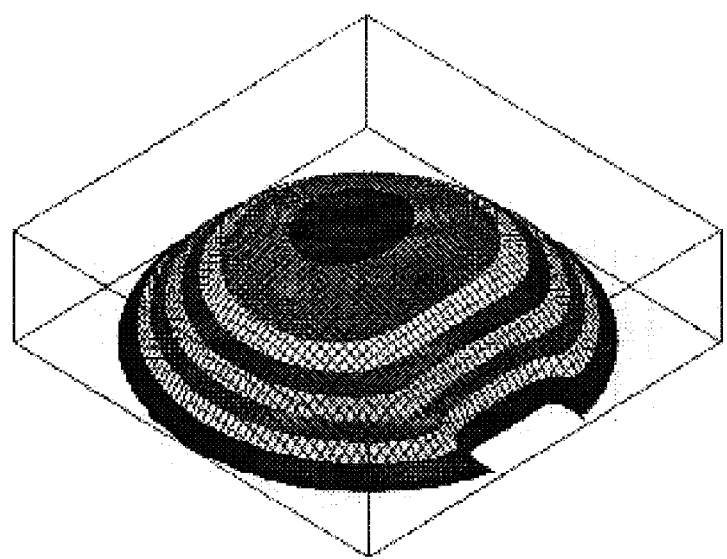

To illustrate the construction of composite implicit functions for geometric models, consider the 2-D geometric model of FIG. 14(a). By use of CSG, the geometry (100, FIG. 1) can be defined as a Boolean set combination (210, FIG. 5) of three geometric primitives (200, FIG. 5):

$$\Omega = \Omega_1 \cap (\overline{\Omega_2 \cap \Omega_3}) \tag{17}$$

where the overbar above $\Omega_2 \cap \Omega_3$ denotes the regularized complement of $\Omega_2 \cap \Omega_3$, and individual primitives $\Omega_1$ through $\Omega_3$ are defined by the following inequalities:

$$\Omega_1 = \Omega_1(\omega_1 \geq 0); \tag{18}$$

$$\Omega_2 = \Omega_2(\omega_2 \geq 0); \tag{19}$$

$$\Omega_3 = \Omega_3(\omega_3 \geq 0) \tag{20}$$

where $$\omega_1 = \frac{1}{2r}(r^2 - x^2 - y^2); \tag{21}$$

$$\omega_2 = x - r + b; \text{ and} \tag{22}$$

$$\omega_3 = \frac{a^2 - y^2}{2a}. \tag{23}$$

This set-theoretic representation can be translated into the composite implicit function shown in FIG. 14(b) using $R_0$-functions (as denoted by the subscript "0") (220, FIG. 5):

$$\omega = \omega_1 \wedge_0 (-(\omega_2 \wedge_0 \omega_3)), \tag{24}$$

Just as for the primitive implicit functions $\omega_1$ through $\omega_3$ for the individual primitives, the composite implicit function ω is also parameterized in terms of the above-noted parameters r, b and a. The function ω is positive within the solid, zero for every point on the boundary, and negative elsewhere; is analytic everywhere except the corner points; and is normalized on all regular points of the boundary.

While this example considers the use of a CSG model, other models could certainly be used as well. As an example, if a boundary representation was used, the composite function would represent a union of the model's faces, wherein each face is a subset of some surface bounded by edges. For a B-Rep model, the function ω is zero for every point on the boundary and positive elsewhere. A similar approach may be applied for any other geometric model which can be constructed by a logical expression.

EXAMPLE 2

Construction of Implicit Functions—2D Region

Figure 15:
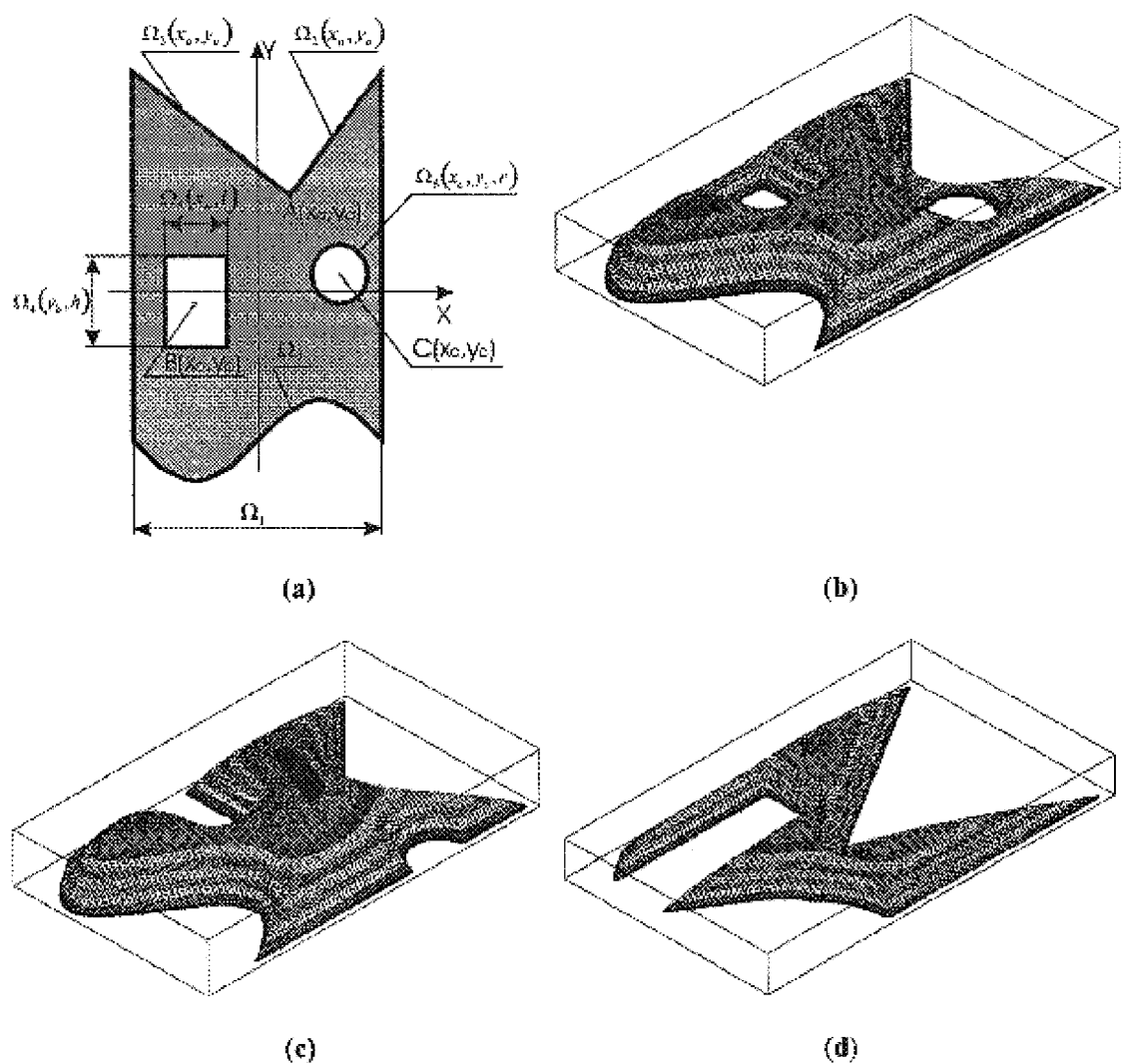
FIGS. 15 in (b–d) illustrate the parameterization of the domain shown in FIG. 15(a) and its composite implicit functions for different sets of parameters.

FIG. 15(a) shows a geometric model that consists of the following halfspaces/domains (200, FIG. 5):

$$\Omega_i = \Omega_i(\omega_i \geq 0), i = 1, 2, \ldots, 7, \text{ where} \tag{25}$$

$$\omega_1 = 2^2 - x^2;$$

$$\omega_2 = (y-3)(x_a - 2) - (x-2)(y_a - 3);$$

$$\omega_3 = -(y - y_a)(x_a + 2) - (x - x_a)(3 - y_a);$$

$$\omega_4 = \left(\frac{h}{2}\right)^2 - (y - y_b)^2;$$

$$\omega_5 = \left(\frac{l}{2}\right)^2 - (x - x_b)^2;$$

$$\omega_6 = (x - x_c)^2 + (y - y_c)^2 - r^2;$$

$$\omega_7 = 3 + y - \sin\left(\frac{\pi x}{2}\right).$$

Here, the coordinates of points A, B, and C, the radius r, and the thicknesses h and l of strips $\omega_4$ and $\omega_5$ are the defining parameters. The model can then be defined in set-theoretic fashion by combining the halfspaces $\Omega_1$ through $\Omega_7$ to obtain function $\Omega$(210, FIG. 5):

$$\Omega = \Omega_1 \cap \Omega_6 \cap \Omega_7 \cap (\overline{\Omega_4 \cap \Omega_5}) \cap (\Omega_2 \cap \Omega_3) \tag{33}$$

The composite implicit function ω for the model is then constructed by syntactic substitution of the equations of the primitives and the R-functions (220, FIG. 5):

$$\omega = \omega_1 \wedge_0 \omega_6 \wedge_0 \omega_7 \wedge_0 (-(\omega_4 \wedge_0 \omega_5)) \wedge_0 (\omega_2 \vee_0 \omega_3) \tag{34}$$

FIGS. 15(b)–(d) show the different appearances of the composite implicit function ω when different values of the parameters A, B, C, r, h and l are used.

EXAMPLE 3

Constriction of Implicit Functions—3D Solid

Figure 16:
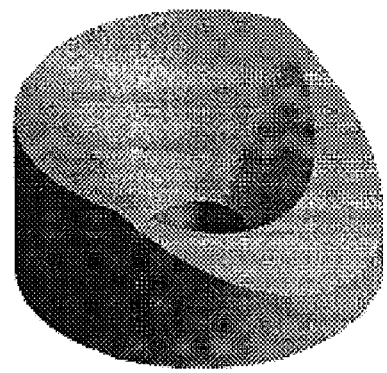
FIG. 16 illustrates (a) a solid object, and its composite implicit function f (x, y, z) plots in (b) section z=0.5, (c) section x=0.
Figure 16:
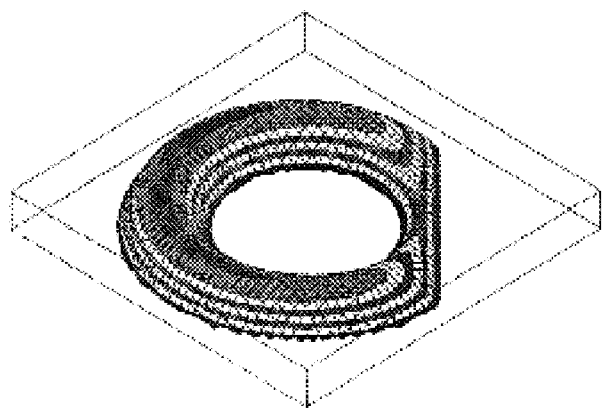
Figure 16:
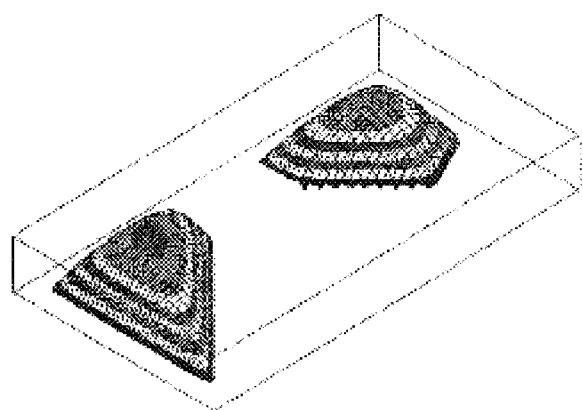

The solid in FIG. 16(a) may be defined as the intersection of five halfspaces: two cylindrical, one conical, and two planar. To construct a normalized function for the solid, the $R_0$ intersection is applied to the normalized functions for each primitive halfspace (200, FIG. 5):

Cylindrical:

$$\Omega_1 = \Omega_1(f_1 \geq 0); f_1 = \frac{1 - x^2 - y^2}{2}; \quad (35)$$

$$\Omega_2 = \Omega_2(f_2 \geq 0); f_2 = \frac{0.25^2 - x^2 - y^2}{0.5}; \quad (36)$$

Planar:

$$\Omega_3 = \Omega_3(f_3 \geq 0); f_3 = z; \quad (37)$$

$$\Omega_4 = \Omega_4(f_4 \geq 0); f_4 = \frac{-2(x-1) + 2(y-1) - 4(z-1)}{2\sqrt{6}}; \quad (38)$$

Conical:

$$\Omega_5 = \Omega_5(f_5 \geq 0); f_5 = -\frac{z - \sqrt{x^2 + y^2}}{\sqrt{2}}. \quad (39)$$

The Boolean expression for the solid appears as follows (Step 210, FIG. 5):

$$\Omega = \Omega_1 \cap \Omega_2 \cap \Omega_3 \cap \Omega_4 \cap \Omega_5. \quad (40)$$

FIGS. 16(b) and (c) then illustrate the plots for the composite function constructed by $R_0$-operations (220, FIG. 5):

$$\omega = f_1 \wedge_0 f_2 \wedge_0 f_3 \wedge_0 f_4 \wedge_0 f_5 \quad (41)$$

wherein the Figures are respectively sectioned at z=0.5 and x=0.

EXAMPLE 4

Construction of Implicit Functions—Trimmed Face in 3D

Figure 17:
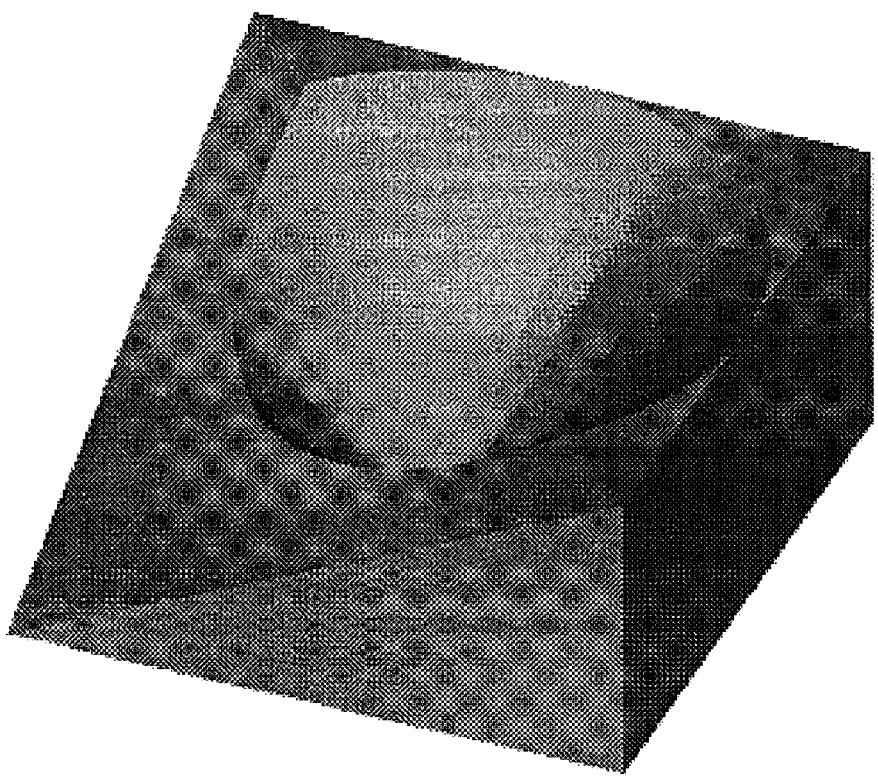
FIG. 17 illustrates the solid trim region for the cylindrical face in FIG. 16(a) restricted to a box enclosing the solid.
Figure 18:
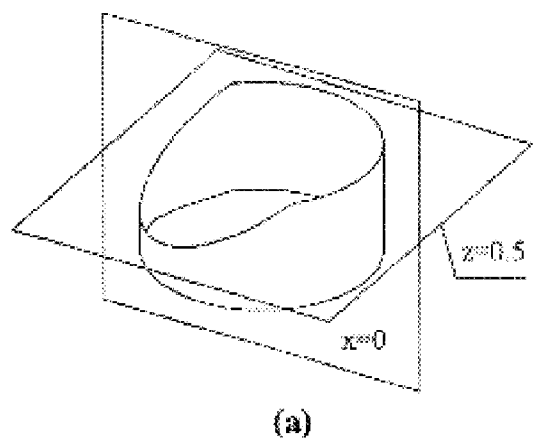
FIG. 18 illustrates (a) a trimmed cylindrical face, and its composite implicit function in sections (b) z=0.5, (c) x=0.
Figure 18:
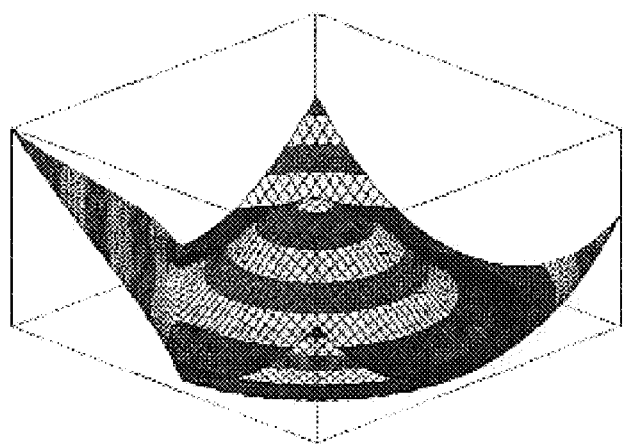
Figure 18:
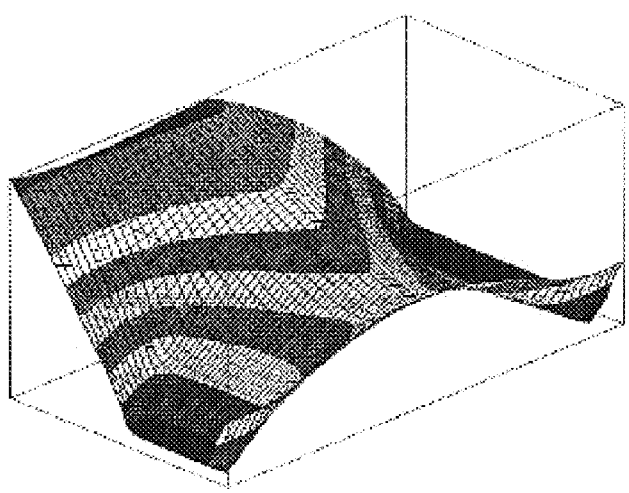

Consider the cylindrical face of the solid in FIG. 16(a). The unbounded cylindrical surface is given by expression (35) (300, FIG. 10). The trimming region in this case is the intersection of two planar halfspaces and one conical halfspace; it is unbounded, but its restriction to a box that contains the solid is shown in FIG. 17. The function defining the trimming region is constructed (Steps 200–220, FIG. 5) as:

$$\phi = f_3 \wedge_0 f_4 \wedge_0 f_5, \quad (42)$$

and the trimmed implicit function for the trimmed cylindrical face (as shown in FIG.18(a)) is obtained by applying either expression (16) or expression (14) (320, FIG. 10) to the function $f_1$ defined in expression (35) and the function $\phi$ defined in expression (42). FIGS. 18(b) and (c) plot the resulting trimmed function in sections z=0.5 and x=0, respectively.

EXAMPLE 5

Construction of Implicit Functions—3D Solid

Figure 24:
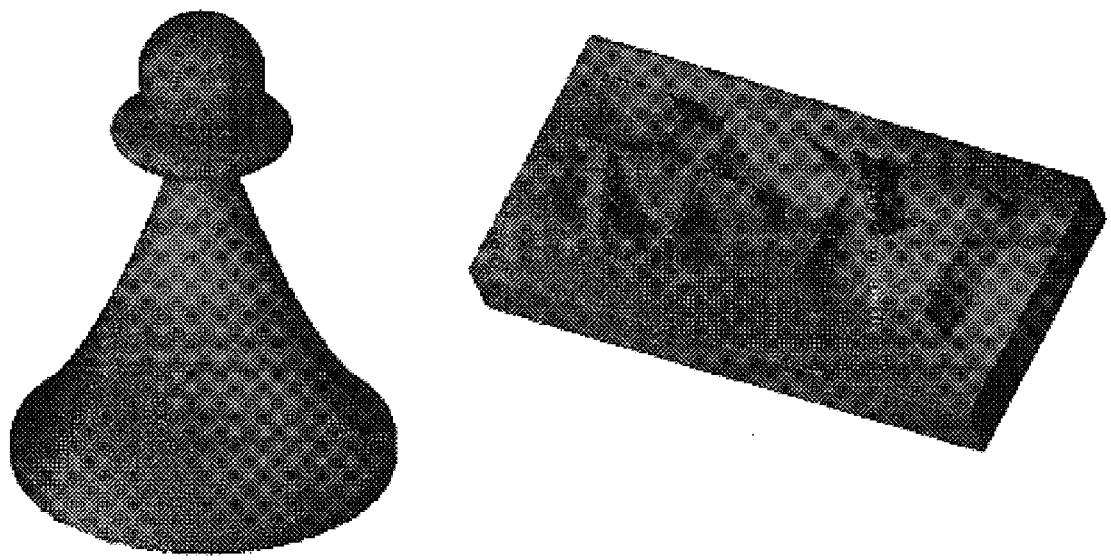
FIG. 24 illustrates the direct modification (combination) of implicit functions by combining the implicit function of FIG. 24(a) with that of FIG. 24(b) to obtain FIG. 24(c).
Figure 24:
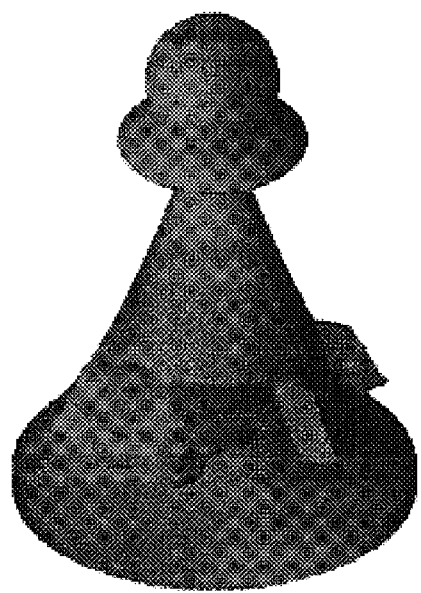

A further example is provided to illustrate how one implicit function can be used to directly modify another implicit function. FIGS. 24(a) and (b) respectively show a chess pawn and letters embossed on a plate, both being defined in 3D composite implicit functions. FIG. 24(c) shows the solid described by combining the implicit functions for the pawn and the implicit function for the letters.

Step 120: Define Boundary Conditions for the Geometric Model

Boundary conditions are restrictions on the solution, i.e., on the field values at the parts of the geometric model specified by the user or another application. They describe the interaction of the geometric model with its surrounding environment. They are called "boundary conditions" because they usually (but not always) take place on the boundary of the model. Depending on the specific engineering analysis problem being analyzed, boundary conditions might consist of known values of temperature, heat flux, forces, stresses, velocities, etc., prescribed on portions of the geometric model. Boundary conditions are usually formulated in terms of functions and/or their partial derivatives (or values of the functions and/or their partial derivatives) which are applicable on the boundary of the geometric model. For example, well-known types of boundary conditions arising in many engineering analysis problems can be described by second order differential equations, with several of the most common types being the following:

Dirichlet Boundary Conditions ($u_{|\partial\Omega} = \phi$)

A Dirichlet problem is defined as being the problem of finding a solution u to the differential equation (e.g., a Laplace equation), wherein given values of the function u are prescribed on the boundary. Thus, Dirichlet boundary conditions prescribe the values of the function u. As examples, the values of u may correspond to temperatures (e.g., for heat transfer analysis), displacements (e.g., for structural problems), velocities (e.g., for hydrodynamics problems), and so on. If the value of u is set to zero, then the boundary condition is called homogeneous. Homogeneous Dirichlet conditions arise in many analysis problems; for example, they correspond to fixed portions of boundary in structural problems, define the obstacles in motion planning, etc.

Neumann Boundary Conditions $$\left(\frac{\partial u}{\partial n}\bigg|_{\partial\Omega} = \varphi\right)$$

A Neumann problem is one wherein the values of the normal derivative of u are prescribed on the boundary. Thus, Neumann boundary conditions specify the values of the functional derivative computed in the direction n perpendicular (normal) to the boundary of the geometric model. Neumann boundary conditions correspond to the "flow" of various physical quantities: for example, heat flux in heat transfer problems, tractions (stresses across the boundary) for structural problems, conditions at the outlet for hydrodynamics problems, and other flow-like conditions in numerous engineering analyses.

Boundary Conditions of the 3rd Kind $$\left(\frac{\partial u}{\partial n} + hu\right)_{|\partial\Omega} = \varphi$$

The third kind of boundary conditions indicate dependence between the values of a function and its derivatives at the boundary. Such conditions arise, for example, in models of convective heat transfer problems.

Numerous other types of boundary conditions are known, but in all cases, the boundary conditions specify the values of functions and their derivatives (through some order) that represent some physical quantity of interest. The forms of these other types of boundary conditions will depend on the specific engineering analysis problem in question, but may involve higher order derivatives, time-dependent values, and experimentally collected data. They may be input by a user interactively, extracted from a table, or supplied by another application. As previously noted, the object of most engineering analysis problems is to find the values of the field at all other points of the geometric model (i.e., at all points where the field is unknown), since this will effectively define the physical behavior of the model.

Figure 44:
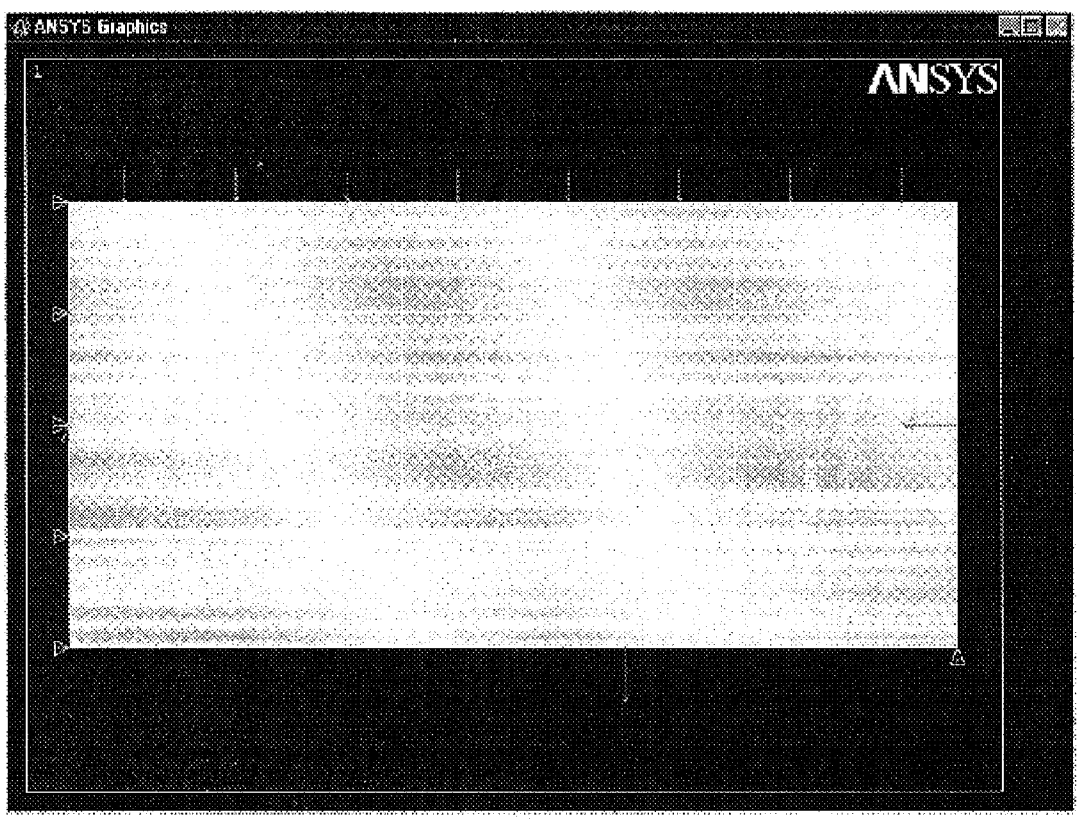
FIG. 44 illustrates how boundary conditions are assigned in the commercial CAD system ANSYS (ANSYS, Inc. Canonsburg, Pa., USA).

Many commercial computer-aided design (CAD) systems allow boundary conditions A to be defined and linked to the corresponding portions of a geometric model in an intuitive and interactive fashion. For illustration, FIG. 44 shows a simple rectangular finite-element model of a beam in the ANSYS commercial CAD system (ANSYS, Inc., Canonsburg, Pa., USA). Triangles along the boundary of the rectangle specify locations of the beams that are fixed (i.e., have zero displacement) in the direction indicated by the triangles. Internally in the system, these boundary conditions are represented as zero-value displacements, which correspond to homogeneous Dirichlet boundary conditions. The arrows along the edges of the rectangle specify the locations and directions of the external loads (forces) applied to the beam. Each arrow has associated magnitude (not shown) and is internally translated into constraints on the derivative of the displacement function, i.e., a Neumann type of boundary condition. Other boundary conditions may be prescribed in similar fashion.

In the invention that is the focus of this document, boundary conditions are generally represented by an interpolated function stored in a convenient data structure. Further details will be provided in later discussion.

Step 130: Construction of the Solution Structure

Figure 12:
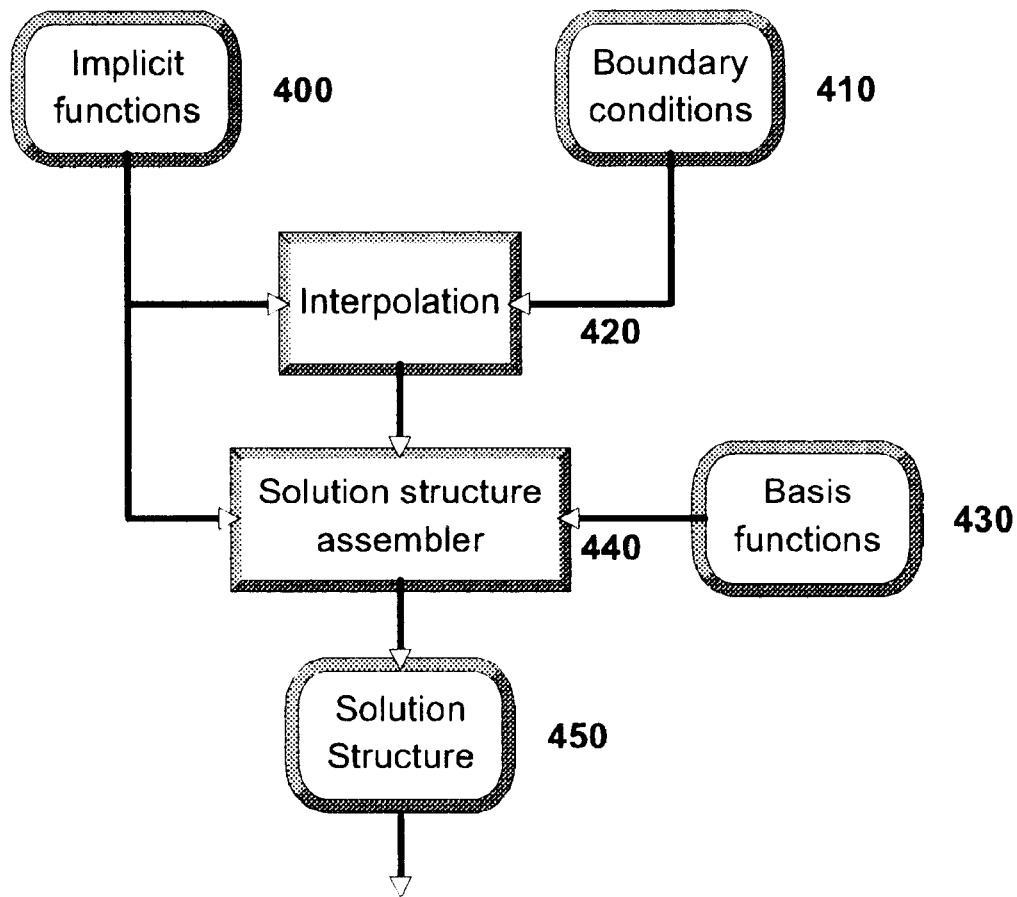
FIG. 12 is a flow diagram illustrating the steps involved in the construction of an exemplary solution structure.

The solution structure is a data structure that combines the implicit functions for the geometry (110, FIG. 1) and the boundary conditions (120, FIG. 1) with a set of additional basis functions; each basis function comes with a coefficient that will be determined by the solution procedure. The solution structure represents the general form of the solution to the problem and provides a solution to the analysis problem once all the unknown coefficients are determined. The previously constructed implicit functions for the geometry and the boundary conditions represent the known parameters of the problem, while the coefficients of the basis functions are used as unknowns ("degrees of freedom") to solve for exactly (or to approximate) the specific problem of interest. An exemplary procedure for constructing the solution structure is shown in FIG. 12, but prior to discussing this in depth, the notion of solution structure will be discussed in greater detail.

Simple Boundary Value Problems: Homogeneous Dirichlet Solution Structure

For the simplest boundary value problems (with homogeneous Dirichlet boundary conditions), the solution of a differential equation must satisfy the boundary conditions $$u|_{\partial\Omega}=0 \tag{43}$$

and therefore can be represented in the following form (for example, see L. V. Kantorovich and V. I. Krylov, *Approximate Methods of Higher Analysis*, Interscience Publishers, 1958):

$$u=\omega\Phi \tag{44}$$

where $\omega$: $R^n \to R$ is a known function that takes on zero values on the boundary $\partial\Omega$ of the domain $\Omega$ and is positive in the interior of $\Omega$, and $\Phi$ is some unknown function. There are several advantages to representing the solution u in this form:

- For purposes of the invention of this document, and taking into account the aforementioned properties of $\Omega$, it should be apparent that the implicit function for the geometric model in question (discussed earlier in Step 110) may be substituted in expression (44) for $\omega$).

- The expression (44) then includes two independent types of information. First, the known geometric information of the particular boundary value problem is provided by $\omega$. Second, the unknown function $\Phi$ has the sole purpose of satisfying the analytical constraints of the boundary value problem, either exactly or approximately.

- Since the known function $\omega$ is zero on the boundary $\partial\Omega$ of the domain $\Omega$, any solution u having the form of expression (44) will satisfy the boundary conditions of expression (43) exactly. This is true independently of the properties of the unknown function $\Phi$, or the type of differential equation involved.

- Expression (44) contains no information about the particular differential equation of the boundary value problem. Rather, it represents the structure of any solution u to a boundary value problem satisfying the given geometric constraints.

- For any given boundary value problem, determination of the unknown function $\Phi$ immediately provides the solution u to the boundary value problem. Since one usually cannot expect to determine $\Phi$ exactly, it can be approximated by a finite linearly-independent series $$\Phi = \sum_{i=1}^{n} C_i \chi_i \tag{45}$$

where $C_i$ are scalar coefficients and $\chi_i$ are basis functions. Many different types of basis functions $\chi_i$ are available for use (polynomials, B-splines, trigonometric functions, etc.). As discussed elsewhere in this document, the chosen number n of coefficients $C_i$ represents the degrees of freedom of the function $\Phi$ (and the boundary value problem in general).

- The structure of expression (44) does not place any constraints on the choice of the basis functions $\chi_i$ that approximate the unknown function $\Phi$. In particular, the choice of the basis functions does not depend on any particular spatial discretization (meshing) of the geometric domain or its boundary.

- For any given boundary value problem and choice of the basis functions $\chi_i$, the approximate solution u is obtained from expression (44) and expression (45) as $$u = \omega \sum_{i=1}^{n} C_i \chi_i \qquad (46)$$

wherein standard variational methods, projection methods, or a variety of other numerical methods may be used to solve for the numerical values of the unknown coefficients $C_i$. Once the coefficients $C_i$ are known, $\Phi$ of expression (44) is known (as per expression (45)), and thus the solution u to the engineering analysis problem is known (i.e., field values and related quantities may be determined everywhere on the geometric model).

From a computational point of view, a significant advantage of the solution structure is that it modularly combines the continuous (non-meshed) geometric information (as represented by the known implicit function ω) with the analytical and numerical representation of the solution procedure (which focuses mainly on the unknown function $\Phi$). Thus, geometric information is cleanly separated from the differential equation, and also from the numerical method used to determine the unknown function $\Phi$.

General Solution Structures: Interpolation of Individual Boundary Conditions Into Single Function The solution structures of expression (44) and expression (46) are formulated for homogeneous Dirichlet boundary conditions, which account for only a small subset of engineering boundary value problems of interest. Similar solution structures can be constructed for any and all other problems of engineering analysis and boundary conditions. For example, once the solution structure of expression (44) is constructed for a boundary value problem with homogeneous Dirichlet boundary conditions, it is straightforward to obtain the solution structure for inhomogeneous conditions given by $$u|_{\partial\Omega} = \phi_0 \qquad (47)$$

First, let φ be a function that is defined at every point of space, such that φ is equal to the specified value (which may be a function or a constant) φ on the boundary points of the domain Ω. (As will be illustrated later, this function φ is easy to construct by interpolation since the value $\phi_0$ is given.) Then the solution structure $$u = \omega\Phi + \phi \qquad (48)$$

satisfies the prescribed boundary conditions exactly.

In practice, the function $\phi_0$ may be specified in a piecewise fashion, with a different value $\phi_i$ prescribed on each portion of the boundary $\partial\Omega$. Such individual functions may be combined into a single interpolating function φ using the transfinite inverse distance interpolation described, for example, in V. L. Rvachev and T. I. Sheiko, R-functions in boundary value problems in mechanics, *Applied Mechanics Reviews*, 48(4):151–188, 1995; V. L. Rvachev, *Theory of R-functions and Some Applications*, Naukova Dumka, 1982. For completeness, we describe this interpolation procedure below.

Interpolation is the process of constructing functions that take on desired values or derivatives at the specified sets of points in space; interpolation is called transfinite when the set of specified points is infinite, e.g., when they lie on a curve, surface or region. It has already been explained that each portion of the boundary $\partial\Omega_i$ may be described by a single trimmed or composite implicit function $\omega_i=0$, where $\omega_i$ is an implicit function constructed as described earlier (i.e., by combining implicit functions for primitives making up the portion of the boundary in question) and is positive at all points not in $\partial\Omega_i$. Then $$\varphi = \frac{\sum_{i=1}^{m} \varphi_i \omega_i^{-1}}{\sum_{i=1}^{m} \omega_i^{-1}} \qquad (49)$$

is a function constructed by applying simple arithmetic operations on the known functions $\phi_i$ and $\omega_i$. Owing to its nature—being composed of the implicit functions for portions of the boundary, and their corresponding boundary conditions—the function φ will hereinafter be referred to as the interpolating function. The interpolating function φ "switches" its value to be precisely $\phi_i$ at every point where $\omega_i=0$; in other words, it interpolates the individual functions $\phi_i$ on each set defined by their corresponding geometry $\omega_i=0$. This method of interpolation is a generalization of the so-called inverse distance interpolation method, with functions $\omega_i$ playing the role of distances to the i-th boundary piece (V. L Rvachev, T. I. Sheiko, V. Shapiro, I. Tsukanov, *Transfinite Interpolation Over Implicitly Defined Sets*, Technical report SAL 2000-1, Spatial Automation Laboratory, University of Wisconsin, January 2000). Notice that expression (49) places no restrictions on the form, shape, or dimension of the sets $\omega_i=0$.

Another form of transfinite interpolation is sometimes more convenient (as discussed in V. L. Rvachev, *Theory of R-functions and Some Applications*, Naukova Dumka, 1982; V. L. Rvachev and T. I. Sheiko, R-functions in boundary value problems in mechanics, *Applied Mechanics Reviews*, 48(4):151–188, 1995; V. L Rvachev, T. I. Sheiko, V. Shapiro, I. Tsukanov, *Transfinite Interpolation Over Implicitly Defined Sets*, Technical report SAL 2000-1, Spatial Automation Laboratory, University of Wisconsin, January 2000):

$$\varphi = \frac{\sum_{i=1}^{m} \varphi_i \prod_{j=1;j\neq i}^{m} \omega_j^{\mu_j}}{\sum_{i=1}^{m} \prod_{j=1;j\neq i}^{m} \omega_j^{\mu_j}} \qquad (50)$$

The two interpolating functions defined by the expression (49) and the expression (50) are very similar in their "switching" or interpolating behavior, but have different types of singularities at the corner points where more than one $\omega_i$ vanish. Values of $\mu_j$ in expression (50) control the smoothness of the behavior of the interpolating function φ near the boundaries, which is useful for interpolating derivative information.

Solution structures for more general boundary conditions can be derived by generalized Taylor series expansions in terms of powers of ω near the boundary $\partial\Omega$. Detailed and systematic derivations of solution structures can be found, for example, in the references noted above. Several common solution structures corresponding to the types of boundary conditions described earlier are shown in TABLE 1.

TABLE 1

COMMON SOLUTION STRUCTURES

| Type of Boundary Condition | Mathematical Formulation | Corresponding Solution Structure |
| --- | --- | --- |
| Dirichlet | $u_{\|\partial\Omega} = \phi$ | $\mu = \omega\Phi + \phi$ |
| Neumann | $\dfrac{\partial u}{\partial n}\bigg\|_{\partial\Omega} = \varphi$ | $\mu = \Phi - \omega D_1^{\omega}(\Phi) + \omega\phi + \omega^2\Phi$ |
| 3rd kind | $\left(\dfrac{\partial u}{\partial n} + hu\right)_{\|\partial\Omega} = \varphi$ | $\mu = \Phi - \omega D_1^{\omega}(\Phi) - h\omega\Phi + \omega\phi + \omega^2\Phi$ |
| Mixed | $u_{\|\partial\Omega_1} = \varphi;$ $\left(\dfrac{\partial u}{\partial n} + hu\right)_{\|\partial\Omega_2} = \psi$ | $u = \omega_1\Phi + \dfrac{\omega_1\omega_2}{\omega_1 + \omega_2}(\psi + \omega_2\Phi - D_1^{\omega_2}(\omega_1\Phi) - D_1^{\omega_2}(\varphi) - h\omega_1\Phi - h\varphi) + \varphi$ |

To summarize Step 130, for all boundary value problems, solution structures that satisfy all boundary conditions exactly (or approximately if so desired) can be constructed automatically. The general mathematical form of the solution structures for most types of boundary conditions are already known and can simply be looked up from a table (such as TABLE 1). A basic procedure for automatic assembly of the solution structure is summarized in FIG. 12. Each step in FIG. 12 will now be explained in greater detail, and the procedure will be illustrated using a simple example.

Step 400 (See FIG. 12; also Step 110 in FIG. 1): Input the implicit functions that correspond to the geometry of the boundaries of the geometric model (see, e.g., FIG. 5). Recall that these functions are represented in a computer or other automated processor by means of a data structure, usually in the form of a symbolic tree, a table, or a graph.

Figure 42:
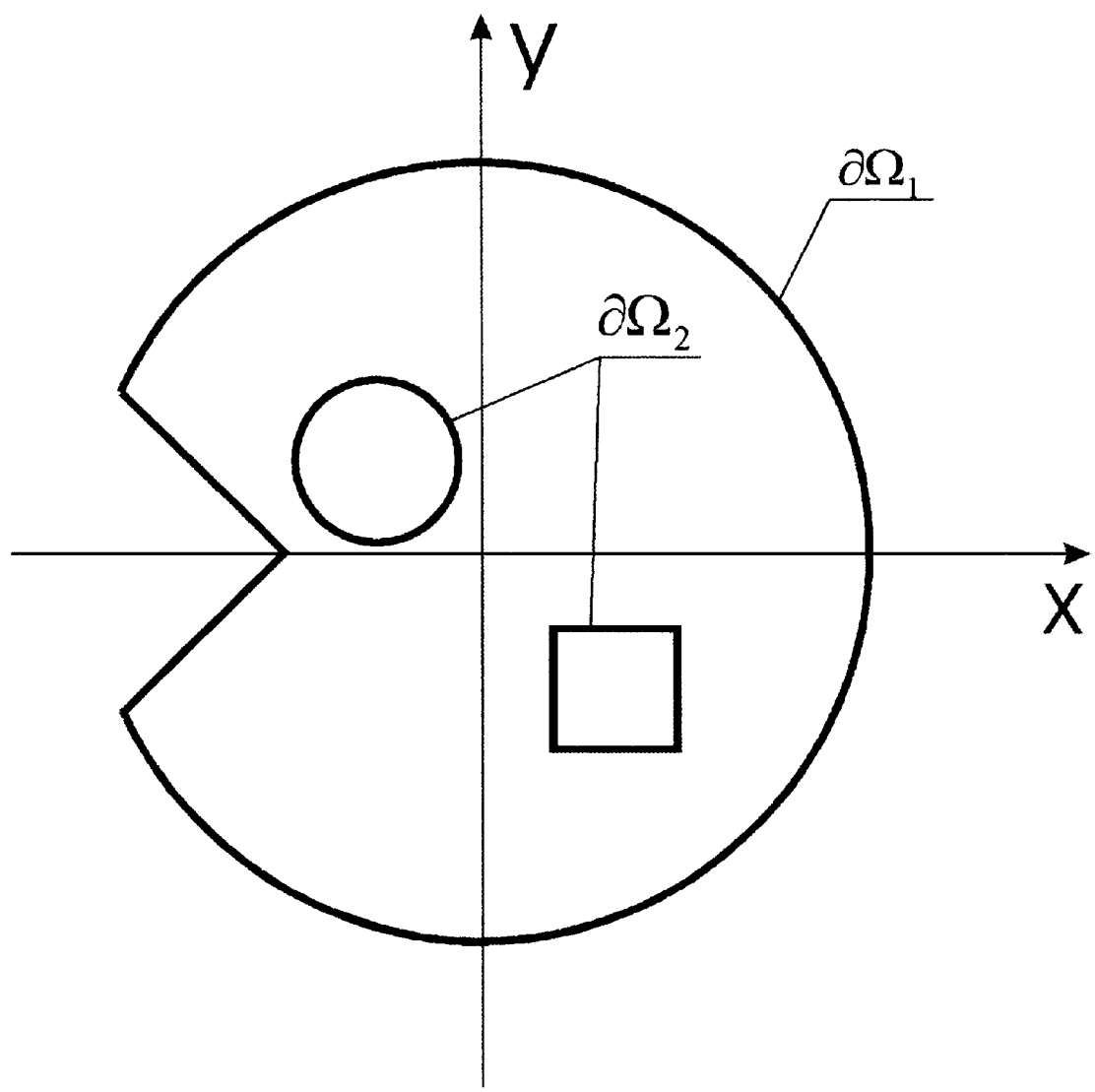
FIG. 42 illustrates an exemplary geometric domain.
Figure 43:
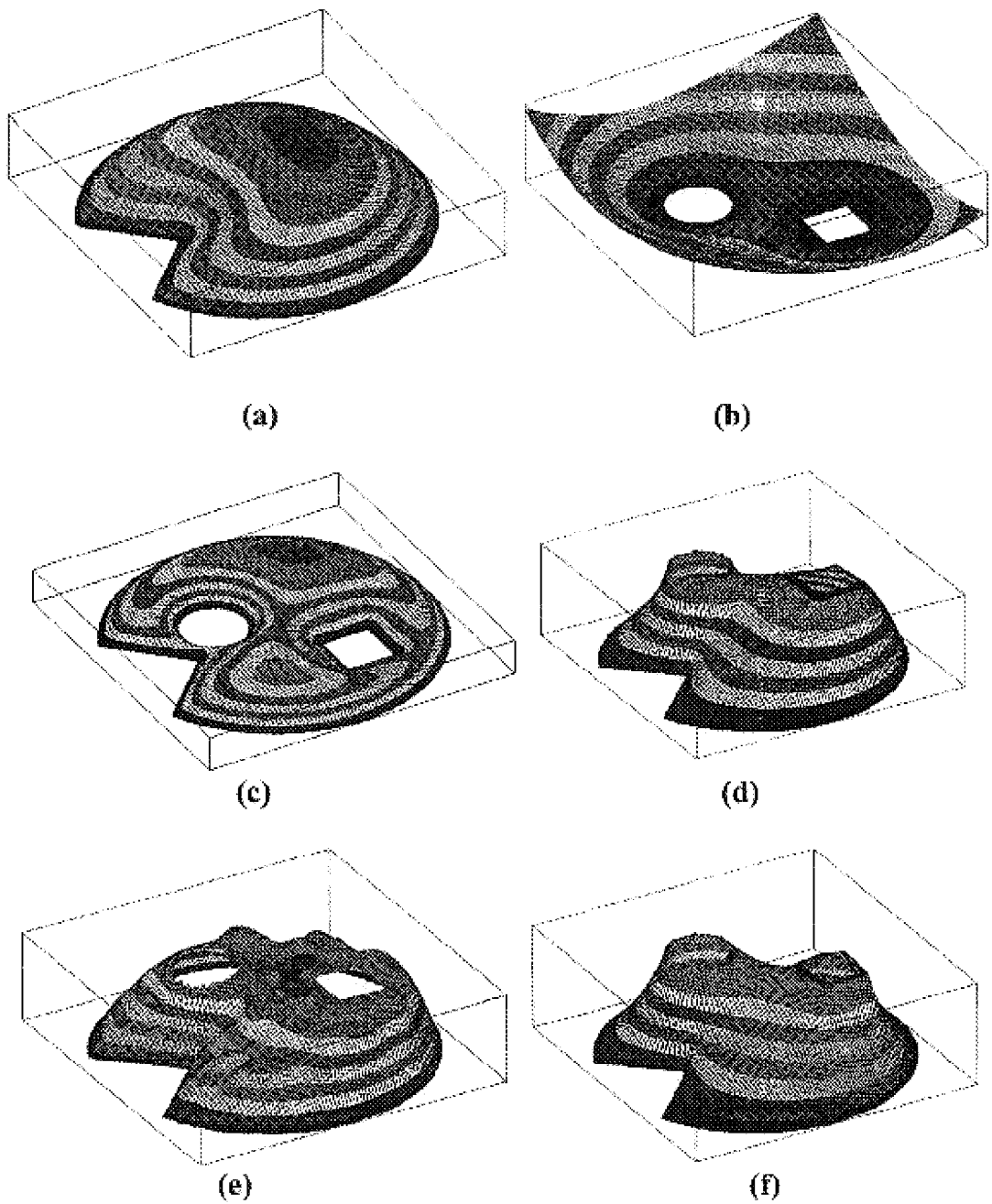
FIG. 43, which utilizes the domain of FIG. 42, illustrates (a) a composite function taking on zero value on boundary $\partial\Omega_1$; (b) a composite function taking on zero value on boundary $\partial\Omega_2$; (c) a composite function taking on zero value on both of the boundaries $\partial\Omega_1$ and $\partial\Omega_2$; (d) the transfinite interpolation of Dirichlet boundary conditions; (e) a solution structure with randomly assigned values of coefficients; (f) the solution of the Laplace equation.

For example, FIG. 42 shows a two-dimensional geometric shape, whose boundary is logically divided into two portions carrying different boundary conditions: the outer boundary ($\partial\Omega_1$) and the boundary of two disconnected holes ($\partial\Omega_2$). Two implicit functions are constructed corresponding to these boundaries: function $\omega_1$ shown in FIG. 43(*a*) and function $\omega_2$ shown in FIG. 43(*b*). FIG. 43(*c*) shows a composite implicit function for the whole boundary of the two-dimensional domain.

Step 410 (see FIG. 12; also Step 120 in FIG. 1): Input functions defining the boundary conditions $\phi_i$ on the geometric model (see Step 120). Each boundary condition $\phi_i$ has three components: the type of boundary condition, the pointer to the portion of geometric boundary where it is specified (i.e., to which $\partial\Omega_i$ it corresponds), and the values for the function and/or its derivatives on the specified portion of the boundary. The values themselves may be constants or functions represented by corresponding data structures.

Continuing with the example, let two different temperatures be specified on the two positions of the boundaries $\partial\Omega_1$, and $\partial\Omega_2$ of the shape in FIG. 42: $u_{\|\partial\Omega_1}=273$; $u_{\|\partial\Omega_2}=300$. Both of these correspond to non-homogeneous Dirichlet boundary conditions. In this case, the boundary conditions are constant on the specified boundaries, but they could also be described by functions indicating a change in temperature along the boundaries.

Step 420 (FIG. 12): Construct a data structure for the interpolating function via transfinite interpolation of the individual boundary condition functions from Step 410. In the preferred implementation of the invention, the construction takes place according to expression (50), where boundary conditions $\phi_i$ of the same type, but with different values (or functions) on different $\partial\Omega_i$ pieces of the boundary, are combined in a single boundary condition. This step produces an interpolating function data structure that is composed from implicit function $\omega_i$ data structures for each $\partial\Omega_i$ portion of the boundary (Step 400), and also from the boundary conditions $\phi_i$ (Step 410).

In the foregoing heat transfer example of FIG. 42, FIG. 43(*d*) shows the function $\phi$ that interpolates individual boundary conditions; this function is constructed by direct application of expression (50) as $$\varphi = \frac{300\omega_1 + 273\omega_2}{\omega_1 + \omega_2}.$$

Figure 41:
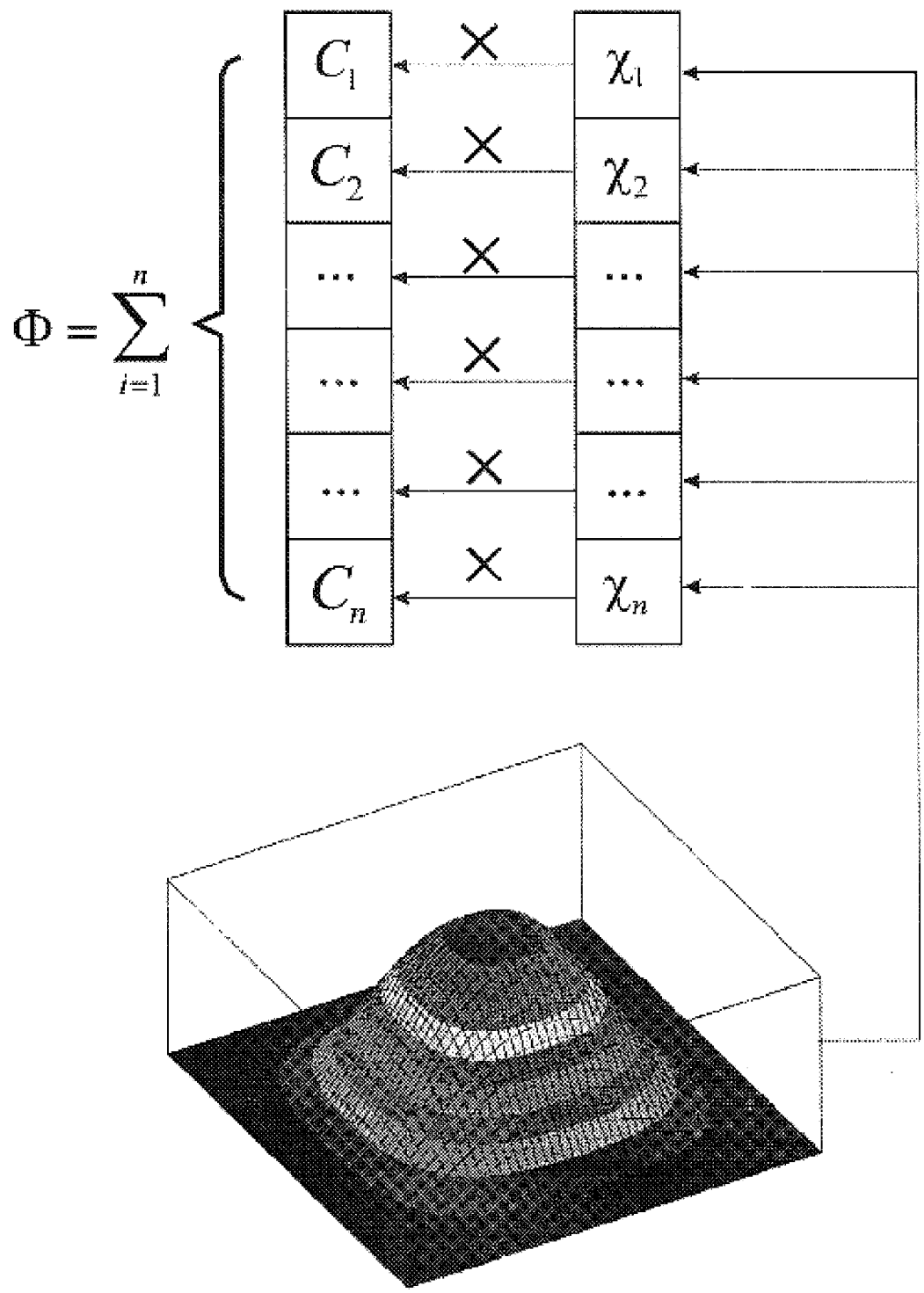
FIG. 41 illustrates a conceptual framework for the assembly of basis functions.

Step 430 (FIG. 12): Input basis functions. The user can select the type of basis functions to be used and their number n (which corresponds to the number of degrees of freedom of the boundary value problem), or such selection may be performed automatically by the software application. Recall that the unknown function $\Phi$ is represented as a scalar ("dot") product of two vectors (see FIG. 41): (1) the vector of coefficients $C_i$, and (2) the vector of the values of the linearly independent basis functions $\chi_i$. In other words, with reference to expression (45), the undetermined function $\Phi$ is a sum of individual basis functions $\chi_i$, each multiplied by a corresponding coefficient $C_i$. While the coefficients $C_i$ will be known only after the problem is solved, each basis function $\chi_i$ is known and can be computed at any point in space. FIG. 41 also shows a typical basis function $\chi_i$, in this case, a B-spline, but other known basis functions may be used.

For the foregoing example heat transfer problem, a system of 400 B-splines distributed on a uniform rectangular 20×20 grid with unknown coefficients $C_i$ will be used.

Step 440 (FIG. 12): Assemble the solution structure. Assembly of the solution structure consists of (1) checking the type(s) of boundary conditions involved; (2) choosing the corresponding form of solution structure; and (3) combining the individual data structures for the implicit functions (410), the interpolating functions (420), and the basis functions (430) into a common data structure for the solution structure. The preferred method of choosing the form of solution structure is by a table look-up (as by referring to TABLE 1). However, as explained elsewhere in this document, different individual solution structures may be interpolated into a single solution structure, for example, by using the method indicated by expression (50) and illustrated in FIG. 39.

In the foregoing heat transfer example, according to TABLE 1 and after all substitutions, the solution structure has the following form:

$$u = \omega \sum_{i=1}^{n} C_i \chi_i + \varphi \qquad (51)$$

A different choice of coefficients $C_i$ in the solution structure corresponds to the different functions, but regardless of which coefficients and basis functions are used, all of them will satisfy the prescribed boundary conditions exactly. For example, FIG. 43(e) and (f) show plots of two functions satisfying the given boundary conditions but behaving differently inside the domain. The function shown in FIG. 43(e) uses randomly chosen values of the coefficients $C_i$, whereas FIG. 43(f) illustrates the use of coefficients that were computed in order to approximate the solution of a Laplace equation $\nabla^2 u = 0$.

Step 450: Store the data structure representing the solution structure for further processing by the solution procedure (implemented by the solver 140, FIG. 1), which will be described at greater length in the following discussion.

Figure 39:
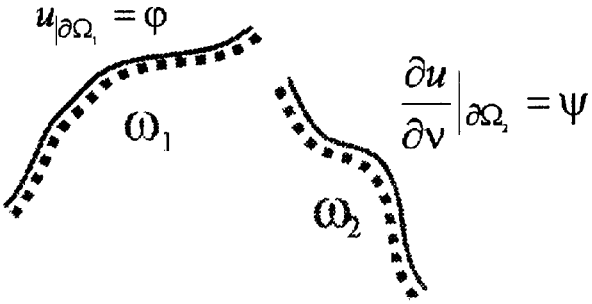
FIG. 39 illustrates an exemplary procedure for interpolation of solution structures.
Figure 51:
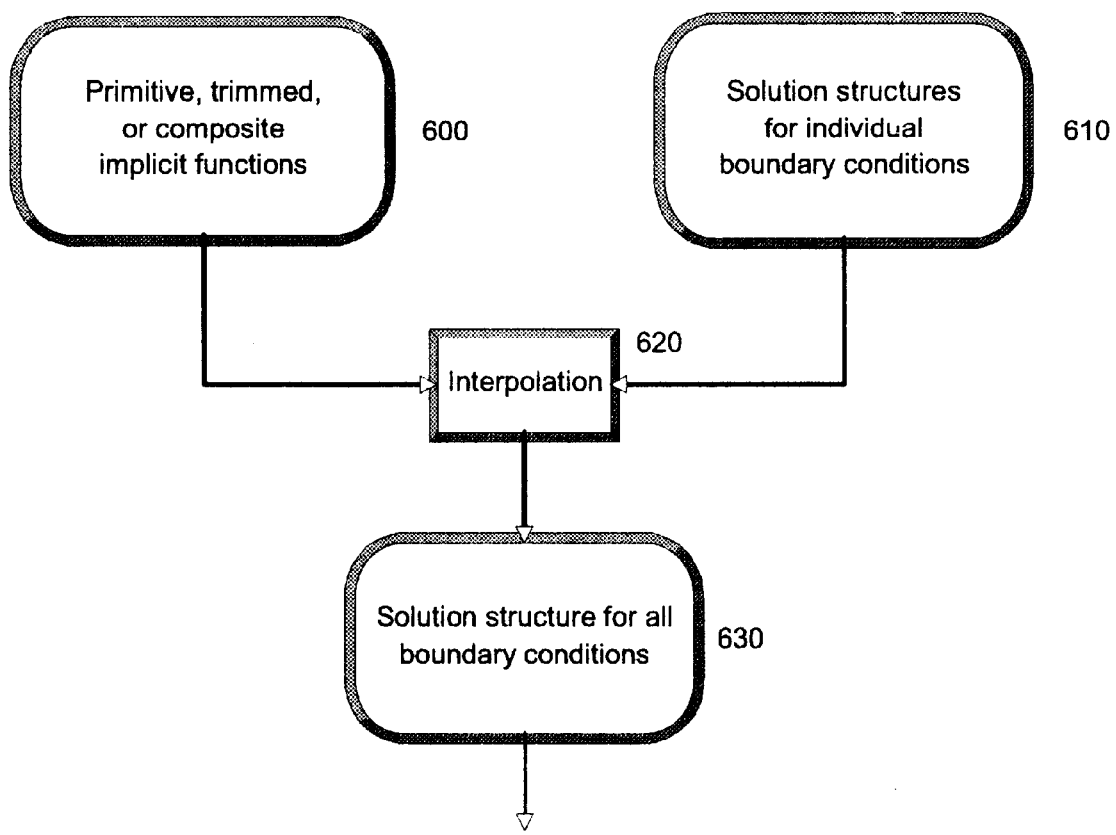
FIG. 51 shows an alternative method of constructing solution structures via the transfinite interpolation of individual solution structures.

As briefly discussed previously, a single composite solution structure satisfying all boundary conditions can be constructed by a transfinite interpolation of different individual solution structures, wherein each of the different individual solution structures satisfies the boundary conditions given over a different portion of the geometry. This approach is particularly recommended where different types of boundary conditions (e.g., two or more of the types noted in TABLE 1) exist at different portions of the geometry: for each type of boundary condition, a solution structure can be constructed for the portions of the geometry having this type, and the solution structures for the different types may then be interpolated using the implicit functions of their corresponding geometric portions to obtain a composite solution structure. FIG. 39 illustrates an exemplary application of this process where two distinct types of boundary conditions exist. FIG. 51 more generally shows the steps of a procedure for interpolating multiple solution structures into a single composite solution structure satisfying all boundary conditions:

Step 600: Input implicit functions $\omega_i$ describing the portions of the geometry having prescribed boundary conditions. These implicit functions can be constructed by any of the methods previously discussed. Using the terminology previously introduced, they may be primitive implicit functions, trimmed implicit functions, or composite implicit functions (which may be composed from more fundamental primitive, implicit, or composite implicit functions).

Step 610: Input solution structures Mu satisfying the given boundary conditions for each portion of the geometry described by $\omega_i = 0$.

Step 620: Interpolate the solution structures from Step 610 according to expression (49) or expression (50) using the implicit functions from Step 600, and with functions $\phi_i$ replaced by $u_i$ in the expression (49) or expression (50).

Step 630: Store the data structure representing the composite solution structure. Again, the composite solution structure, which is here constructed by several interpolated solution structures, satisfies all given boundary conditions.

Step 140: Execute Solution Procedure (Solve for Coefficients in Solution Structure)

The solution structure represents an infinite number of functions that satisfy the prescribed boundary conditions exactly. A solution procedure is a computational process of determining the values of the unknown coefficients in the solution structure corresponding to the function that approximates the solution of the analysis problem. Solution procedures may vary, and can be readily attained from symbolic and numerical routines available in many commercial mathematical computing packages.

Figure 13:
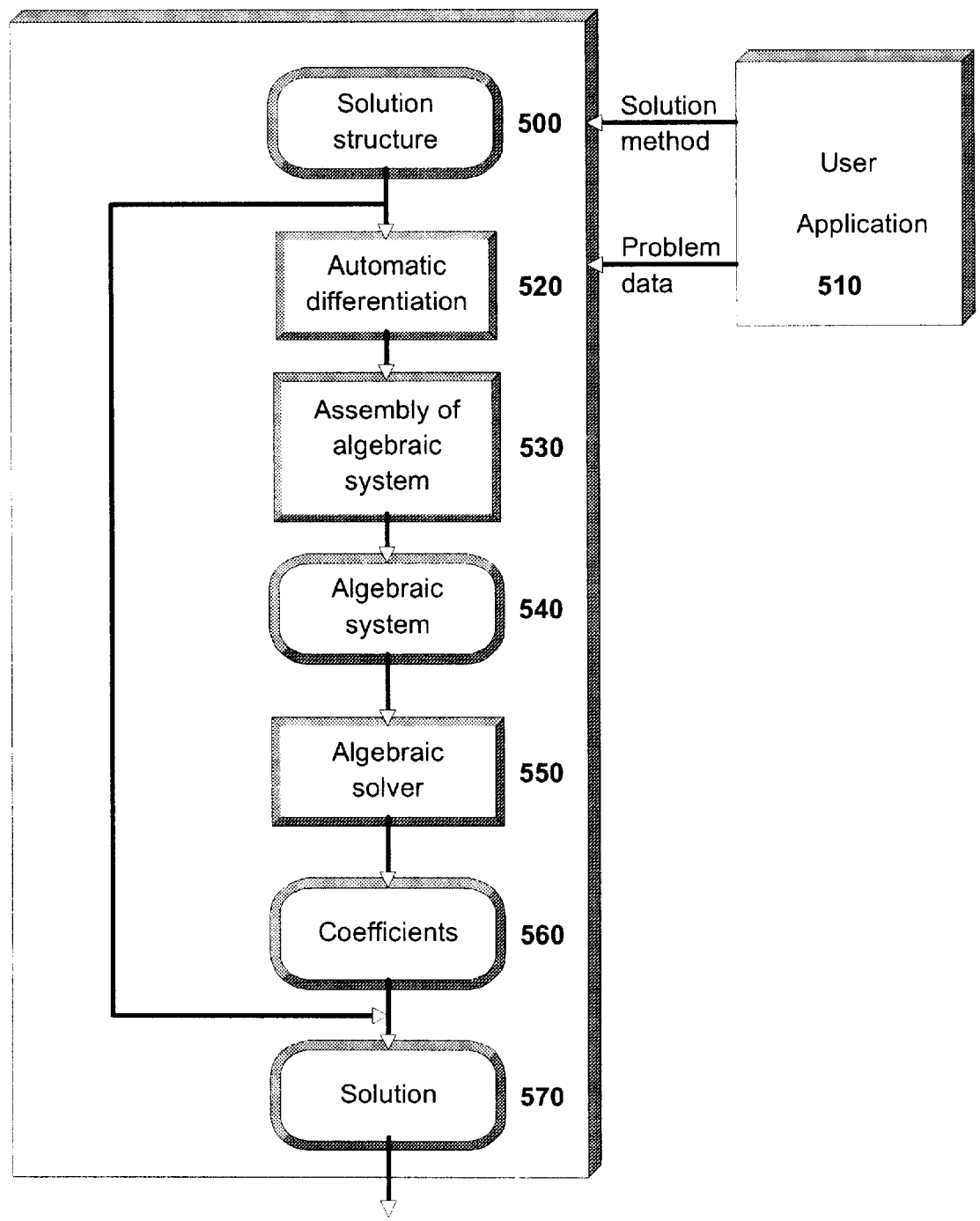
FIG. 13 is a flow diagram illustrating an exemplary mesh-free solution scheme.

A typical solution procedure (shown in FIG. 13) involves differentiation, integration, and solution of the algebraic systems of equations to obtain the coefficients in the solution structure. Such a procedure can been constructed using commercially available tools and/or mathematical libraries, such as Numerical Recipes (W. H. Press, S. A. Teukolsky, W. T. Vetterling, and B. P. Flannery, *Numerical Recipes in C*, Cambridge University Press, second edition, 1992), NETLIB (the math reference repository currently available at WWW URL http://www.netlib.org), commercial geometric modelers, and so on. Not all of these steps need to be present in every solution procedure, and it is possible to devise other (for example, heuristic) procedures for determining the unknown coefficients in the solution structure. Following is a description of the steps in a preferred implementation of the solution procedure.

Step 500 (FIG. 13): Input the data structure representing the solution structure (from Step 450). In the heat transfer example discussed earlier, the solution structure was represented by expression (51), but other solution structures may be represented by a wide variety of other complex functional expressions composed from (implicit) functions, boundary conditions, arithmetic operations, differential operators, and basis functions with unknown coefficients.

Step 510 (FIG. 13): The user (or the software application) supplies problem data and the desired solution procedure, which amounts to formulating the engineering analysis problem in terms of operations on the constructed solution structure. Problem data includes information about the problem which is not included in the boundary conditions, for example, the type and order of the differential equation, material constants (e.g., constants related to material properties of the geometric model such as thermal conductivities, coefficients of expansion, etc.), quantities to be minimized, and so on. Some engineering analysis problems may be defined interactively, but problem data for many standard problems have already been formulated and can be chosen from a preexisting database. Regarding the solution procedure, every formulated engineering analysis problem may be solved in a variety of different ways, but all solution procedures will involve steps chosen from differentiation, integration, and equation solving (i.e., solving a system of algebraic equations). The solution procedure will specify how a particular sequence of these steps are to be used in solving a given analysis problem. Most (but not all) problems require solving a system of algebraic equations; for example, one common technique of solving the heat transfer problem of the foregoing example is to solve the common Laplace equation using a method of least squares that requires minimization of the functional:

$$F = \int\int_\Omega \left(\nabla^2 \left(\omega \sum_{i=1}^{n} C_i \chi_i + \varphi\right)\right)^2 d\Omega \qquad (52)$$

It is well known that minimization of the functional F requires solving a system of algebraic equations, with these algebraic equations being constructed by differentiating portions of the solution structure with respect to spatial variables, followed by integration of the computed functions and derivatives over the specified geometric domain.

Step 520 (FIG. 13): Differentiate the solution structure (or portions thereof) with respect to the variables that appear in its data structure. Such variables include (but are not limited to) spatial coordinates, time, and engineering parameters. A number of symbolic and numerical differentiation techniques are known and available from commercial vendors. Preferably, the technique known as automatic differentiation is used, as described in A. N. Shevchenko and V. N. Rokityanskaya, Automatic differentiation of functions of many variables, *Cybernetics and System Analysis*, Vol. 32, No. 5, 1996, pp.709–723. For example, in order to solve the previously-noted heat transfer problem of FIG. 42 using the method of least squares, the second order partial derivatives of the terms in the solution structure need to be computed:

$$\frac{\partial^2}{\partial x^2}\left(\omega \sum_{i=1}^{n} C_i \chi_i\right), \quad \frac{\partial^2}{\partial y^2}\left(\omega \sum_{i=1}^{n} C_i \chi_i\right), \quad \frac{\partial^2 \varphi}{\partial x^2}, \quad \frac{\partial^2 \varphi}{\partial y^2} \quad (53)$$

Figure 45:
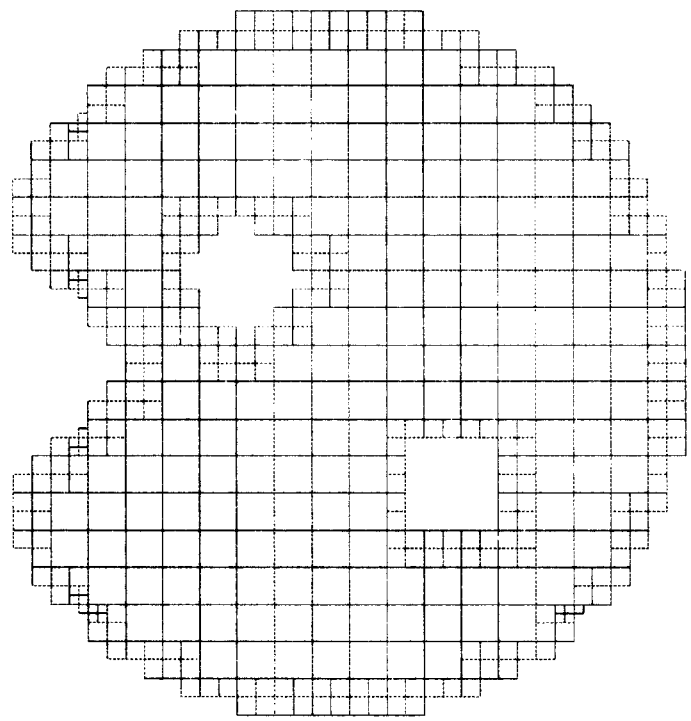
FIG. 45 illustrates (a) the hierarchical space decomposition of the domain of FIG. 42; (b) the positions of integration points during solution.
Figure 45:
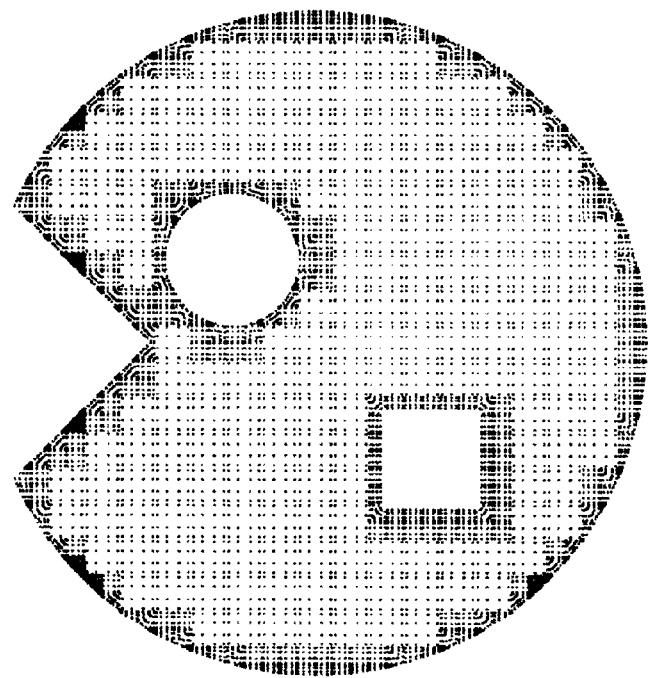

Step 530 (FIG. 13): Assembly of the algebraic system (shown as output in Step 540) typically requires integration of the known functions and derivatives, as specified by the solution procedure. Integration is generally performed numerically, by sampling the values of functions and their derivatives over the specified domain. Standard numerical integration code for simple domains is readily available, e.g., in Numerical Recipes (W. H. Press, S. A. Teukolsky, W. T. Vetterling, and B. P. Flannery, *Numerical Recipes in C*, Cambridge University Press, second edition, 1992), in NETLIB (the math reference repository currently available at WWW URL http://www.netlib.org), and in other sources. The same integration techniques can be adapted for complex geometric shapes by sampling points throughout the space and testing which of these points are inside or on the boundary of the geometric shape. Such tests are supported by all commercial geometric modeling systems. A preferred and more efficient implementation of the integration is illustrated in FIG. 45, where the geometric domain is first approximated by a hierarchical decomposition tree of rectangular cells (FIG. 45(*a*)), and then the points are sampled in each rectangular cell according to the usual rules of integration for those points that lie inside the geometric domain. The resulting integration points are shown in FIG. 45(*b*).

In the foregoing heat transfer example of FIG. 42, the algebraic system of equations follows from the condition that the functional (integral) F of expression (52) must be minimized. This means that all partial derivatives of the functional with respect to coefficients $C_i$ should have zero value:

$$\frac{\partial F}{\partial C_i} = 0, \quad i = 1, 2, \ldots, n.$$

As result of this differentiation, a linear system AC=B is obtained, where elements of the matrix A and vector B are computed by formulas:

$$a_{ij} = \int\int_\Omega \nabla^2(\omega \chi_i) \nabla^2(\omega \chi_j) d\Omega \quad (54)$$

-continued $$b_i = -\int\int_\Omega \nabla^2(\omega \chi_i) \nabla^2(\varphi) d\Omega \quad (55)$$

These integrals are evaluated as described above and illustrated in FIG. 45, i.e., by repeated sampling of the functions and their derivatives shown under the integral signs over the geometric model of the domain.

Step 550 (FIG. 13): Solving the system of algebraic equations results in a setting values for all unknown coefficients $C_i$ of the solution structure (shown in Step 560). This is a standard problem in mathematics, with a variety of numerical packages available to deal with various types of problems. The system of algebraic equations can be linear or non-linear, densely or sparsely populated, and may involve iterative or eigenvalue analysis.

In the foregoing exemplary heat transfer problem of FIG. 42, the assembled system of equations is linear with a sparse block diagonal structure. For such linear systems it is convenient to use iterative numerical methods, and the preferred implementation in our case relies on the conjugate gradient method, taken from the Numerical Recipes library (W. H. Press, S. A. Teukolsky, W. T. Vetterling, and B. P. Flannery, *Numerical Recipes in C*, Cambridge University Press, second edition, 1992).

Step 570 (FIG. 13): Representing the solution is accomplished by storing the computed values for all coefficients $C_i$ in the solution structure. The solution can be evaluated from the implicit functions $\omega_i$, boundary conditions $\phi_i$, basis functions $\chi_i$, and now the computed coefficients $C_i$, and can (if desired) be visualized or otherwise processed (as will be described in the following discussion).

Following the foregoing steps, the computed solution for the foregoing exemplary heat transfer problem of FIG. 42 is shown in FIG. 43(*f*).

Step 150 (FIG. 1): Visualization of Results (Optional)

Numerous algorithms and libraries are available for visualization of the computed results in a variety of formats, including but not limited to plots/displays of isopotential lines and surfaces;

plots/displays of three dimensional surfaces;

plots in sections;

vector plots;

tables;

3D parts created by rapid prototyping machines (i.e., "3D Printers").

Step 160 (FIG. 1): Modification/Revision (Optional)

The user (or the computer/application) may then interpret the computed results and modify the input if necessary, for example, to achieve better precision, for optimization, or to compute the solution adaptively. To illustrate, the user might interpret the computed results, modify the geometric model and/or boundary conditions, and then re-run the application to attain new results.

Exemplary Applications of the Invention

Example: Transfinite Interpolation of Heterogeneous Sets

Figure 25:
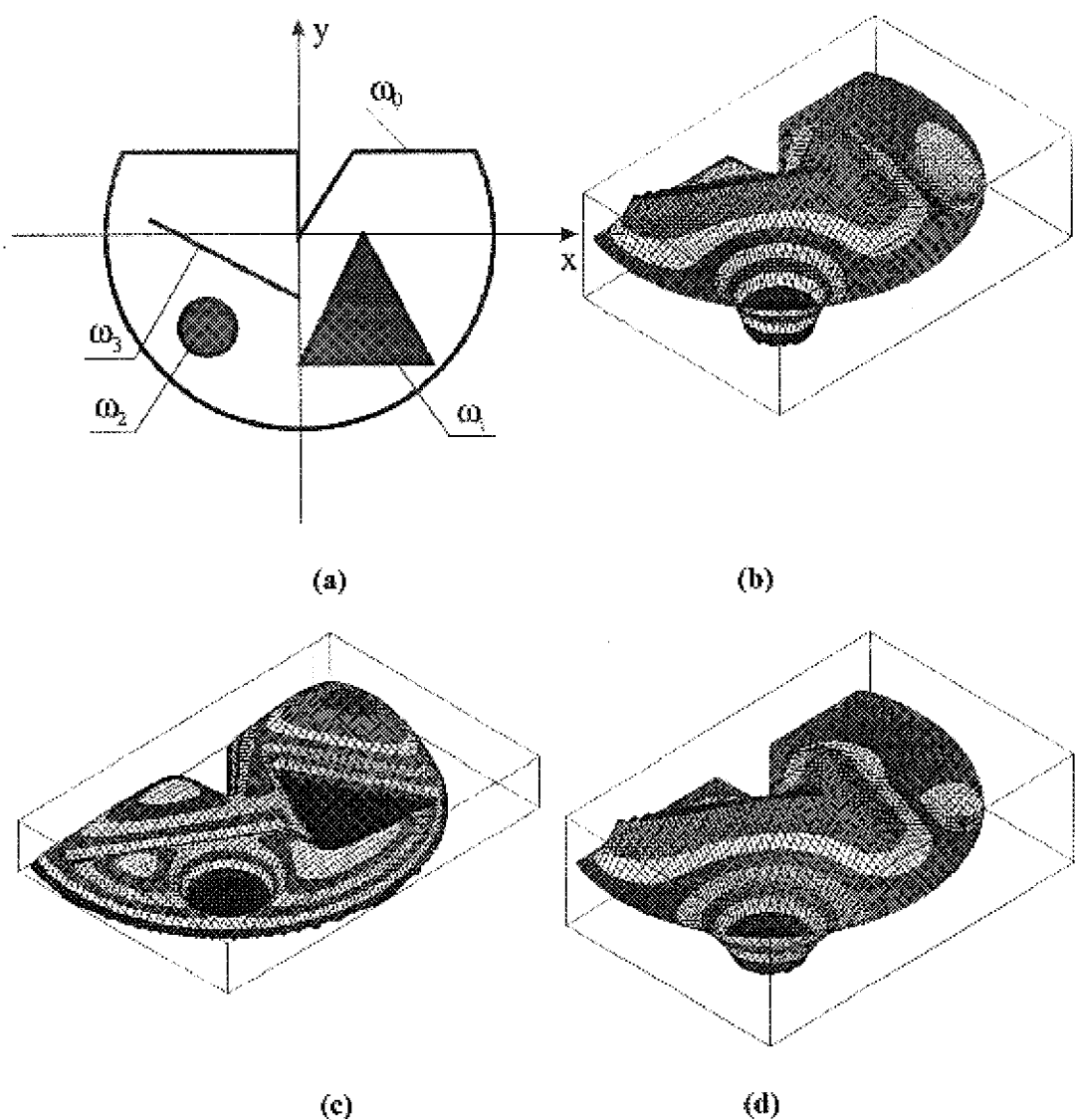
FIG. 25 illustrates (a) a domain with functional values prescribed on heterogeneous loci $\omega_j$; (b) a function that interpolates the values prescribed on the loci; (c) a function that vanishes on the indicated loci; (d) the solution of the boundary value problem for the Laplace equation with prescribed boundary conditions.

Because implicit functions ω=0 can be constructed for pointsets with heterogeneous geometric and topological properties, the invention also applies to analysis problems where boundary conditions are prescribed throughout isolated regions or points in the geometric model. For example, FIG. 25(*b*) shows an interpolating function φ constructed as a transfinite interpolation of the functions $\phi_0=0$, $\phi_1=-3x+y+6$, $\phi_2=-5$, and $\phi_3=5$ prescribed on one and two dimensional geometrical loci, $\omega_i=0$, i=0, . . . ,3 indicated in FIG. 25(a). FIG. 25(c) shows a composite normalized implicit function $\omega$ that takes zero value on the same geometry. Combining functions $\phi$ and $\omega$ with undetermined function $\Phi$ into a single functional expression for the solution u in accordance with expression (48), the Dirichlet solution structure that exactly satisfies all prescribed conditions is obtained. FIG. 25(d) shows the function u that approximates Laplace equation $\nabla^2 u=0$ by choosing $\Phi$ to minimize the Ritz's functional:

$$F = \int\int_\Omega (\nabla(\omega\Phi)^2)d\Omega + 2\int\int_\Omega \nabla(\omega\Phi)\nabla\varphi d\Omega \qquad (56)$$

This procedure is often called "smoothing" or "fairing" and is further explained below.

Example: Fairing/Smoothing

For purposes of illustration, consider the problem of smoothing (or fairing) that often arises in computer-aided geometric design. Depending on the particular application, the designed surfaces are often chosen to minimize one of several functionals (as discussed in Josef Hoschek and Dieter Lasser, *Fundamentals of Computer Aided Geometric Design*, A K Peters, Ltd, 1993):

Potential energy of tension of a thin membrane:

$$I_1 = \int_\Omega (\nabla f)^2 d\Omega \qquad (57)$$

Potential energy of bending of a thin plate:

$$I_2 = \int_\Omega (\nabla^2 f)^2 d\Omega \qquad (58)$$

Energy of a thin plate in tension (which is a basically a linear combination of the two previous functionals):

$$I_3=(1-\alpha)I_1+\alpha I_2; \ 0\leq\alpha\leq 1 \qquad (59)$$

with parameter $\alpha$ controlling the amount of influence of the individual functionals $I_1$ and $I_2$ on the interpolant.

To obtain the desired approximation for $f$, the solution structure $$f = \sum_{i=1}^n u_i \frac{\prod_{j=1; j\neq i}^n \omega_j}{\sum_{k=1}^n \prod_{j=1; j\neq k}^n \omega_j} + \left(\prod_{i=1}^n \omega_i\right)\sum_{i=1}^N C_i\chi_i \qquad (60)$$

is employed. The first term in the solution structure of expression (60) interpolates given boundary conditions. The second term in the solution structure contains N degrees of freedom and it allows modification of the function $f$ away from the boundary. Therefore the solution structure of expression (60) defines a family of functions exactly satisfying the given boundary conditions. Different sets of the coefficients $C_i$ give a different functions. To determine the particular function involved, the unknown coefficients $C_i$ must be found via minimization of one of the functionals of expression (57), expression (58), or expression (59) which requires the differentiation of the solution structure of expression (60) and integration of the derivatives in order to construct a system of linear algebraic equations. The solution of this system gives the numerical values of the coefficients $C_i$ in the solution structure of expression (60).

Figure 46:
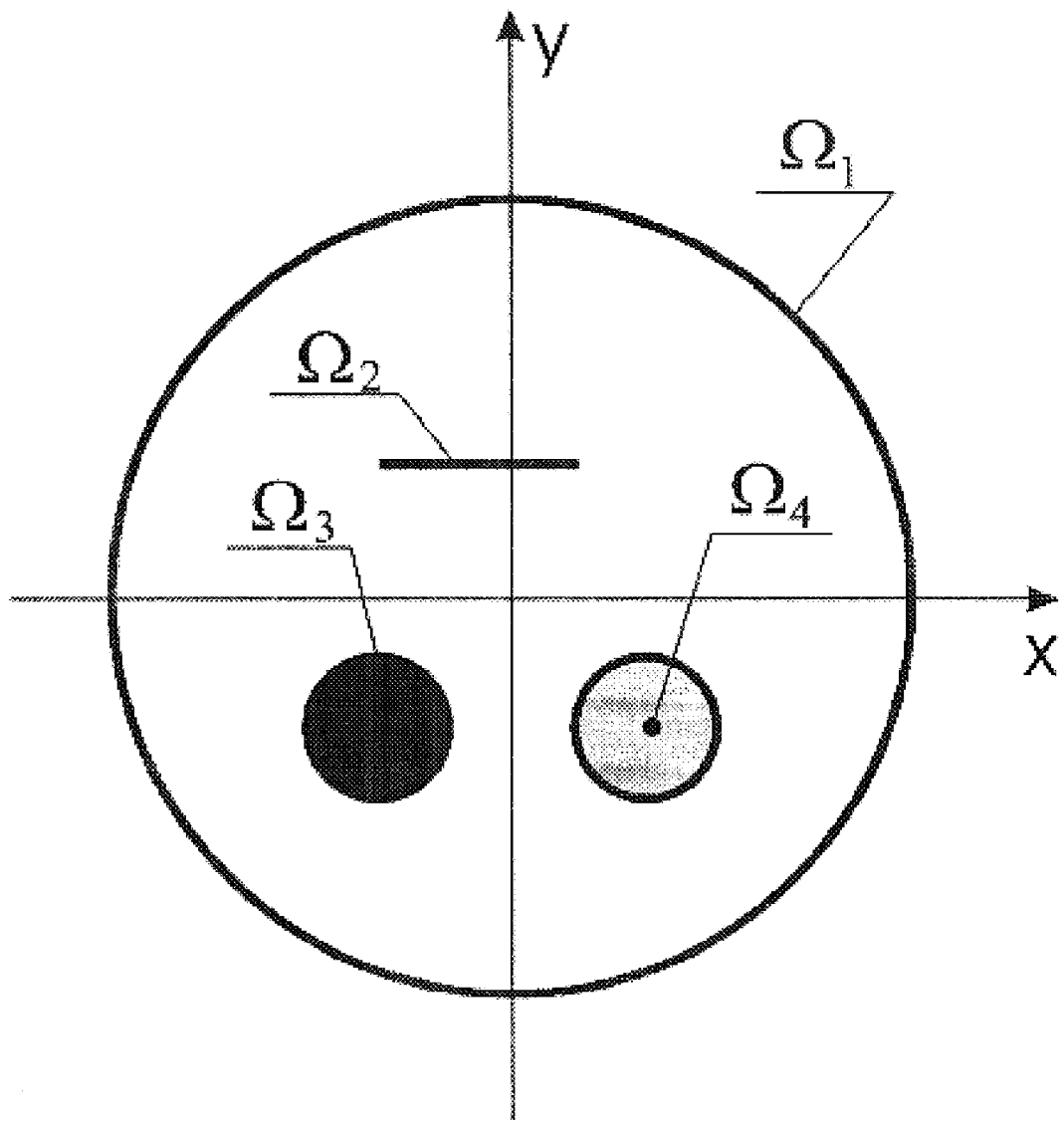
FIG. 46 shows regions $\Omega_1$, $\Omega_2$, $\Omega_3$ and $\Omega_4$ which are heterogeneous in their dimensions.
Figure 47:
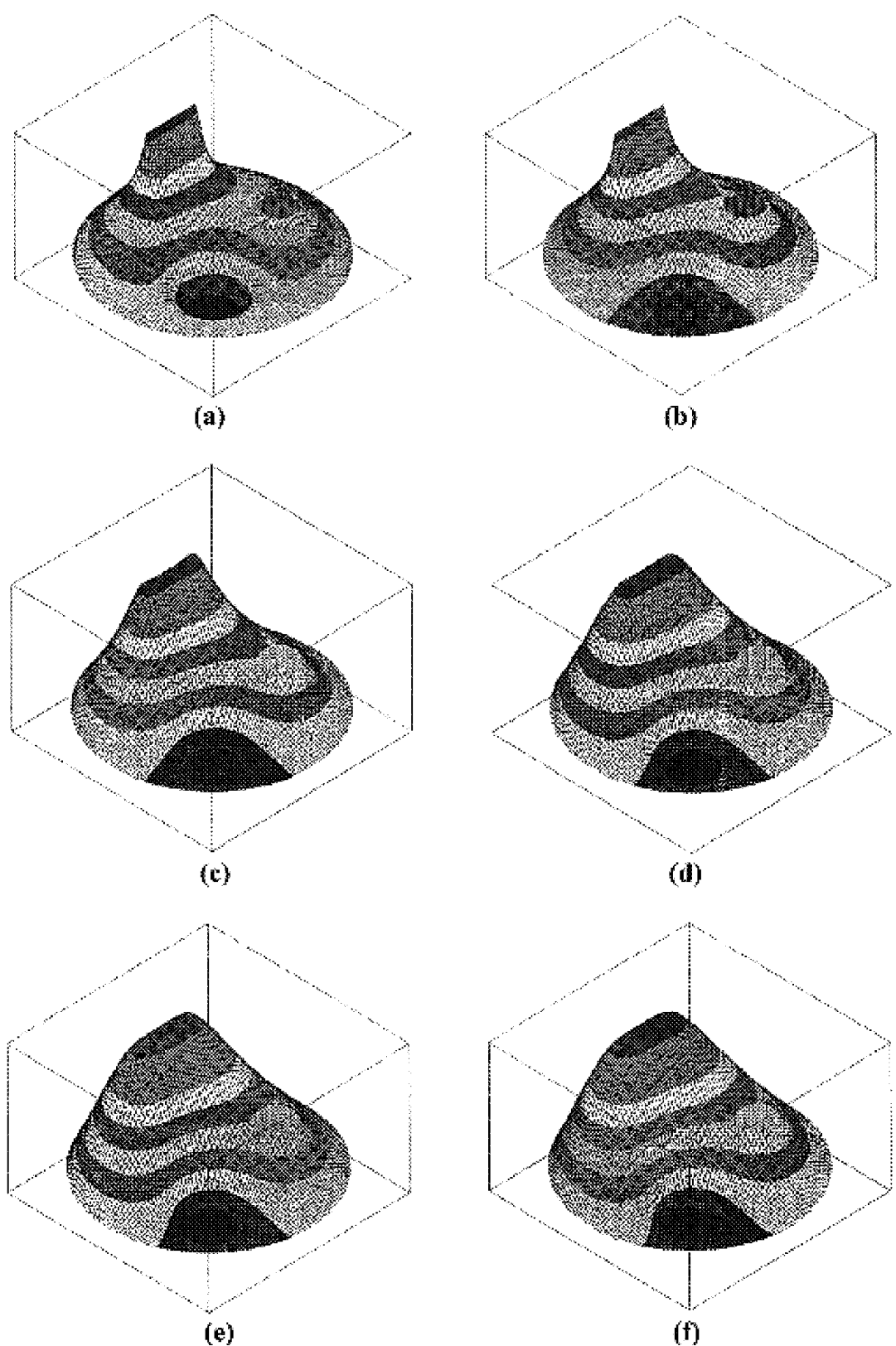
FIG. 47 shows (a) the function interpolating the given values over the regions shown in FIG. 46; (b) the smoothed surface as result of minimization of the functional expression (59) (as set forth in the Detailed Description portion of this document) with $\alpha=0$; (c) with $\alpha=0.05$; (d) with $\alpha=0.25$; (e) with $\alpha=0.5$; (f) with $\alpha=1$.

As an example, FIG. 47 shows the results of computations for the boundary value problem specified by $$f_{|\Omega_1} = 0; \qquad (61\text{-}64)$$
$$f_{|\Omega_2} = 5;$$
$$f_{|\Omega_3} = -1;$$
$$f_{|\Omega_4} = 2;$$

on circle $\Omega_1$, line segment $\Omega_2$, and on the circular regions $\Omega_3$ and $\Omega_4$ shown in FIG. 46. In all cases, the resulting surface represents an approximation of the solution structure of expression (60) with bicubic B-splines on a uniform rectangular 40×40 grid chosen as basis functions $\{\chi_i\}_{i=1}^N$. The coefficients $C_i$ of B-splines were computed to minimize the functional of expression (59) with varying values of the parameter $\alpha$. FIG. 47(a) shows only the interpolant term of the solution structure; FIG. 47(b) shows the computed $f$ for $\alpha=0$, corresponding to the membrane functional of expression (57). Notice the discontinuity of the first derivatives along the line segment $\Omega_2$. This discontinuity of the interpolant can be smoothed out by setting $\alpha=1$, corresponding to the thin plate functional of expression (58). The resulting function is shown in FIG. 47(f). Functions in FIG. 47(c), (d), and (e) were computed for intermediate values of $\alpha=0.05$, $\alpha=0.25$, and $\alpha=0.5$ respectively.

Example: Homogeneous Dirichlet Boundary Conditions—Torsion Problem

Following is an example of the application of the foregoing methods to the classical problem of torsion on a rod having the cross section shown in FIG. 14(a). This is a textbook problem, with many good approximations already known. For example, an approximate analytic expression for torque in terms of parameters r, b, and a (as illustrated in FIG. 14(a)) has been derived for the same domain in Walter D. Pilkey, *Formulas for stress, strain, and structural matrices*, John Wiley & Sons, 1994 and will be used here for comparison.

It is well known that the torsion problem may be reduced to a boundary value problem applying Poisson's equation and homogeneous Dirichlet boundary conditions (Step 120):

$$-\nabla^2 u=2; \ u_{|\partial\Omega}=0, \qquad (65)$$

where u(x,y) is the stress function. The solution will be represented in the form of expression (44) (Step 130), with function $\omega$ defined by expression (24) (Step 110). For the undetermined function $\Phi$, the method will apply a linear combination $\Sigma C_i\chi_i$ of bicubic B-splines on a uniform 40×40 grid that covers the given two-dimensional domain (but does not conform to it). An approximate solution to expression (65) can be found by the user or application applying Ritz's method (Step 160), which requires minimization of the functional:

$$F = \int\int_\Omega \left(\nabla\left(\omega\sum_{i=1}^n C_i\chi_i\right)\right)^2 d\Omega - 4\int\int_\Omega \left(\omega\sum_{i=1}^n C_i\chi_i\right) d\Omega \qquad (66)$$

Differentiating the functional of expression (66) with respect to the unknown coefficients $C_i$, a system of linear algebraic equations is obtained:

$$AC=G \qquad (67)$$

with elements of the matrix A and vector G expressed as:

$$a_{ij} = \int\int_\Omega (\nabla(\omega\chi_i)\cdot\nabla(\omega\chi_j))d\Omega; \qquad (68)$$

$$g_i = 2\int\int_\Omega (\omega\chi_i)d\Omega \qquad (69)$$

The solution procedure requires:
(1) differentiation of the constructed functions (Step 520) (as set forth, e.g., in L. B. Rall and G. F. Corliss, An introduction to automatic differentiation, in M. Berz, C. Bischof, G. Corliss, and A. Griewank, editors, *Computational Differentiation, Procs. Second International Workshop on Computational Differentiation*, SIAM, 1996; A. N. Shevchenko and V. N. Rokityanskaya, Automatic differentiation of functions of many variables, *Cybernetics and System Analysis*, 32(5) :709–723); followed by
(2) integration over the domain (Step 530) (as set forth, e.g., in W. H. Press, S. A. Teukolsky, W. T. Vetterling, and B. P. Flannery, *Numerical Recipes in C*, Cambridge University Press, second edition, 1992); and
(3) solving the system of expression (67) (Step 550). Once numerical values of the coefficients $C_i$ are known (Steps 560, 570), the same tools may be used to compute the other integral and differential characteristics of interest. Specifically, the torque can be computed as $$J = 2\int\int_\Omega u\, d\Omega \qquad (70)$$

and the shearing stresses are given by $$\tau_{xz} = \frac{\partial u}{\partial y}; \quad \tau_{yz} = -\frac{\partial u}{\partial x}. \qquad (71)$$

Figure 27:
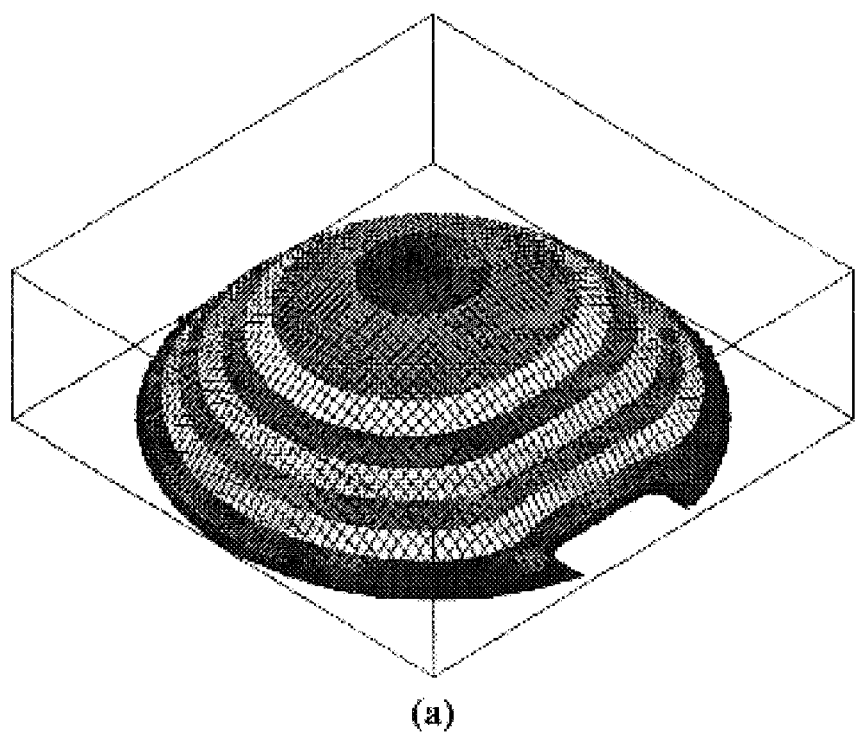
FIG. 27 illustrates the stress function for the rod of FIG. 14(a) computed by the invention for (a) b=0.2; (b) b=0.5.
Figure 27:
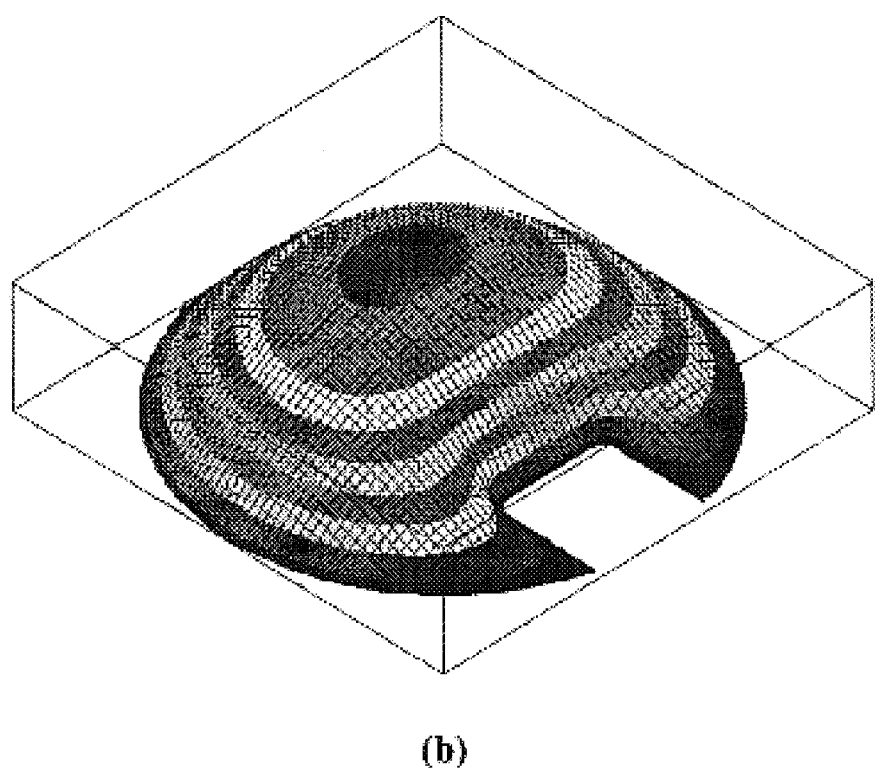
Figure 28:
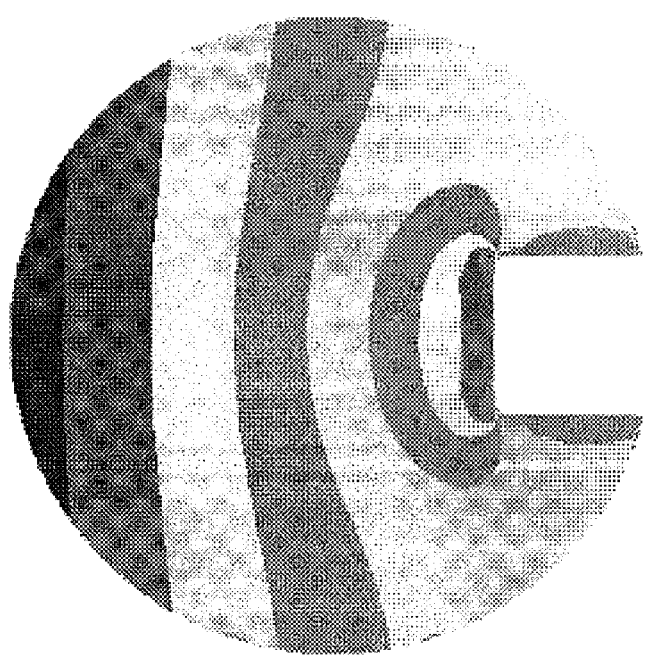
FIG. 28 illustrates the (a) stresses $\tau_{xz}$ and (b) $\tau_{yz}$ for the rod of FIG. 27 predicted with expression (44) as set forth in the Detailed Description portion of this document.
Figure 28:
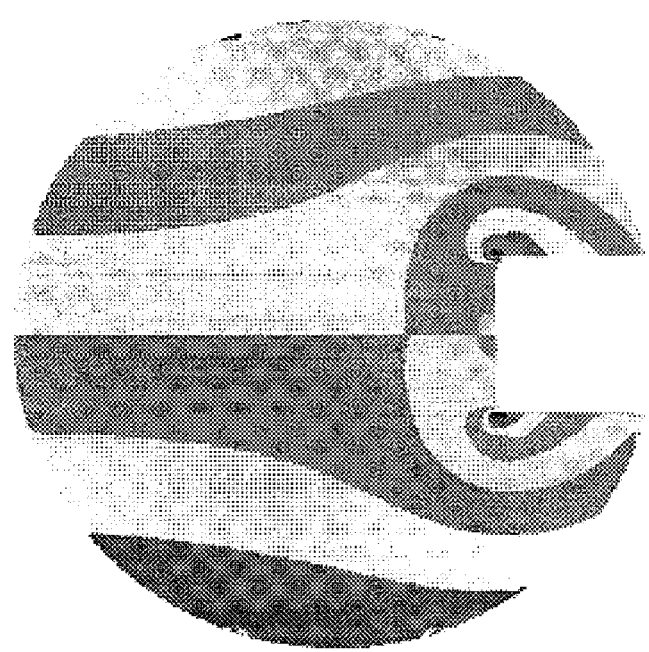
Figure 29:
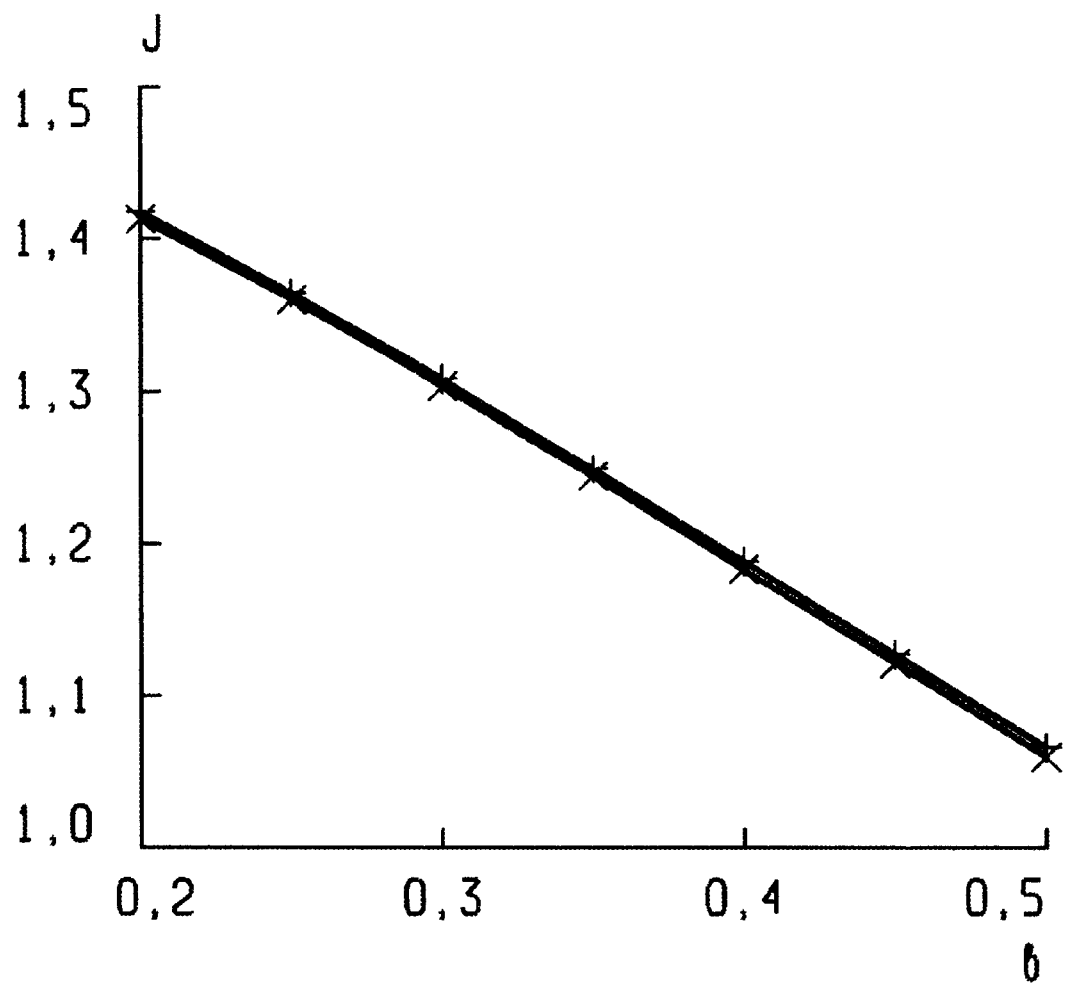
FIG. 29 illustrates the comparison of torques for the rod of FIG. 14(a): "+" denotes torque predicted by the closed-form approximation in Walter D. Pilkey, *Formulas for stress, strain, and structural matrices*, John Wiley & Sons, 1994; "x" denotes the torque computed by the invention.

Notice that any parametric changes in the domain—e.g., changes in the dimensions of the rod—are automatically translated into parametric changes of the function wand require no changes in the solution procedure. To illustrate, FIG. 27 shows the effect on computed stress functions of fixing r=1,α=0.25, and varying b from 0.2 (FIG. 27(*a*)) up to 0.5 (FIG. 27(*b*)). FIGS. 28(*a*) and (*b*) show the computed shearing stresses $\tau_{xz}$ and $\tau_{yz}$ in the geometric domain with b=0.5. Finally, FIG. 29 shows that the computed torque for multiple values of b are virtually identical to those predicted by the closed-form expression of Walter D. Pilkey, *Formulas for stress, strain, and structural matrices*, John Wiley & Sons, 1994.

Example: Mixed Boundary Conditions—Heat Transfer Problem

Nonsteady-state heat conduction in the combustion chamber (FIG. 30) is modeled by a Poisson equation:

$$\lambda\nabla^2 T = c_p\rho\frac{\partial T}{\partial t} \qquad (72)$$

where $\lambda$ is thermal conductivity, $c_p$ is specific heat, $\rho$ is material density, T is the metal temperature, and t is time. The equation holds in the cylinder walls and in the piston, subject to the mixed boundary conditions (Step 120):

$$T_{|\partial\Omega_1} = T_{oil}; \quad \left(-\lambda\frac{\partial T}{\partial n}\right)_{|\partial\Omega_2} = q, \qquad (73)$$

where q is the heat flux generated by the combustion process. For illustration purposes, the boundary conditions—as set forth in Y. Liu and R. D. Reitz, Multi-dimensional modeling of engine combustion chamber surface temperatures, in *Advances in SI and Diesel Engine Modeling* (SP-1276), SAE-971594, pp. 57–71, May 1997—are simplified and it will be assumed that q remains constant.

To complete the formulation of the boundary value problem, the initial conditions need to be prescribed. Any known distribution of the temperature field can be chosen for that purpose. Without loss of generality, it can be assumed that the initial temperature distribution occurred sufficiently far in advance and therefore satisfies the steady state version of expression (72):

$$\lambda\nabla^2 T = 0 \qquad (74)$$

Figure 30:
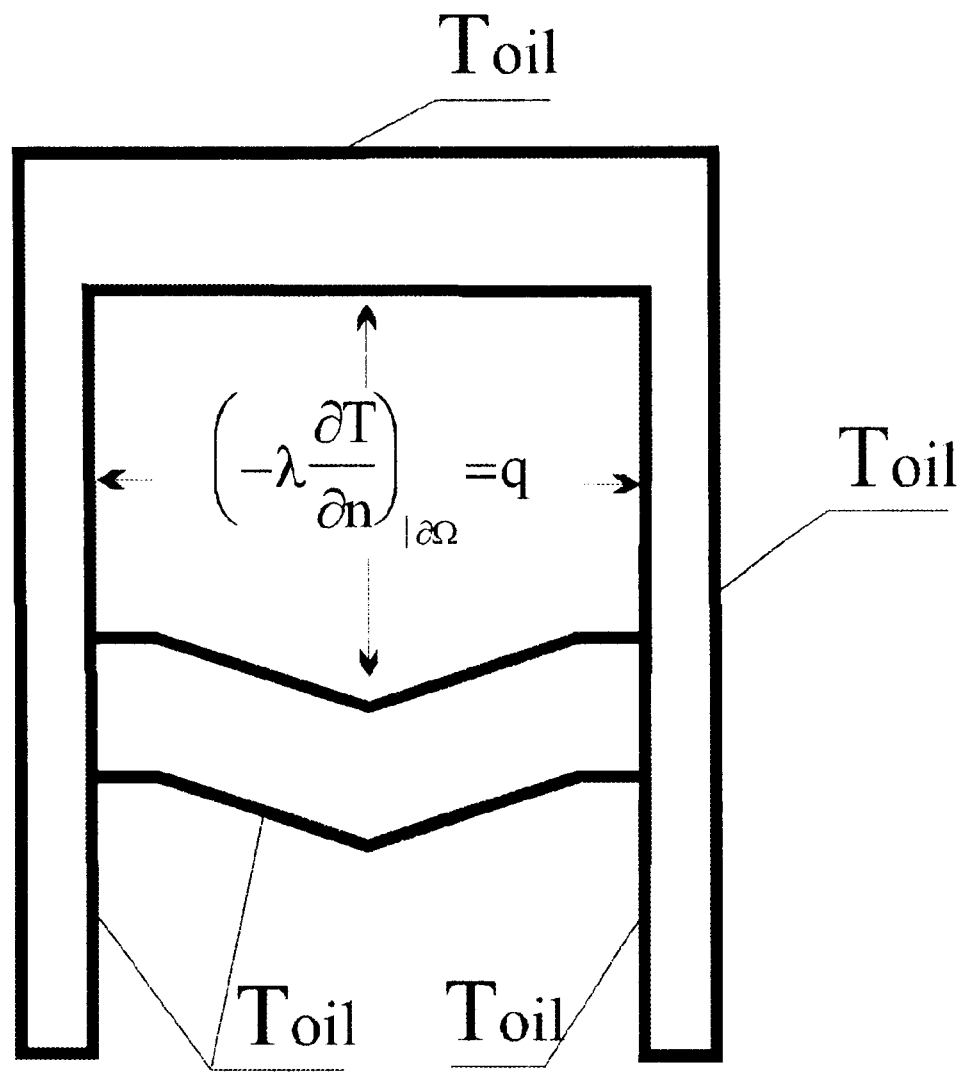
FIG. 30 illustrates a simplified model of heat transfer in an exemplary engine combustion chamber.
Figure 31:
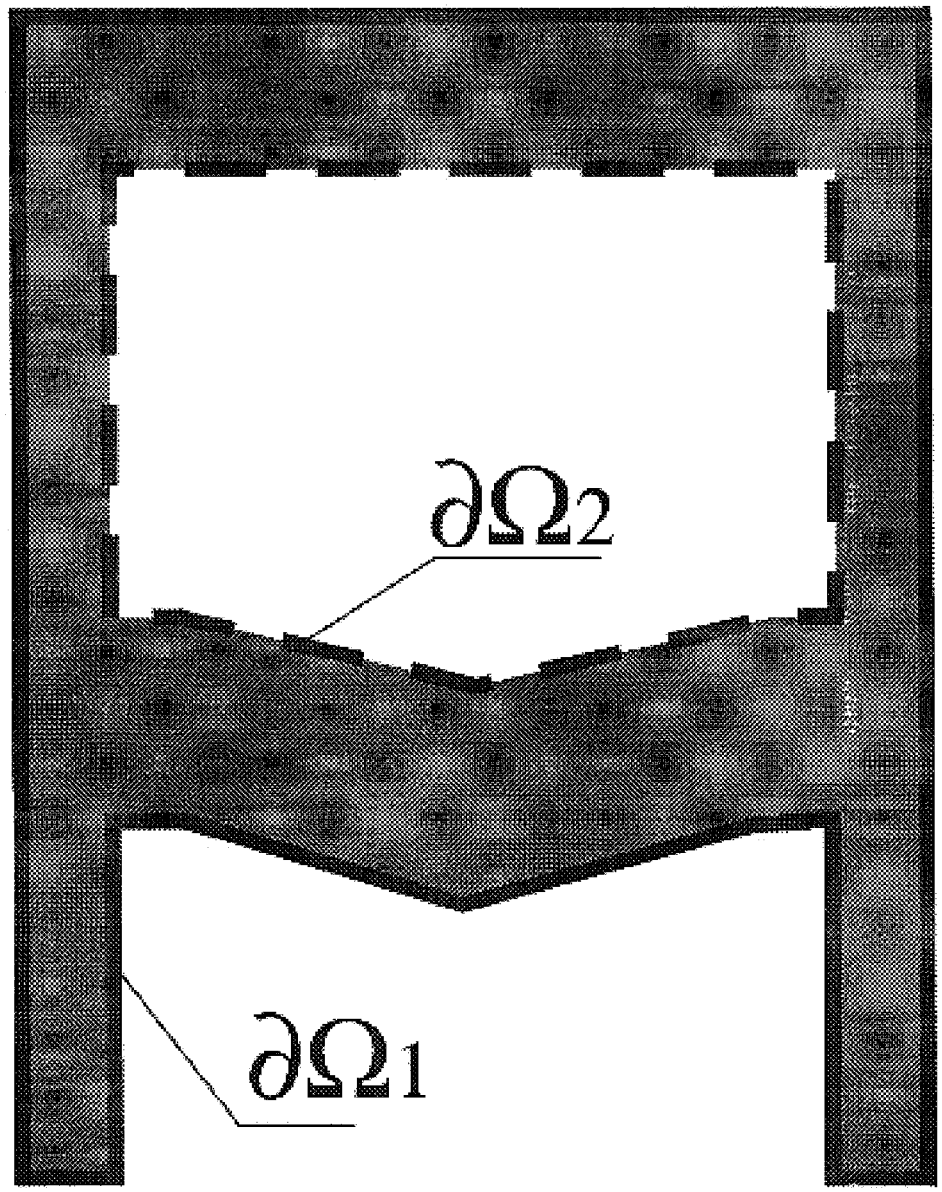
FIG. 31 illustrates the boundaries $\partial\Omega_1$ and $\partial\Omega_2$ of the combustion chamber of FIG. 30, which correspond to two different types of boundary conditions on the chamber $\Omega$.

In order to construct the solution structure for this problem, the geometry of the domain first needs to be described using appropriate implicit functions $\omega_i$. Specifically, in FIG. 31 the boundary of the chamber $\Omega$ is divided in two parts: with Dirichlet boundary conditions at the exterior boundary of the chamber $\partial\Omega_1$, and Neumann boundary conditions at the interior boundary of the chamber $\partial\Omega_2$ (FIG. 30). Both boundaries are moving, and therefore at any given time instance, the solution structure for this problem requires functions $\omega_1$ and $\omega_2$ whose zero sets correspond to points of $\partial\Omega_1$ and $\partial\Omega_2$ respectively. These functions are easily constructed using R-functions in the following manner.

Figure 32:
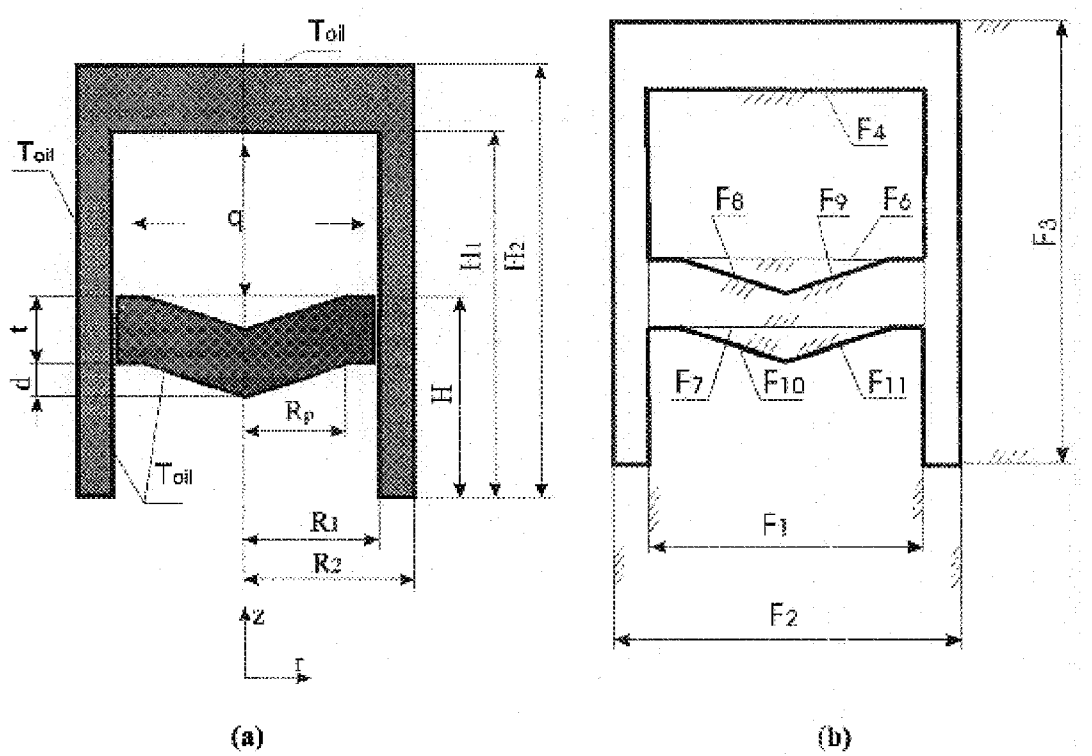
FIG. 32 illustrates the geometrical primitives used to describe the engine combustion chamber of FIG. 30.

FIG. 32(*a*) shows a geometric parameterization of the engine combustion chamber used as an example in this section. The details (angles, gaps, etc.) are exaggerated for illustration purposes. Using these parameters, a number of simple geometric primitives are defined, as shown in FIG. 32(*b*) (Step 200):

Two vertical strips $f_i$, i=1,2 are defined by:

$$F_i = F_i(f_i \geq 0); f_i = \frac{R_i^2 - x^2}{2R_i} \qquad (75)$$

The horizontal strip:

$$F_3 = F_3(f_3 \geq 0); f_3 = \left(\left(\frac{H_2}{2}\right)^2 - \left(y - \frac{H_2}{2}\right)^2\right)H_2^{-1} \geq 0 \qquad (76)$$

Three horizontal linear halfplanes:

$$F_4 = F_4(f_4 \geq 0); F_6 = F_6(f_6 \geq 0); F_7 = F_7(f_7 \geq 0) \qquad (77)$$

$$f_4 = H_1 - y; f_6 = H - y; f_7 = y - (H - t); \qquad (78)$$

and four inclined linear halfplanes $f_8, f_9, f_{10}, f_{11}$:

$$F_8 = F_8(f_8 \geq 0); F_9 = F_9(f_9 \geq 0); \quad (79)$$

$$F_{10} = F_{10}(f_{10} \geq 0); F_{11} = F_{11}(f_{11} \geq 0); \quad (80)$$

$$f_8, f_9 = \frac{-R_p y \pm d \cdot x + R_p(H-d)}{\sqrt{R_p^2 + d^2}}; \quad (81)$$

$$f_{10}, f_{11} = \frac{R_p y \pm d \cdot x - R_p(H-t-d)}{\sqrt{R_p^2 + d^2}}; \quad (82)$$

Notice that all primitives $f_i$ are normalized in this example.

Figure 33:
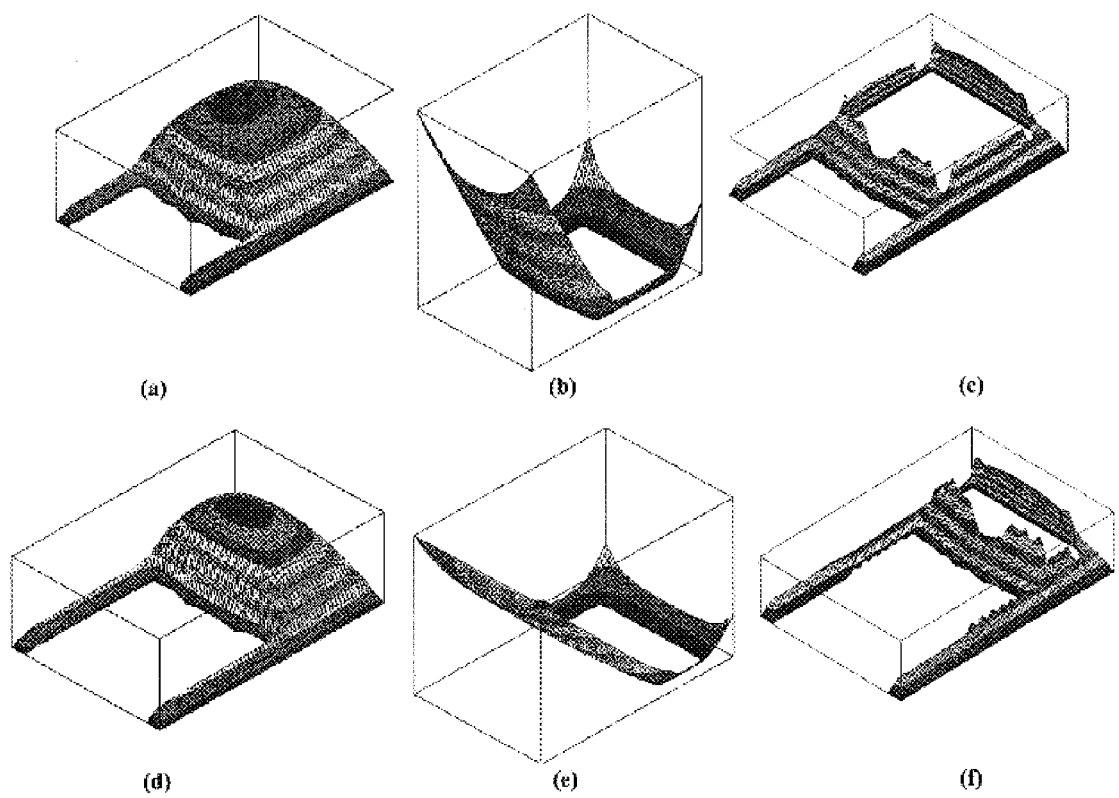
FIG. 33 illustrates two rows of plots corresponding to the two piston positions. The first (leftmost) column of plots illustrates $\omega_1=0$, which defines the boundaries where $T_{oil}$ is prescribed. The second (middle) column of plots illustrates $\omega_2=0$, which models the boundaries where the heat flux q is known. The third (rightmost) column of plots illustrates computed quasi-steady temperature distributions.

These primitives can be combined using set operations ∩ (intersection/logical disjunction) and ∪ (union/logical conjunction) to define the two-dimensional regions $\Omega_1$ and $\Omega_2$ (Step 210). In this example, $\Omega_1$ is the region bounded by the exterior walls where the oil temperature $T_{oil}$ is prescribed, and $\Omega_2$ defines the (unbounded) region extending from the interior walls of the combustion chamber with the known heat flux q. Syntactically replacing the set operations by the corresponding R-functions yields inequalities defining $\Omega_1$ and $\Omega_2$ respectively as (Steps 220, 230):

$$\omega_1 = (f_2 \Lambda_0 f_3) V_0(-(f_1 V_0 - (f_7 V_0(f_{10} \Lambda_0 f_{11})))) \geq 0 \quad (83)$$

$$\omega_2 = (-(f_1 \Lambda_0 f_4)) V_0(f_6 \Lambda_0 (f_8 V_0 f_9)) \geq 0 \quad (84)$$

where operations $\Lambda_0$, $V_0$ are the R-functions defined by (1) with $\alpha=0$. Both functions $\omega_1$ and $\omega_2$ are parameterized by H, which measures the piston's position at any given time (see FIG. 32). Substituting the well-known kinematic description of a slider-crank mechanism:

$$H(t) = r\cos\Theta(t) + l\left(1 - \frac{r^2}{l^2}\sin^2\Theta(t)\right)^{\frac{1}{2}} \quad (85)$$

into the defining equations yields the required representations of $\omega_1(t)$, $\omega_2(t)$. The functions $\omega_1$ and $\omega_2$ are plotted in FIG. 33 for two distinct positions of the piston.

An appropriate solution structure is then obtained by applying the solution structure for mixed boundary conditions (as described, e.g., in V. L. Rvachev, *Theory of R-functions and Some Applications*, Naukova Dumka, 1982) with the specific boundary conditions (Step 130):

$$T = \omega_1 \Phi + \frac{\omega_1 \omega_2}{\omega_1 + \omega_2}\left(-\frac{q}{\lambda} + \omega_2 \Phi - D_1^{\omega_2}(\omega_1 \Phi) - D_1^{\omega_2}(T_{oil})\right) + T_{oil} \quad (86)$$

where mixed boundary conditions are prescribed on the boundaries of the regions defined by implicit functions $\omega_1=0$ and $\omega_2=0$ respectively.

Figure 34:
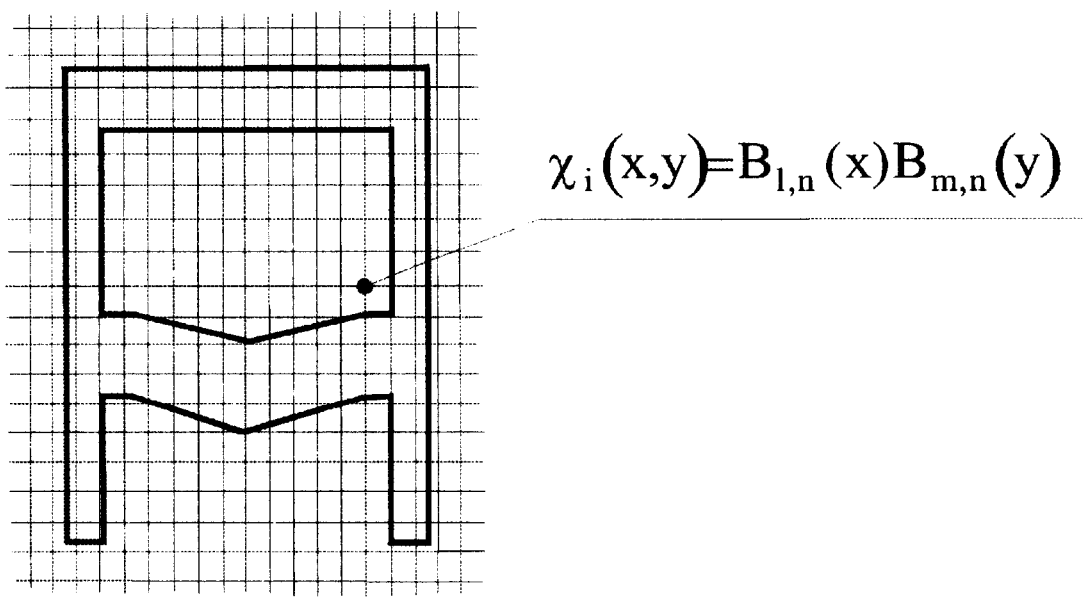
FIG. 34 illustrates the application of a rectangular grid of B-splines over the engine combustion chamber of FIG. 30 for use in computing a solution. The same grid (or similar grids) may be used to compute approximate solutions over any geometric domain.

To complete the solution structure, an approximation also needs to be chosen for the unknown function $\Phi$ in the form of expression (45). This approximation can be achieved by any system of linearly independent basis functions $\chi_i$ (Step 430), because their choice does not depend on the geometry of domain or boundary conditions. In this case, $\Phi$ is approximated by a linear combination of bicubic B-splines over a uniform 50×50 rectangular grid, as illustrated in FIG. 34. B-splines are chosen owing to their attractive computational properties (as summarized, e.g., in Carl de Boor, *A Practical Guide to Splines*, Springer-Verlag, 1978), though other basis functions could be used instead.

As discussed previously, expression (86) can be also viewed as an operator B acting on the unknown function $\Phi$. B is clearly dependent on the geometry of the problem as represented by functions $\omega_1$ and $\omega_2$ and the boundary conditions q and $T_{oil}$. If dependence of these variables on time is known, the time-dependent solution structure is immediately obtained as $$T(t) = B_t(\omega_1(t), \omega_2(t), q(t), T_{oil}(t))[\Phi] \quad (87)$$

In this simplified model, q and $T_{oil}$ remain constant, while the time-dependent functions of $\omega_1(H(t))$ and $\omega_2(H(t))$ are completely determined by the law of motion given by expression (85), yielding the time-dependent solution structure $B_t[\Phi]$ corresponding to the expression (86).

The above solution structure defines the family of functions that satisfy the specified boundary and the initial conditions, but not any particular differential equation. A particular function is obtained for every choice of the unknown coefficients $C_i$ and of the basis functions, and these should be chosen in such a way as to approximate the exact solution to the differential equation as closely as possible. Because expression (72) is a non-steady equation, the coefficients $C_i$ are themselves functions of time; furthermore, their values at any instant of time are dependent on the earlier solutions. To solve the problem, it is first discretized by time, and then the quasi-steady problem is solved at every time step. The discrete (in time) version of the differential equation of expression (72) has the following form:

$$\lambda \nabla^2 T_k = c_\rho \rho \frac{T_k - T_{k-1}}{\Delta t} \quad (88)$$

where $T_k$ and $T_{k-1}$ are temperature distributions on the kth and (k-1)th time step. Applying an implicit finite-difference scheme (as described, e.g., in W. H. Press, S. A. Teukolsky, W. T. Vetterling, and B. P. Flannery, *Numerical Recipes in C*, Cambridge University Press, second edition, 1992) to expression (88) yields:

$$\lambda \nabla^2 T_k = c_\rho \rho \frac{T_k}{\Delta t} = -c_\rho \rho \frac{T_{k-1}}{\Delta t} \quad (89)$$

At time $t_k$, expression (89) describes a quasi-steady problem for the unknown temperature field $T_k$. Note that the right side of the equation contains the (previously computed) temperature distribution $T_{k-1}$ at the previous time instant, but it is applied to the quasi-steady problem at time $t_k$. Since the value of function $T_{k-1}$ at kth time step is given by $B_{t_{k-1}}[\Phi_{k-1}]$, solving expression (89) requires knowledge of both solution structures $B_{t_{k-1}}$ and $B_{t_k}$, or at least the transformation from the current structure $B_{t_k}$ to the previous structure $B_{t_{k-1}}$. In our case, this relationship is determined by the change in value $H(t_k)-H(t_{k-1})$ of the motion parameter H.

A variety of numerical methods can be used to solve (approximately) expression (89) for the unknown coefficients $C_i$. Here, a variational method with the least square approximation will be used. This requires first reducing the given boundary value problem to a problem with homogeneous boundary conditions as follows. First, the sought solution $T_k$ is separated into two parts:

$$T_k = T_k^1 + T_k^0 \quad (90)$$

where $$T_k^1 = \sum_{i=1}^n C_i B(\omega_1(t_k), \omega_2(t_k), 0, 0)[\chi_i] = \sum_{i=1}^n C_i \zeta_i^k \quad (91)$$

is a linear combination of the basis functions $\{\zeta_i\}$ satisfying the homogeneous boundary a conditions, and $$T_k^0 = B(\omega_1(t_k), \omega_2(t_k), q, T_{oil})[0] \quad (92)$$

satisfies the given nonhomogeneous boundary conditions.

Substituting expression (90) into expression (89) yields a quasi-steady differential equation in $T_k^1$ with homogeneous boundary conditions:

$$\lambda \nabla^2 T_k^1 - c_p \rho \frac{T_k^1}{\Delta t} = -c_p \rho \frac{T_{k-1} - T_k^0}{\Delta t} - \lambda \nabla^2 T_k^0 \quad (93)$$

Note that the right side of the equation contains only known quantities, including the approximate non-homogeneous solution $T_k^0$ and temperature distribution $T_{k-1}$ on the previous time step. Solving this equation entails computing the coefficients $C_i$ of the basis $\{\zeta_i\}$ that approximates the homogeneous solution $T_k^1$ and therefore the temperature field $T_k$.

To approximate expression (93) using the least-square method (Step 510), the following functional requires minimization:

$$F = \int\int_\Omega \left( \lambda \nabla^2 T_k^1 - c_p \rho \frac{T_k^1}{\Delta t} - \left( -c_p \rho \frac{T_{k-1} - T_k^0}{\Delta t} - \lambda \nabla^2 T_k^0 \right) \right)^2 d\Omega \quad (94)$$

Differentiating functional (94) with respect to the unknown coefficients $C_i$, a system of linear algebraic equations is obtained (Step 540):

$$[\alpha_{ji}][C_i] = [b_j] \quad (95)$$

with the coefficients computed as follows (Step 530):

$$a_{ji} = \int\int_\Omega \left( \lambda \nabla^2 \zeta_i - c_p \rho \frac{\zeta_i}{\Delta t} \right) \left( \lambda \nabla^2 \zeta_j - c_p \rho \frac{\zeta_j}{\Delta t} \right) d\Omega \quad (96)$$

$$b_j = \int\int_\Omega \left( -c_p \rho \frac{T_{k-1} - T_k^0}{\Delta t} - \lambda \nabla^2 T_k^0 \right) \left( \lambda \nabla^2 \zeta_j - c_p \rho \frac{\zeta_j}{\Delta t} \right) d\Omega \quad (97)$$

Figure 35:
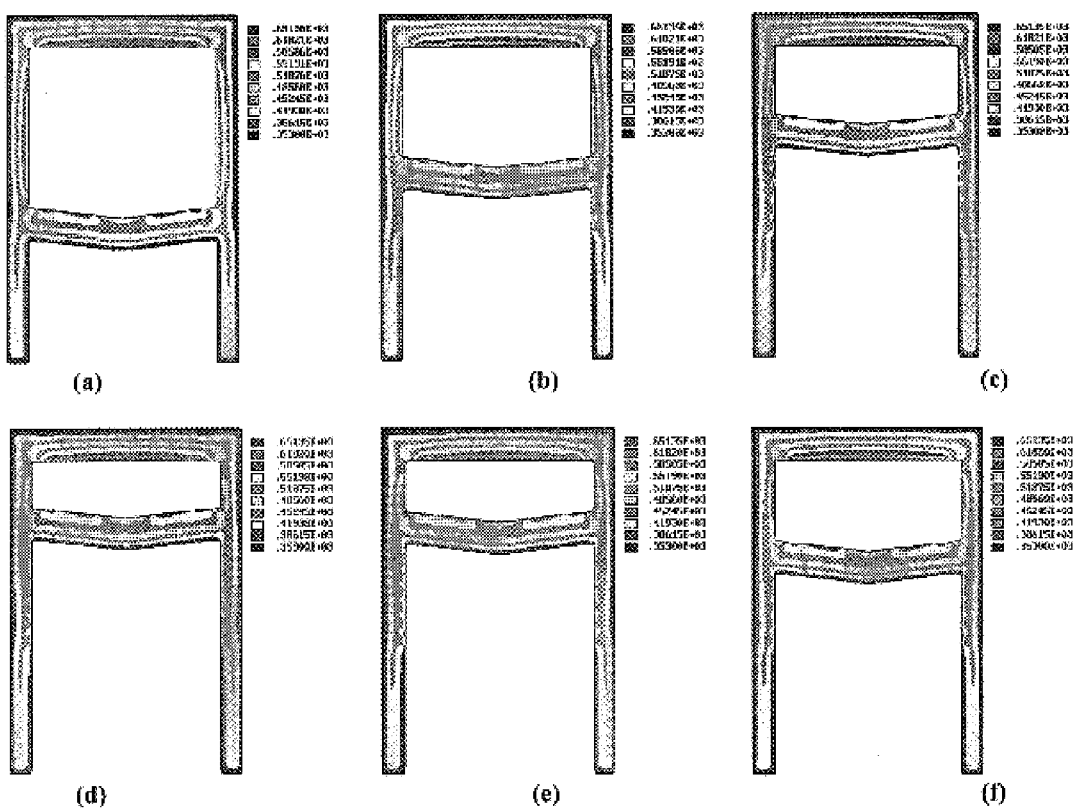
FIG. 35 illustrates the computed quasi-steady temperature fields for six different positions of the piston of the engine combustion chamber of FIG. 30.

Solving the linear system of expression (95) (Step 550) and substituting the value of coefficients $C_i$ (Step 560) into the solution structure of expression (86) yields an approximate solution $T_k$ to the quasi-steady problem at time $t_k$. (Step 570). First, the steady equation of expression (74) can be solved for the initial temperature distribution $T_0$. At the next time step $t_{k+1}$, the new position of the piston H can be compared from expression (85), this automatically updates the definitions of functions $\omega_1$ and $\omega_2$ and the solution structure $B_{t_{k+1}}$ at time $t_{k+}$. The quasi-steady problem can then be solved again, and the entire process can be repeated. FIG. 35 shows the computed temperature distributions for six different piston positions.

Figure 36:
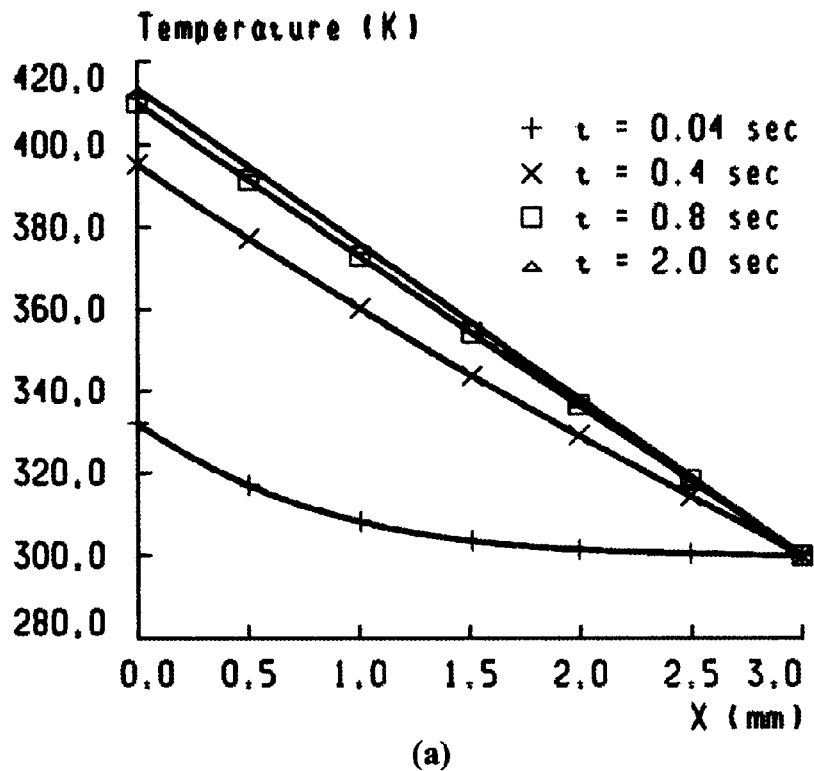
FIG. 36 illustrates the temperature distributions in a one dimensional slab computed using different time steps.
Figure 36:
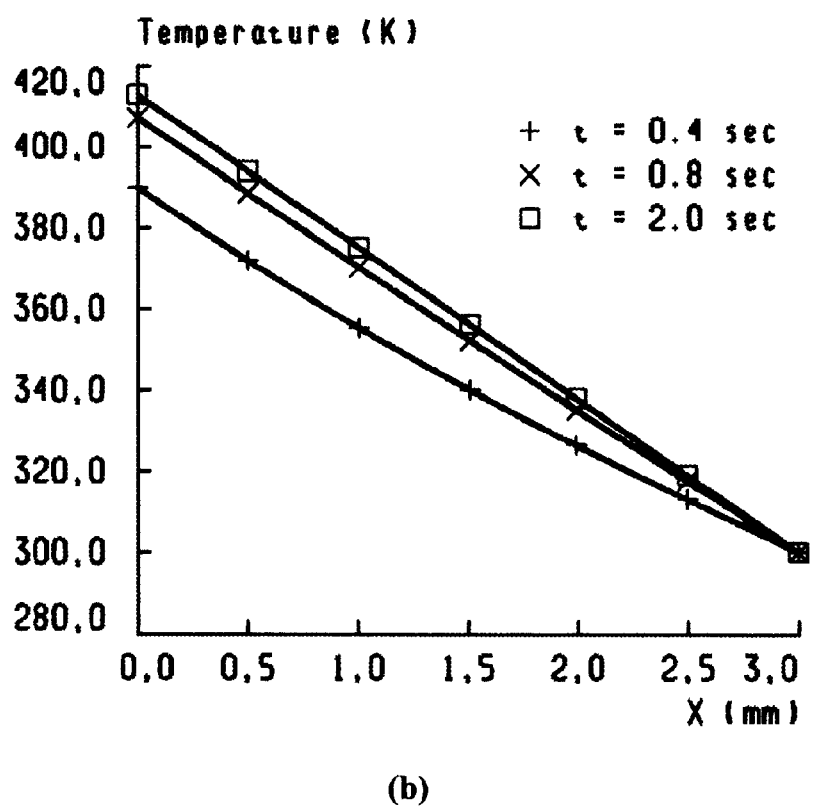

Validation of the foregoing solution procedure has been performed using a simple one-dimensional problem that was also used in Y. Liu and R. D. Reitz, Modeling of heat conduction within chamber walls for multidimensional internal combustion engine simulation, *Int. J. Heat Mass Transfer*, 41(6–7):859–869, 1998. FIG. 36 shows the prediction of heat conduction in a one-dimensional 3 mm thick slab with thermal conductivity $$\lambda = 53.1 \ \frac{\text{W}}{\text{m} \cdot \text{K}},$$

density $$\rho = 7870 \ \frac{\text{kg}}{\text{m}^3}$$

and specific heat $$c_p = 447 \ \frac{\text{J}}{\text{kg} \cdot \text{K}}.$$

The slab is initially at a uniform temperature of T=300 K which is maintained at the right end of the slab. A steady heat flux of $$q = 2 \ \frac{\text{MW}}{\text{m}^2}$$

is applied at the left side beginning at t=0.

Figure 37:
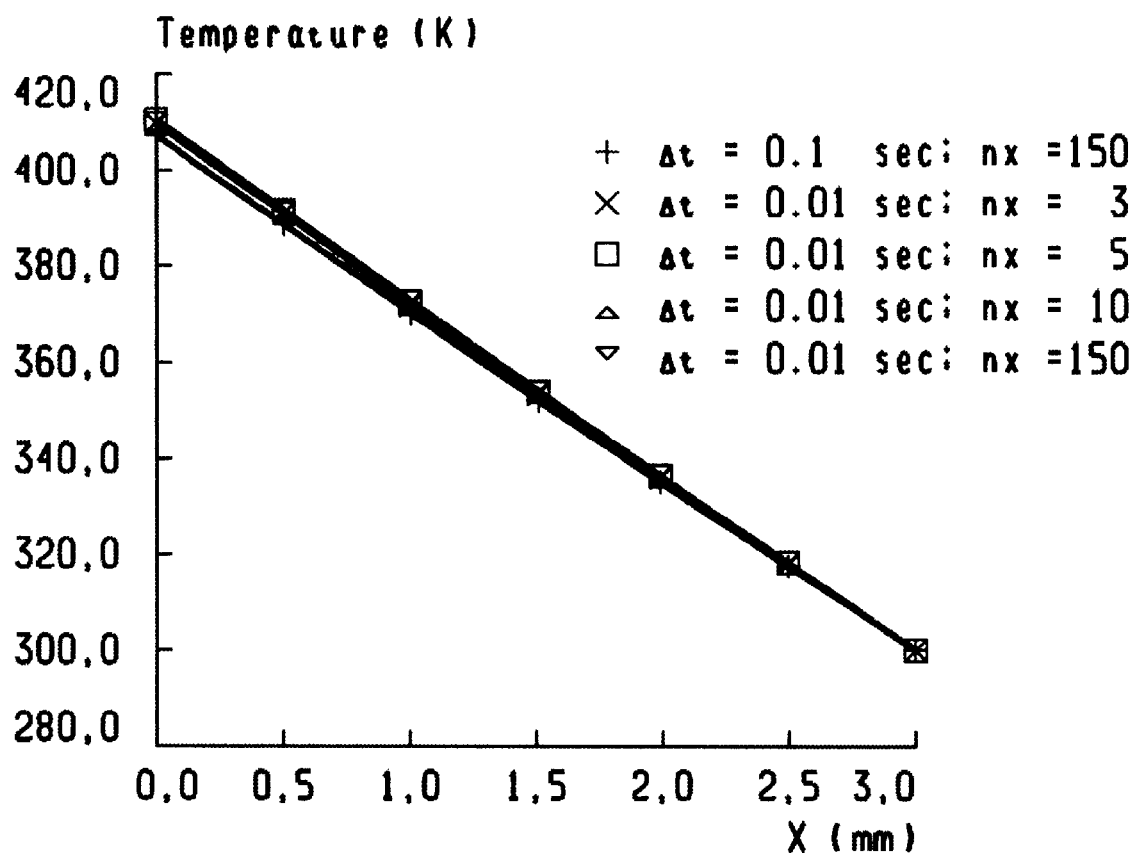
FIG. 37 illustrates a convergence test for the computed temperatures in the one dimensional slab of FIG. 36, wherein the temperature distributions are computed at the same time point using a different time step and different degrees of freedom.

The boundaries of the one-dimensional slab are described by two functions $\omega_1 = 0.003 - x \geq 0$; $\omega_2 = x \geq 0$ that are substituted in the derived solution structure of expression (87). FIGS. 36(*a*) and (*b*) show the temperature distribution predicted by the invention for two different time steps: 0.01 s in FIG. 36(*a*) and 0.1 s in FIG. 36(*b*). The results are essentially identical to those computed in the aforementioned reference using time steps one order of magnitude smaller. Another indication of a convergent solution is given in FIG. 37, which shows sensitivity of the solution at time t=0.8 s with respect to the number nx of the basis functions in $\Phi$ and the time step $\Delta t$.

Example: Sensitivity Analysis and Shape Optimization

Representing geometry by implicit functions and then using the implicit functions in solution structures simplifies later sensitivity analysis and shape optimization. This idea is explained using (as an example) the torsion problem discussed previously in relation to the rod of FIG. 14(*a*).

The differential equation of the problem and boundary conditions are given by expression (65). The sensitivity of the stress function u to design parameters can then be determined. As previously discussed, the stress function u can be represented by the solution structure $$u = \omega \Phi = \omega \sum_{i=0}^n C_i \chi_i \quad (98)$$

The sensitivity of stress function u to design parameter $p_i$ is determined by the partial derivative of u with respect to $p_i$:

$$\frac{\partial u}{\partial p_i} = \sum_{j=0}^n \left( \frac{\partial C_j}{\partial p_i} \omega \chi_j + C_j \left( \frac{\partial \omega}{\partial p_i} \chi_j + \omega \frac{\partial \chi_j}{\partial p_i} \right) \right) = \quad (99)$$

-continued $$\sum_{j=0}^{n}\left(\frac{\partial C_j}{\partial p_i}\omega\chi_j+C_j\frac{\partial \omega}{\partial p_i}\chi_j\right)$$

Expression (99) contains the partial derivative of function $\omega$, whose zero set describes the boundary of the domain with respect to design parameter $p_i$, and the partial derivatives of the coefficients $C_j$ with respect to the same design parameter $p_i$. Partial derivative $$\frac{\partial \omega}{\partial p_i}$$

can be derived analytically because the expression for the function $\omega$ contains design parameter $p_i$. Partial derivatives $$\frac{\partial C_j}{\partial p_i}, j=0,\ldots,n$$

cannot be computed in closed form. In order to get numerical values for these derivatives, the adjoint approach can be used.

First, the differential equation of the problem can be differentiated with respect to the design parameter $p_i$:

$$\frac{\partial}{\partial p_i}(\nabla^2 u)=\frac{\partial}{\partial p_i}(-2). \quad (100)$$

After changing the order of differentiation and simplifying, expression (100) appears as follows:

$$\nabla^2\left(\frac{\partial u}{\partial p_i}\right)=0 \quad (101)$$

Substituting expression (99) into expression (101):

$$\sum_{j=0}^{n}\left(\frac{\partial C_j}{\partial p_i}\omega\chi_j+C_j\chi_j\frac{\partial \omega}{\partial p_i}\right)=0 \quad (102)$$

Denoting $$\frac{\partial C_j}{\partial p_i}=C^*; u_1=\sum_{j=0}^{n}C_j^*\omega\chi_j; \quad (103)$$

The boundary value problem for function $u_i$ is expressed as:

$$\nabla^2 u_1=-\nabla^2\left(\sum_{j=0}^{n}C_j^*\omega\chi_j\right); u_{1|\partial\Omega}=0 \quad (104)$$

Figure 38:
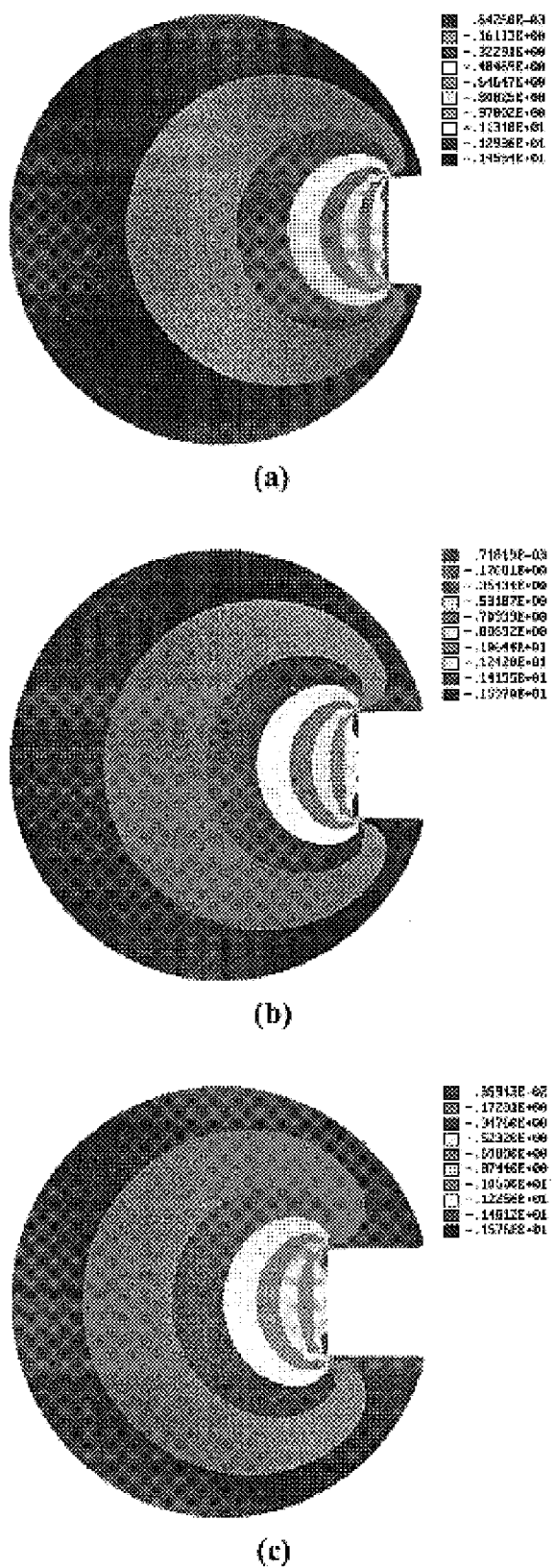
FIG. 38 illustrates the sensitivity of the stress function in the rod of FIG. 14(a) to the design parameter b, computed for different values of b.

FIG. 38 shows the sensitivity of stress function u to design parameter b (shown in FIG. 14(a)) computed for three values of b. Design parameter b controls the shape of the keyway in the rod. Changing b immediately changes the corresponding composite implicit function for the rod's geometry, and the whole analysis procedure may be repeated automatically. This procedure can be applied iteratively and repeatedly in order to determine the optimal geometric design.

Example: Automated Design of a Bracket

The invention can be applied to problems that are difficult or impossible to solve using traditional methods. For example, shape design and optimization can be viewed in terms of shapes/designs being represented by the level sets (isosurfaces or isolines) of an interpolating function or a solution structure. To demonstrate this process, FIGS. 26(a)–(c) illustrate the process for a design of a simple mechanical bracket.

The conceptual high-level design usually begins with a schematic diagram of the part or device. In this case, the schematic diagram is a one-dimensional "skeleton" of the bracket connecting three locating holes. Apart from the hole locations, the shape of the bracket is yet undetermined. More generally and formally, any design could be expressed as a one- or two-dimensional cell complex (see, e.g., R. S. Palmer and V. Shapiro, Chain models of physical behavior for engineering analysis and design, *Research in Engineering Design*, No. 5, 1993, pp. 161–184). The schematic or skeletal design represents an approximation of the final shape of the bracket, and such approximations are routinely used by engineers, who use them to estimate the mechanical properties of the final design. In the case of the bracket, an engineer would use the skeletal design to estimate approximate loads (forces), deformations, and strength (stiffness) on each portion of the skeletal structure. The approximate values then can be used to work towards the final geometry of the bracket using various heuristic rules, for example, that the amount of the material around the skeleton should be proportional to estimated forces, stiffness, or deformation.

The invention allows automation of the entire design process. The skeletal model is taken to be the known portion of the (unknown) geometric model of the bracket, and the loads, deformations, etc. on each portion of the skeleton are assigned to the relevant portions of the skeleton. Denoting each such boundary condition by a vector of value $\overline{\alpha}$, we can view the design problem as an instance of a boundary value problem with the skeleton playing the role of the geometric boundary and $\overline{\alpha}$ playing the role of the boundary conditions. The invention can then be applied as follows:

Construct trimmed implicit functions for each portion of the skeleton with a different value of $\overline{\alpha}$.

Construct the interpolating function that takes on the desired boundary conditions $\overline{\alpha}$ on the corresponding portions of the skeleton.

Figure 26:
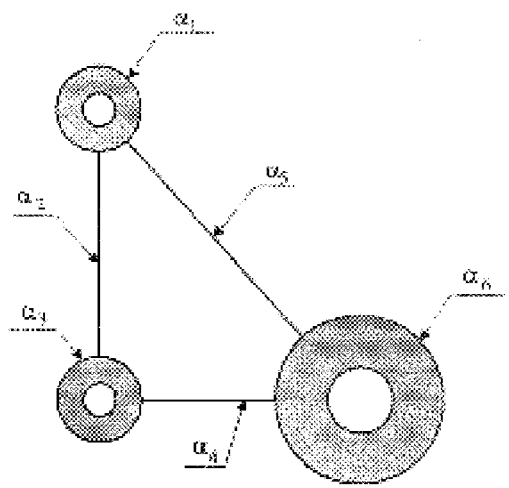
FIG. 26 illustrates the concept of shape design as a level set evolving with speed $\bar{\alpha}$.
Figure 26:
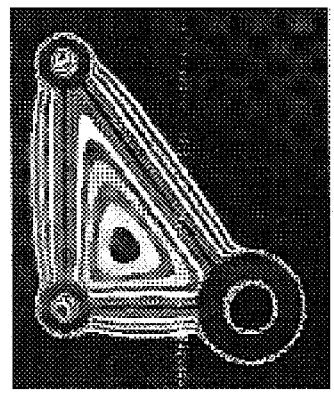
Figure 26:
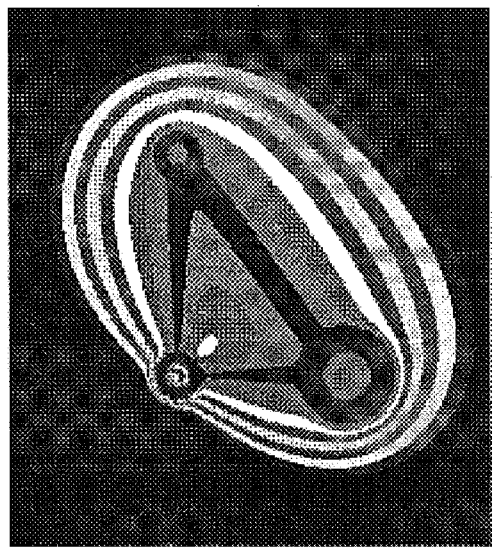

For example, in FIG. 26, the interpolating function is constructed to be zero on the skeleton, but its gradient is specified to take on various values of $\overline{\alpha}$. The gradient of the surface $\omega$ can be viewed as a "speed" of the levels defined by equations $\omega-c=0$ that evolve from the schematic/skeletal model with a speed $\overline{\alpha}$. This example shows that the mechanical properties of a skeletal or schematic model can be used to construct an interpolating function $\omega$, and then equations $\omega-c=0$ will define the possible geometries of the design. Thus, the process automates the heuristic procedure of adding material to the design in proportion to estimated mechanical properties on the skeleton. FIG. 26(b) and (c) show that different values of $\overline{\alpha}$ result in different geometries of isolines, in turn suggesting different shapes for the design.

Furthermore, the interpolating functions constructed from the skeletal boundary conditions satisfy all boundary conditions. These can then be combined with any basis functions into a solution structure for the particular boundary value problem, and the field values throughout the shape can be determined. In other words, each selected shape can be automatically checked to determine whether the shape(s) recommended by the invention meets its required physical properties, this can be done using the same representation, and without meshing. If the field values are not satisfactory (for example, stresses or displacements are too high), or if the shape is not adequate (for example, too large), the design may be adjusted either by modifying the values of $\overline{\alpha}$ or by adding additional boundary conditions. The whole procedure may be repeated iteratively until the desired shape is obtained for the design. Shape optimization may be used to guide the design process, as described earlier.

Conclusion

It should be understood that various preferred versions and features of the invention are shown and described above to illustrate variations of the invention, and the varying ways in which the features of the invention may be combined. Apart from combining the different features of the invention in varying ways, other modifications are also considered to be within the scope of the invention. Following is an exemplary list of such modifications.

First, the composite implicit functions may be constructed using other forms of R-functions apart from the $R_0^m$, $R_p$, $R_\alpha$, etc. functions previously noted. As mentioned earlier, there are many forms of R-functions with a wide variety of properties. While the selection of any particular form of R-function for application in a given engineering analysis problem can be made arbitrarily, it will generally be preferable to choose R-functions having desirable differential and normalization properties when applied to the problem at hand. Thus, while composite implicit functions could be automatically constructed by the invention by simple syntactic substitution of a given family of R-functions—for example, by substituting $R_0^m$ functions in every case—it will generally be preferable to allow a user to choose the family of R-functions to be applied, or to allow the invention to automatically choose the family of R-functions in accordance with the problem at hand by use of simple logic (e.g., "if a problem of type X, then use $R_0^m$ functions") or by use of more complex logic (e.g., in an expert system).

Second, implicit functions may be constructed by other methods, for example, by interpolation of implicit functions or scattered data sets, by deformations of functions (see FIG. 24), by combining elementary patches, or by procedural methods. Some of these approaches are discussed, for example, in J. Bloomenthal, *Introduction to Implicit Surfaces*, Morgan Kaufmann Publishers, 1997.

Figure 48:
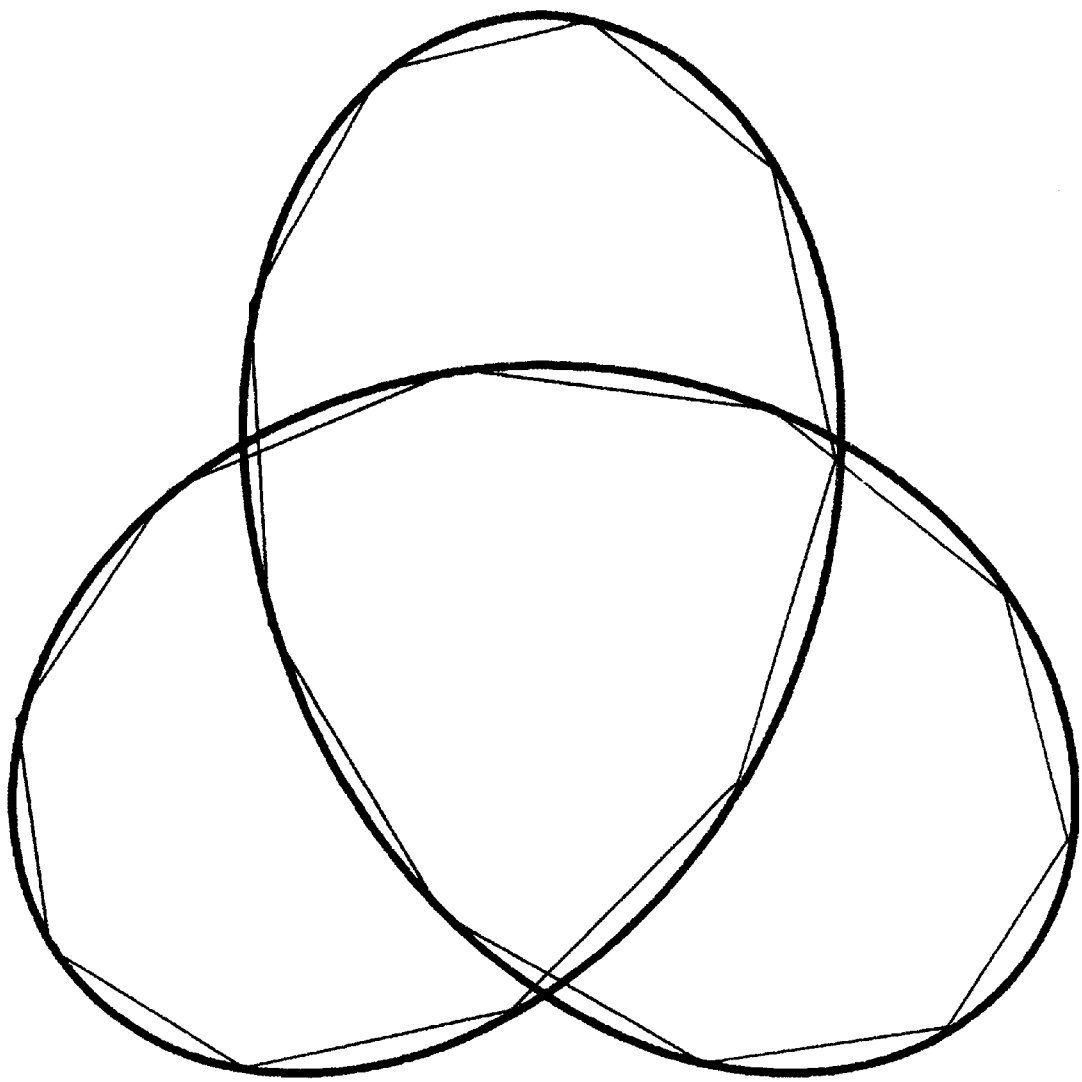
FIG. 48 shows a parametric curve $\{(x,y)|x=2\cos(t)-5\sin(2t), y=2\sin(t)-5\cos(2t)\}$ (shown in thick lines) and its approximation by twenty line segments (shown in thin lines).
Figure 49:
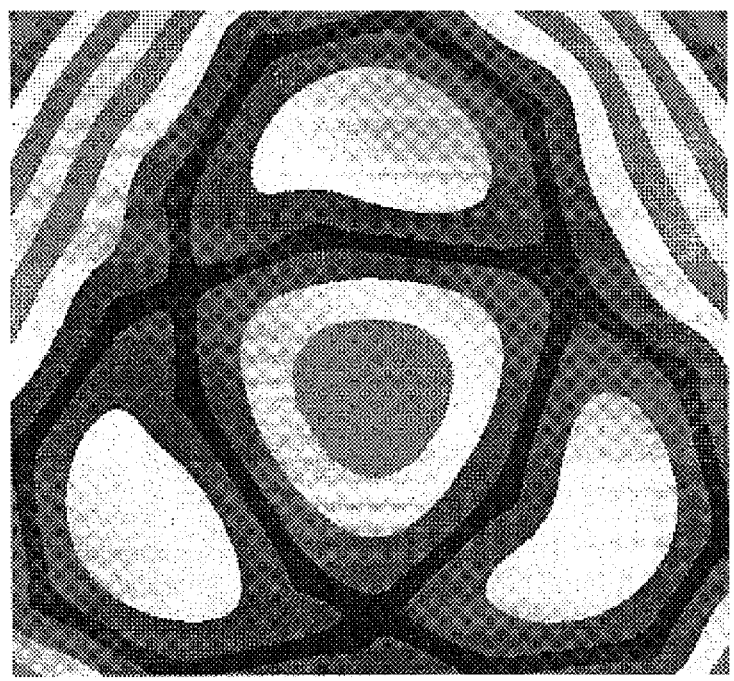
FIG. 49 shows isolines of composite implicit functions constructed for approximations of the parametric line given in FIG. 48(a) by twenty line segments; (b) by one thousand line segments.
Figure 49:
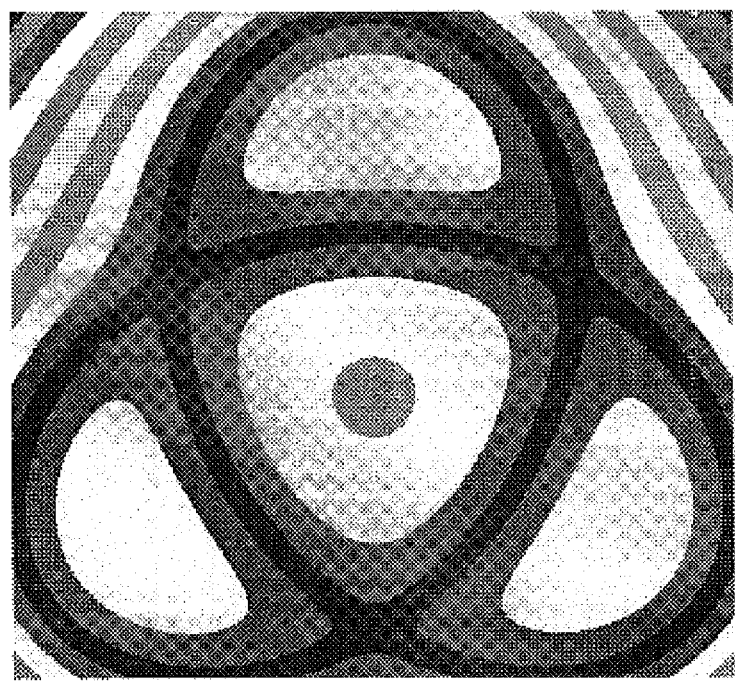
Figure 50:
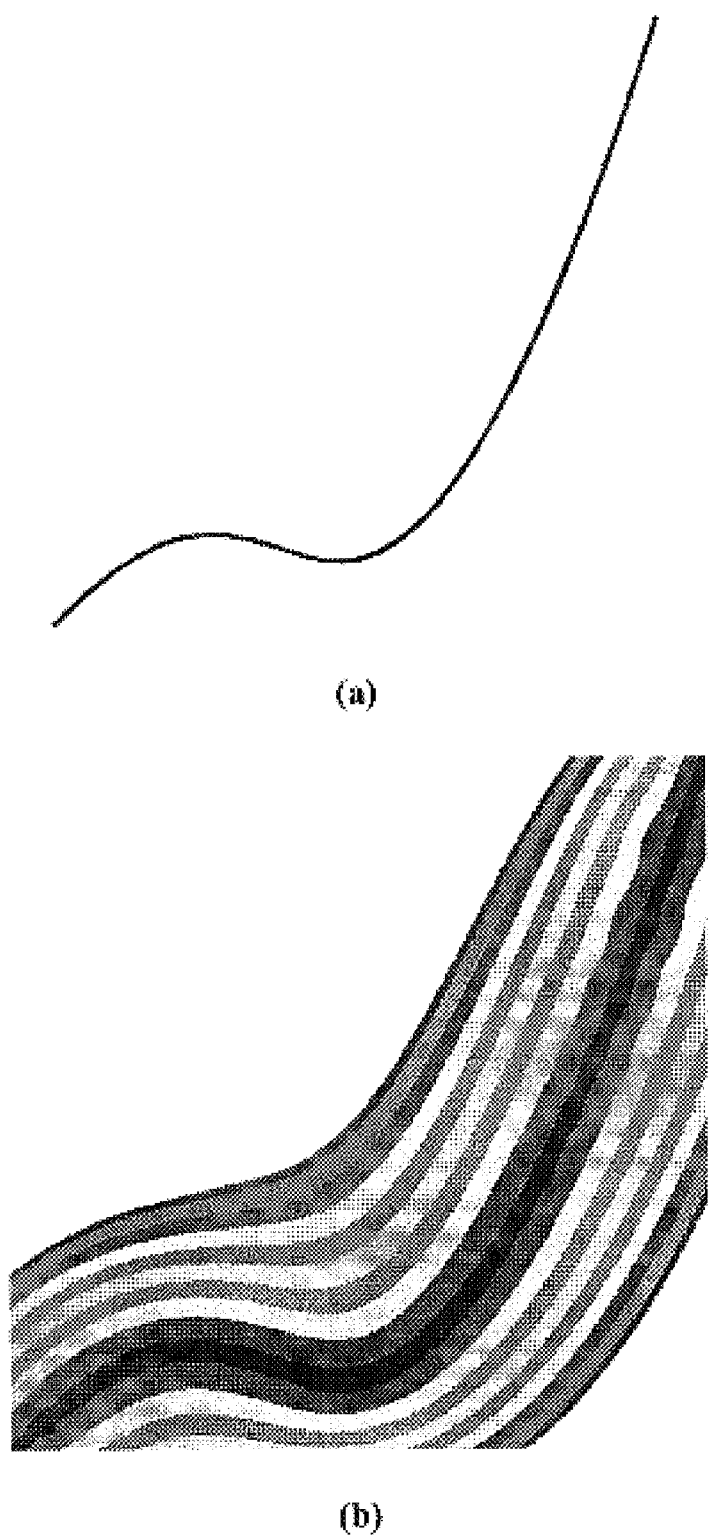
FIG. 50 shows (a) a B-spline curve and (b) an composite implicit function whose zero set approximates the curve shown in FIG. 50(a).

Third, implicit functions may be constructed from approximate geometries, e.g., for approximations of parametrically defined curves and surfaces. As an example, FIG. 48 shows a parametric curve$\{(x,y)|x=2\cos(t)-5\sin(2t), y=2\sin(t)-5\cos(2t)\}$(shown by the thick line) and its approximation by twenty line segments (shown by the thin line). While the parametric curve is not readily translatable into an implicit function, the construction of the implicit function for the approximation is straightforward: for each line segment the implicit functions are constructed, and then they are combined into one function using an appropriate R-function. FIG. 49(a) and (b) show the implicit functions constructed for approximations of a parametrically defined curve by twenty line segments (FIG.49(a)) and by one thousand line segments (FIG. 49(b)). As another example, a detailed geometric model might be simplified by conversion to an approximate wire-frame or triangulated model prior to the construction of implicit functions to simplify and speed up the process.

Fourth, while basis functions in the foregoing examples were chosen to be cubic B-splines, it should be understood that basis functions are not limited to cubic splines. Basis functions could instead be chosen to be B-splines of higher or lower degree, polynomials, trigonometric functions, and so on. The invention can use basis functions constructed for other methods of engineering analysis, such as finite element methods (FEM), finite difference methods, partition of unity methods, etc.

Fifth, the invention may be provided in a single computational environment with its steps executed in rapid succession, or its steps may be distributed in space and time. For example, the geometric model and/or boundary conditions may be created in one computer system, then transferred to another system via the internet or computer storage for further processing. Similarly, construction of the implicit functions, solution structures, solutions, etc. may be isolated into separate procedures. This contemplates the possibility that service providers can set up sites on the World Wide Web (or other computer networks) which are dedicated to the solution of problems submitted by others at remote locations, and that some sites could be dedicated to constructing implicit functions, others could be dedicated to solution procedures, etc., with users choosing appropriate providers for addressing each step in the problem's solution.

Sixth, it should be understood that a single boundary value problem may call for the construction of multiple functions and solution structures at the same time, for example, to deal with multiple modeling problems or to deal with vector-valued problems (deformations, velocities, etc.). In the case of vector-valued problems, the method of the invention could be applied to every component of the vector function (e.g., orthogonal x, y, and z components), and the individual component solution structures may be combined into a vector-valued solution of the analysis problem.

Seventh, the constructed functions, interpolated structures, and solutions may be interpreted as descriptions of new geometric information, e.g., the determined fields, or their isolines and isosurfaces, can be viewed as boundaries of two- and three-dimensional shapes.

Implicit functions can then be constructed for these shapes, and the procedure can be re-run to provide further insight into the engineering analysis problem.

Figure 40:
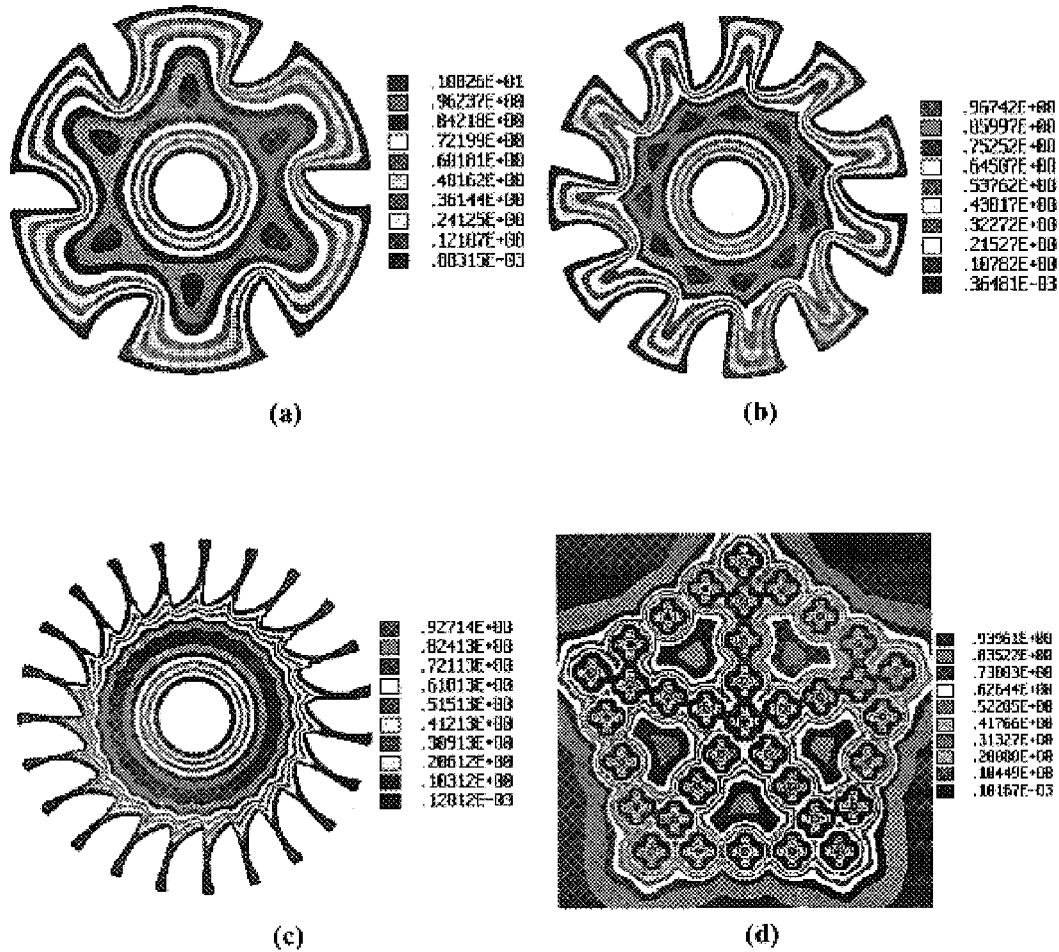
FIG. 40 illustrates the effect of the combination of R-functions with coordinate transformations.

Eighth, it is noted that the aforementioned procedures need not necessarily be used for engineering analysis, and could instead be used for purposes of education or entertainment. As an example, the constructed functions and solutions may not have a specific or defined physical meaning, and could be varied by users and/or by the application to produce aesthetically pleasing patterns, surfaces, and shapes (see, e.g., FIG. 40).

Ninth, the solution structure may interpolate not only the given boundary conditions, but also any number of additional "enrichment" functions, i.e. functions that enrich the solution structure to behave in a particular way. For example, such enrichment functions may represent known analytically or experimentally determined behaviors of the solution in particular regions, situations, or regimes, such as those arising near corners, cracks, and various singularities; other enrichment functions may be included to improve asymptotic behavior of the computed solutions.

The invention is not intended to be limited to the preferred embodiments described above, but rather is intended to be limited only by the claims set out at the end of this document. Thus, the invention encompasses all alternate embodiments that fall literally or equivalently within the scope of these claims.

Bibliography

1. T. Belytschko, Y. Krongauz, D. Organ, M. Fleming and P. Krysl. Meshless methods: An overview and recent developments. *Comput. Methods Appl. Mech. Engrg.*, 139:3–47, 1996.
2. J. Bloomenthal, *Introduction to Implicit Surfaces*, Morgan Kaufmann Publishers, 1997.
3. Frank C. Gunter and Wing Kam Liu. Implementation of boundary conditions for meshless methods. *Computer Methods in Applied Mechanics and Engineering*, 163:205–230, 1998.
4. L. V. Kantorovich and V. I. Krylov, *Approximate Methods of Higher Analysis*, Interscience Publishers, 1958.
5. J. Kucwaj and J. Orkisz. Computer approach to the R-functions method of solution of boundary value problems in arbitrary domains. *Computers & Structures*, 22(1):1–12, 1986.
6. J. -C. Latombe. *Robot Motion Planning*. Kluwer Academic Publishers, 1991.
7. A. Pasko, V. Adzhiev, A. Sourin, and V. Savchenko. Function representation in geometric modeling:concepts, implementation and applications. *The Visual Computer*, 11(8):429–446, 1995.
8. Walter D. Pilkey. *Formulas for stress, strain, and structural matrices*, John Wiley & Sons, 1994.
9. L. B. Rall and G. F. Corliss, An introduction to automatic differentiation, in M. Berz, C. Bischof, G. Corliss, and A. Griewank, editors, *Computational Differentiation, Procs Second International Workshop on Computational Differentiation*, SIAM, 1996.
10. J. R. Rossignac. CSG formulations for identifying and for trimming faces of CSG models. In *CSG'96, Winchester*, UK. Information Geometers Ltd, April 1996.
11. V. Rvachev, T. Sheiko, V. Shapiro, and J. Uicker. Implicit function modeling of solidification in metal casting. *Transaction of ASME, Journal of Mechanical Design*, 119:466–473, December 1997.
12. V. L. Rvachev, *Theory of R-functions and Some Applications*, Naukova Dumka, 1982. In Russian.
13. V. L. Rvachev and G. P. Manko. *Automation of Programming for Boundary Value Problems*. Naukova Dumka, 1983. In Russian.
14. V. L. Rvachev, G. P. Manko, and A. N. Shevchenko. The R-function approach and software for the analysis of physical and mechanical fields. In J. P. Crestin and J. F. McWaters, editors, *Software for Discrete Manufacturing*, Paris, 1986. North-Holland.
15. V. L. Rvachev and T. I. Sheiko, R-functions in boundary value problems in a mechanics, *Applied Mechanics Reviews*, 48(4): 151–188, 1995.
16. V. Shapiro. Theory of R-functions and applications: A primer. Tech. Report TR91- 1219, Computer Science Department, Cornell University, Ithaca, N.Y., 1991.
17. V. Shapiro. Real functions for representation of rigid solids. *Computer-Aided Geometric Design*, 11(2): 153–175, 1994.
18. V. Shapiro, Well-formed set representations of solids, *International Journal on Computational Geometry and Applications*, Vol. 9, No. 2, 1999, pp 125–150.
19. V. Shapiro and I. Tsukanov. Meshfree simulation of deforming domains. *Computer-Aided Design*, 31(7):459–471, 1999.
20. V. Shapiro and I. Tsukanov, Implicit functions with guaranteed differential properties, *Fifth ACM Symposium on Solid Modeling and Applications*, Ann Arbor, Mich., 1999.
21. V. Shapiro and D. L. Vossler, Construction and optimization of CSG representations, *Computer-Aided Design*, 23(1):4–20, January/February 1991.
22. V. Shapiro and D. L. Vossler, Efficient CSG representations of two-dimensional solids, *Transactions of ASME, Journal of Mechanical Design*, 113:292–305, September 1991.
23. V. Shapiro and D. L. Vossler, Separation for boundary to CSG conversion, *ACM Transactions on Graphics*, 12(1):35–55, January 1993.
24. A. N. Shevchenko and V. N. Rokityanskaya, Automatic differentiation of functions of many variables, *Cybernetics and System Analysis*, 32(5):709–723, 1996.
25. A. Sourin and A. Pasko. Function representation for sweeping by a moving solid. *In Proc. Third Symposium on Solid Modeling Foundations and CAD/CAM applications*, May 17–19, 1995.
26. A. Waberski. Vibration statistics of thin plates with complex form. *AIAA J*, 16(8):788–794, 1978.
27. Josef Hoschek and Dieter Lasser, *Fundamentals of Computer Aided Geometric Design*, A K Peters, Ltd, 1993.
28. Y. Liu and R. D. Reitz, Multidimensional modeling of engine combustion chamber surface temperatures, in *Advances in SI and Diesel Engine Modeling* (SP-1276), SAE-971594, pp. 57–71, May 1997.
29. Carl de Boor, *A Practical Guide to Splines*, Springer-Verlag, 1978.
30. W. H. Press, S. A. Teukolsky, W. T. Vetterling, and B. P. Flannery, *Numerical Recipes in C*, Cambridge University Press, second edition, 1992.
31. Y. Liu and R. D. Reitz, Modeling of heat conduction within chamber walls for multidimensional internal combustion engine simulation, *Int. J. Heat Mass Transfer*, 41(6–7):859–869, 1998.
32. R. S. Palmer and V. Shapiro, Chain models of physical behavior for engineering analysis and design, *Research in Engineering Design*, 5:161–184, 1993. Invited paper for the special issue Advances in Representation and Reasoning for Mechanical CAD.
33. J. A. Sethian. *Level Set Methods: Evolving Interfaces in Geometry, Fluid Mechanics, Computer Vision and Material Sciences*. Cambridge University Press, 1996.
34. V. L Rvachev, T. I. Sheiko, V. Shapiro, I. Tsukanov, *Transfinite Interpolation Over Implicitly Defined Sets*, Technical report SAL 2000-1, Spatial Automation Laboratory, University of Wisconsin, January 2000. http://sal-cnc.me.wisc.edu/.

What is claimed is:

1. A method of determining unknown field values in a CAD geometric model having known field values defined on at least one portion of the model, the field values being of one or more types, the method comprising:

a. for each portion of the model's geometry upon which a field value is defined, constructing an implicit function which mathematically represents the portion's geometry;

b. for each type of field value:

(1) constructing an interpolating function from the field values belonging to that type of field value and from the implicit functions representing the portions of the geometry corresponding to the field values belonging to that type of field value;

(2) constructing a composite implicit function combining the implicit functions representing the portions of the geometry corresponding to that type of field value;

(3) constructing a solution structure from (a) the interpolating function, (b) the composite implicit function, and (c) predefined basis functions having unknown coefficients;

c. if more than one type of field value exists, constructing a combined solution structure by interpolating the solution structures for the different types using the composite implicit functions constructed for the different types;

d. processing the solution structure to determine the unknown coefficients of the basis functions;

e. using the coefficients to determine unknown field values.

2. The method of claim 1 further comprising the step of creating the geometric model in a CAD application.

3. The method of claim 2 further comprising the step of defining the known field values on portions of the geometric model within the CAD application.

4. The method of claim 2 further comprising the step of importing the geometric model from the CAD application.

5. The method of claim 1 wherein the geometric model is chosen from one of:

a. a constructive solid geometry model;

b. a boundary representation model; or c. a feature-based model.

6. The method of claim 1 wherein the geometric model is a portion of a larger CAD geometric model.

7. The method of claim 1 wherein the geometric model is a simplified approximation of a more complex CAD geometric model.

8. The method of claim 1 wherein the step of constructing an implicit function for each portion of the model's geometry upon which a field value is defined includes:

a. for each portion, identifying one or more geometric primitives whose logical combination defines the portion; and b. defining implicit functions which mathematically represent the primitives; and c. combining the implicit functions, thereby obtaining the implicit function which mathematically represents the portion's geometry.

9. The method of claim 1 wherein the step of processing the solution structure includes at least one of:

a. differentiation of the solution structure or portions thereof;

b. integration of the solution structure or portions thereof; and c. algebraic solution for the unknown coefficients within the solution structure or portions thereof.

10. The method of claim 8 wherein the implicit functions are combined by R-functions.

11. The method of claim 1 further comprising the steps of:

a. after the unknown field values are determined, redefining the known field values; and b. reperforming the steps of claim 1.

12. The method of claim 1 further comprising the steps of:

a. after the unknown field values are determined, modifying the geometry of the geometric model; and b. reperforming the steps of claim 1.

13. A method wherein the unknown field values determined by the method of claim 1 define a new geometric model upon which the method of claim 1 is repeated.

14. A method wherein the unknown field values determined by the method of claim 1 are then used as the known field values defined on the geometric model, whereupon which the method of claim 1 is repeated to determine further unknown field values.

15. A method of determining unknown field values in a CAD geometric model having known field values defined on at least one portion of the model, the method comprising:

a. for each portion of the model's geometry upon which a field value is defined:

(1) identifying one or more geometric primitives whose logical combination defines the portion;

(2) defining implicit functions which mathematically represent the primitives;

(3) combining the implicit functions, thereby obtaining the implicit function which mathematically represents the portion's geometry.

b. constructing a solution structure from:

(1) the implicit functions representing each portion's geometry, (2) the field values defined thereon, and (3) predefined basis functions having unknown coefficients, wherein determination of the unknown coefficients yields the unknown field values from the solution structure.

16. The method of claim 15 wherein:

a. the field values defined on the geometric model are of at least two types, and b. the step of constructing a solution structure is performed for each type, with the solution structure for each type being constructed from:

(1) the implicit functions representing the portions of the geometry upon which that type of field value are defined, (2) the field values defined thereon, and (3) predefined basis functions having unknown coefficients.

17. The method of claim 16 wherein if more than one type of field value exists, the solution structure is a combined solution structure created by interpolating the solution structures for the different types using the composite implicit functions constructed for the different types.

18. A method wherein the unknown field values determined by the method of claim 15 are then used as the known field values defined on the geometric model, whereupon which the method of claim 15 is repeated to determine further unknown field values.

19. The method of claim 15 wherein the step of processing the solution structure includes at least one of:

a. differentiation of the solution structure or portions thereof;

b. integration of the solution structure or portions thereof; and c. algebraic solution for the unknown coefficients of the solution structure or portions thereof.

20. The method of claim 15 wherein the implicit functions are combined by R-functions.

21. The method of claim 15 further comprising the step of creating the geometric model in a CAD application.

22. A method wherein the unknown field values determined by the method of claim 15 define a new geometric model upon which the method of claim 15 is repeated.

23. The method of claim 15 further comprising the steps of:

a. after the unknown field values are determined, redefining the known field values; and b. reperforming the steps of claim 15.

24. The method of claim 15 further comprising the steps of:

a. after the unknown field values are determined, modifying the geometry of the geometric model; and b. reperforming the steps of claim 15.

25. A method of determining unknown field values in a CAD geometric model having known field values defined on at least one portion of the model, the field values being of one or more types, the method comprising:

a. for each portion of the model's geometry upon which a field value is defined:
  (1) identifying one or more geometric primitives whose logical combination defines the portion;
  (2) defining implicit functions which mathematically represent the primitives;
  (3) combining the implicit functions, thereby obtaining the implicit function which mathematically represents the portion's geometry;

b. for each type of field value, constructing a corresponding solution structure, the solution structure for each type being constructed from:
  (1) the implicit functions representing the geometry of the portions of the model having the type of field value in question;
  (2) the field values defined on those portions of the model, and
  (3) predefined basis functions having unknown coefficients;

c. if more than one type of field value exists, constructing a combined solution structure by interpolating the solution structures for the different types over the corresponding portions of the geometric model;

d. processing the solution structure to determine the unknown coefficients of the basis functions; and e. using the coefficients to determine unknown field values.

26. The method of claim 25 wherein the step of constructing a combined solution structure comprises:

a. for each type of field value, constructing an interpolating function from the field values belonging to that type of field value and from the implicit functions representing the portions of the geometry corresponding to the field values belonging to that type of field value;

b. interpolating the solution structures for the different types using the composite implicit functions constructed for the different types.

* * * * *